(12) United States Patent
Hu et al.

(10) Patent No.: US 12,656,557 B2
(45) Date of Patent: Jun. 16, 2026

(54) OPTICAL FIBER CONNECTOR ASSEMBLY, LABEL SYSTEM, LABEL MODULE, AND RECOGNITION METHOD

(71) Applicant: HUAWEI TECHNOLOGIES CO., LTD., Shenzhen (CN)

(72) Inventors: Jian Hu, Wuhan (CN); Qinxian Lin, Dongguan (CN); Yida Wen, Dongguan (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 511 days.

(21) Appl. No.: 18/172,134

(22) Filed: Feb. 21, 2023

(65) Prior Publication Data

US 2023/0204874 A1 Jun. 29, 2023

Related U.S. Application Data

(63) Continuation of application No. PCT/CN2021/082311, filed on Mar. 23, 2021.

(30) Foreign Application Priority Data

Aug. 21, 2020 (CN) .......................... 202010852565.8

(51) Int. Cl.
| | |
|---|---|
| *G02B 6/38* | (2006.01) |
| *G06K 7/14* | (2006.01) |
| *G06V 20/50* | (2022.01) |

(52) U.S. Cl.
CPC ......... *G02B 6/3895* (2013.01); *G06K 7/1413* (2013.01); *G06K 7/1417* (2013.01); *G06V 20/50* (2022.01)

(58) Field of Classification Search
CPC .. G02B 6/3895; G02B 6/3825; G02B 6/3849; G02B 6/3893; G02B 6/3894;
(Continued)

(56) References Cited

U.S. PATENT DOCUMENTS

| | | | |
|---|---|---|---|
| 10,215,935 B2 | 2/2019 | Scherer et al. | |
| 2006/0088258 A1* | 4/2006 | Sasaki | .................. G02B 6/4403 |
| | | | 385/14 |

(Continued)

FOREIGN PATENT DOCUMENTS

| | | |
|---|---|---|
| CN | 102708352 A | 10/2012 |
| CN | 203365736 U | 12/2013 |

(Continued)

OTHER PUBLICATIONS

Gen-Liang (CN-2109463 U, machine translated document, Published Jul. 3, 2020) (Year: 2020).*

(Continued)

*Primary Examiner* — Juan M Guillermety
(74) *Attorney, Agent, or Firm* — Leydig, Voit & Mayer, Ltd.

(57) ABSTRACT

An optical fiber connector assembly, a label system, a label module, and a recognition method to improve efficiency and accuracy of recognizing the optical fiber connector assembly is provided. The optical fiber connector assembly includes an optical fiber connector body, a connecting piece, and a label module. The connecting piece is separately connected to the optical fiber connector body and the label module. The label module has a target surface. The target surface is opposite to a location of the optical fiber connector body. The target surface is used to set label information. The label information is used to identify the optical fiber connector body.

30 Claims, 36 Drawing Sheets

(58) Field of Classification Search

CPC ............. G02B 6/44528; G06K 7/1413; G06K 7/1417; G06K 7/10; G06V 20/50

See application file for complete search history.

(56) References Cited

U.S. PATENT DOCUMENTS

| | | | |
|---|---|---|---|
| 2010/0210135 A1 | 8/2010 | German et al. | |
| 2012/0185919 A1 | 7/2012 | Macauley | |
| 2015/0092043 A1 | 4/2015 | Baribault | |
| 2020/0005001 A1 | 1/2020 | Kewitsch | |
| 2022/0082758 A1* | 3/2022 | Nguyen | G02B 6/3898 |

FOREIGN PATENT DOCUMENTS

| | | | | | |
|---|---|---|---|---|---|
| CN | 203422501 U | | 2/2014 | | |
| CN | 105278061 A | | 1/2016 | | |
| CN | 107111968 A | | 8/2017 | | |
| CN | 110658590 A | | 1/2020 | | |
| CN | 110703397 A | | 1/2020 | | |
| CN | 111103662 A | * | 5/2020 | .......... | G02B 6/3895 |
| CN | 111999819 A | | 11/2020 | | |
| CN | 214097870 U | | 8/2021 | | |
| EP | 2528012 A1 | | 11/2012 | | |
| FR | 3022389 A1 | | 12/2015 | | |
| JP | 2004226564 A | | 8/2004 | | |
| JP | 2005258193 A | | 9/2005 | | |
| JP | 2017003833 A | | 1/2017 | | |
| JP | 2019066889 A | | 4/2019 | | |
| WO | 2014060416 A1 | | 4/2014 | | |
| WO | WO-2020172774 A1 | * | 9/2020 | .......... | G02B 6/4472 |

OTHER PUBLICATIONS

English Machine Translation of WO 2020/172774 (Qi et al., Published Sep. 3, 2020) (Year: 2020).*

English Machine Translation of CN 111103662 (Xu et al., Published May 5, 2020) (Year: 2020).*

English Machine Translation of JP2004226565 (Yasuhara, Published Aug. 12, 2004) (Year: 2004).*

English Machine Translation of CN 105467529 A (Zhang et al., Published Feb. 16, 2016) (Year: 2016).*

English Machine Translation of CN 11054f2952 A (Xiong et al., Published Jul. 26, 2016) (Year: 2016).*

* cited by examiner

OPTICAL FIBER CONNECTOR ASSEMBLY, LABEL SYSTEM, LABEL MODULE, AND RECOGNITION METHOD

CROSS-REFERENCE TO RELATED APPLICATIONS

This application is a continuation of international application No. PCT/CN2021/082311, filed on Mar. 23, 2021, which claims priority to Chinese Patent Application No. 202010852565.8, filed on Aug. 21, 2020. The disclosures of the aforementioned applications are hereby incorporated by reference in their entireties.

TECHNICAL FIELD

This application relates to the optical fiber communications field, and in particular, to an optical fiber connector assembly, a label system, a label module, and a recognition method.

BACKGROUND

An optical network includes a network node. The network node includes a plurality of adapters. Each adapter is configured to mount and fix an optical fiber connector assembly. The network node includes an increasingly large quantity of adapters. To ensure that an optical signal can be accurately transmitted from a source node to a target node, each optical fiber connector assembly needs to be accurately plugged in a corresponding adapter.

In the conventional technologies, each optical fiber connector assembly plugged in the adapter is recognized in a radio frequency identification (RFID) manner. Specifically, an RFID label is added to the optical fiber connector assembly, and the RFID label of the optical fiber connector assembly is recognized by using a dedicated recognition apparatus, to specifically recognize the optical fiber connector assembly.

However, recognition performed on the optical fiber connector assembly in the RFID manner requires the dedicated recognition apparatus, thereby increasing the costs for recognizing the optical fiber connector assembly. In addition, when the network node includes a large quantity of optical fiber connector assemblies, the large plurality of optical fiber connector assemblies need to be recognized one by one by using the recognition apparatus, thereby reducing efficiency of recognizing the optical fiber connector assembly.

SUMMARY

This application provides an optical fiber connector assembly, a label system, a label module, and a recognition method, to improve efficiency and accuracy of recognizing the optical fiber connector assembly.

According to a first aspect, an embodiment of this application provides an optical fiber connector assembly. The optical fiber connector assembly includes an optical fiber connector body, a connecting piece, and a label module. The connecting piece is separately connected to the optical fiber connector body and the label module. The label module has a target surface. The target surface is opposite to a location of the optical fiber connector body. The target surface is used to set label information. The label information is used to identify the optical fiber connector body.

It can be learned that the label information is set for the label module of the optical fiber connector assembly, and the optical fiber connector body can be uniquely identified by using the label information. The label information is within a photographing range or a line-of-sight range. The optical fiber connector body can be accurately recognized based on the label information.

In addition, the label information can be further used to recognize whether the optical fiber connector body identified by using the label information is accurately plugged in the corresponding adapter, thereby improving accuracy of recognizing whether the optical fiber connector body is accurately plugged in the corresponding adapter.

Because label information of each optical fiber connector assembly plugged in a subrack is within the photographing range, a target image including each piece of label information may be obtained through photographing the subrack by a terminal device (for example, a smartphone) with a camera. Each optical fiber connector body identified by using each piece of label information in the target image may be recognized based on the target image. Recognition does not need to be performed by using a dedicated apparatus. The costs and complexity of recognizing the optical fiber connector body identified by using the label information are effectively reduced. Each optical fiber connector body identified by using each piece of label information included in the target image is recognized, thereby improving recognition efficiency.

In addition, for the optical fiber connector assembly, setting of the label information may be completed during delivery of the optical fiber connector assembly, to simplify operation steps at an operational site. An optical fiber connector is directly plugged in a corresponding adapter at the operational site, to improve efficiency of mounting the optical fiber connector assembly onto the subrack. Optionally, the label information may not be set during delivery of the optical fiber connector assembly, and the label information is set on the target surface of the optical fiber connector assembly at the operational site.

In addition, a label array is formed in the subrack. The label array includes label information of all optical fiber connector assemblies plugged in the subrack. Because different optical fiber connector assemblies are all in the label array, and the label array is entirely within a visual range or a photographing range, the optical fiber connector assemblies can be recognized in a manner of viewing or photographing the label array. A recognition process is not interfered with by another optical fiber connector assembly or an optical cable, to improve recognition efficiency and recognition accuracy.

With reference to the first aspect, in an optional implementation, the optical fiber connector body and the connecting piece are an integrally molded structure. Specifically, the optical fiber connector body includes a plug, a middle part, and a rear retainer. The middle part is connected between the plug and the rear retainer.

The connecting piece, the label module, and the plug of the optical fiber connector assembly are an integrally molded structure; or the connecting piece, the label module, the plug, and the middle part are an integrally molded structure; or the connecting piece, the label module, and the middle part are an integrally molded structure. The integrally molded structure forms a housing, to effectively improve stability of a structure of the optical fiber connector assembly. Therefore, in a subsequent use process of the network node, location deviation does not occur for the label information of the optical fiber connector assembly, to effectively ensure that the label information can be always within the line-of-sight range or the photographing range, thereby improving accuracy of recognizing the optical fiber connector body identified by using the label information.

With reference the first aspect, in an optional implementation, the optical fiber connector body includes a plug, a middle part, and a rear retainer that are sequentially connected. The connecting piece includes a mounting groove and an extension rod. One end of the extension rod is connected to the mounting groove, and the other end of the extension rod is connected to the label module. The mounting groove is used to mount and fix the middle part.

With reference to the first aspect, in an optional implementation, the mounting groove has concave plugging space. The plugging space is used to mount and fix the middle part.

It can be learned that in a state in which the middle part is plugged in the plugging space, it is effectively ensured that the label information of the label module is always within the visual range or the photographing range. In addition, stability of an entire structure of the optical fiber connector assembly is effectively improved by using the plugging space.

With reference to the first aspect, in an optional implementation, an accommodation channel is formed between the mounting groove, the extension rod, and the label module. The accommodation channel accommodates the rear retainer and some optical cables.

It can be learned that, by using the accommodation channel disposed in the optical fiber connector assembly, the label information of the label module is effectively prevented from being blocked within the photographing range. Therefore, clarity and integrity of the label information are effectively ensured, to improve accuracy of recognizing the optical fiber connector body based on the label information.

With reference to the first aspect, in an optional implementation, a clamping protrusion is disposed on a groove wall of the mounting groove, and a clamping groove is disposed on the middle part. The middle part is plugged in the mounting groove by using an opening of the mounting groove until the clamping protrusion is clamped and fixed in the clamping groove. The opening extends in an axial direction of the optical fiber connector body.

It can be learned that stability of a structure of the optical fiber connector assembly is effectively improved through matching between the clamping protrusion and a structure of the clamping groove.

With reference to the first aspect, in an optional implementation, the connecting piece further includes a cover, and a guide rail is formed on an outer side of the opening. A slide rail is formed at a corresponding location between the cover and the guide rail. In a state in which the slide rail is plugged in the guide rail, the cover covers the opening.

It can be learned that, in a state in which the middle part of the optical fiber connector body is plugged in the mounting groove, due to an abutting function of the cover for the middle part, stability of a structure between the middle part and the mounting groove is effectively improved, thereby avoiding a case in which a label component is detached from the optical fiber connector body. Therefore, it is effectively ensured that the label information of the optical fiber connector assembly is always within the line-of-sight range or the photographing range, to effectively ensure accuracy and efficiency of recognizing the optical fiber connector body identified by using the label information.

With reference to the first aspect, in an optional implementation, the connecting piece includes a first component, a second component, and a third component. A first end of the first component forms the opening of the mounting groove. The opening extends in the axial direction of the optical fiber connector body. A second end of the first component is connected to the label module. The extension rod is between the first end of the first component and the second end of the first component. The second component and the third component are located on two sides at opposite locations at the first end of the first component. The third component covers the opening of the mounting groove. The first component, the second component, and the third component are buckled with each other to form the mounting groove.

It can be learned that when the optical fiber connector body is plugged in the adapter in the subrack, if the label information used to identify the optical fiber connector body needs to be put on the optical fiber connector body, the first component, the second component, and the third component may be directly combined on the optical fiber connector body to form the label component, while the optical fiber connector body does not need to be plugged in or unplugged from the adapter. In this way, in a process of mounting the label component onto the optical fiber connector body, an optical signal transmitted by the optical fiber connector body does not need to be interrupted.

Therefore, when operation space is limited in a scenario in which adapters are disposed in high density on the subrack, and it is required that network disconnection cannot occur, the optical fiber connector assembly in this aspect can be assembled in a state in which the optical fiber connector body keeps being plugged in the adapter, thereby effectively avoiding network disconnection in a process of mounting the label component.

With reference to the first aspect, in an optional implementation, a cut is disposed on the groove wall of the mounting groove in the axial direction of the optical fiber connector body. A gap of the cut is changed under a function of an external force until the middle part is clamped and fixed in the mounting groove.

It can be learned that the mounting groove may be made of an elastic material, so that the gap of the cut can be changed under the function of the external force until the middle part is clamped and fixed in the mounting groove. In this way, stability of the structure of the optical fiber connector assembly is effectively improved.

With reference to the first aspect, in an optional implementation, the mounting groove has a first channel opening and a second channel opening at opposite locations in the axial direction of the optical fiber connector body. The connecting piece further includes a plurality of elastic arms. First ends of the plurality of elastic arms are connected to the second channel opening. Second ends of the plurality of elastic arms are close to each other. Accommodation space formed between the plurality of elastic arms that are close to each other is used to accommodate the middle part.

With reference to the first aspect, in an optional implementation, an annular groove is disposed on an outer peripheral surface of the middle part. In a state in which the plurality of elastic arms are plugged in the annular groove, the mounting groove is connected to the middle part.

With reference to the first aspect, in an optional implementation, a limiting protrusion is disposed on the first channel opening in a direction toward the plug. A limiting groove is disposed at a corresponding location between the middle part and the limiting protrusion. The limiting protrusion is plugged in the limiting groove, to limit rotation of the mounting groove.

It can be learned that the optical fiber connector body is accommodated by using the plurality of elastic arms, to effectively improve stability of the entire structure of the optical fiber connector assembly.

With reference the first aspect, in an optional implementation, the connecting piece has a first channel, and the label module has a second channel. The first channel is connected to the second channel. The optical cable extends through the first channel and the second channel.

With reference to the first aspect, in an optional implementation, the optical fiber connector assembly includes a spring arm. One end of the spring arm is connected to the optical fiber connector assembly. A gap exists between the other end of the spring arm and the optical fiber connector assembly. The optical fiber connector assembly further includes an unlocking piece connected to the connecting piece. The unlocking piece includes an abutting end and a function end. The abutting end is connected to the function end by using a transition rod. The abutting end abuts against the spring arm. The function end extends to a location close to the target surface. Under a function of an external force, the function end drives the abutting end to exert an acting force on the spring arm to change a size of the gap.

With reference to the first aspect, in an optional implementation, a rotation protrusion is disposed on the connecting piece. A rotation hole is disposed on the transition rod. In a state in which the rotation protrusion is plugged in the rotation hole, the unlocking piece rotates by using the rotation hole as a center.

It can be learned that by using the unlocking piece, the optical fiber connector assembly can be remotely plugged in the adapter, and the optical fiber connector assembly can be remotely unplugged from the adapter. In a process of plugging and unplugging the optical fiber connector assembly, construction personnel does not need to exert an acting force in a region of the plug by using hands, thereby improving operation efficiency of plugging and unplugging the optical fiber connector assembly. In addition, because a remote operation is performed on the optical fiber connector assembly, the following case is avoided: The hands of the construction personnel are in contact with the optical fiber connector assembly and the optical cable. Therefore, a possibility that the optical fiber connector assembly and the optical cable become faulty under a function of the external force is avoided, thereby improving safety.

With reference to the first aspect, in an optional implementation, an outer wall of the connecting piece curves inward to form a cabling channel.

It can be learned that the cabling channel can be used to avoid an extension direction of an optical cable connected to a second optical fiber connector assembly 402, thereby effectively avoiding a possibility that a hard contact occurs between the optical cable connected to the second optical fiber connector assembly 402 and the first optical fiber connector assembly 401. In this way, safety of the optical cable connected to the second optical fiber connector assembly 402 is effectively improved.

According to a second aspect, an embodiment of this application provides a label system. The label system includes a subrack. The subrack includes a plurality of adapters. The plurality of adapters include a first adapter. An optical fiber connector assembly is plugged in the first adapter. The optical fiber connector assembly includes an optical fiber connector body, a connecting piece, and a label module. The connecting piece is separately connected to the optical fiber connector body and the label module. The label module has a target surface. The target surface is opposite to a location of the optical fiber connector body. The target surface is used to set label information. The label information is used to identify the optical fiber connector body.

For description of beneficial effects of this aspect, refer to the first aspect for details. Details are not described again.

With reference to the second aspect, in an optional implementation, the plurality of adapters include a second adapter. The label system further includes an identification component. The identification component includes a dustproof plug, an extension piece, and an identification module. The dustproof plug is plugged in the second adapter. The extension piece is separately connected to the dustproof plug and the identification module. The identification module has an identification surface. The identification surface is opposite to a location of the second adapter. The identification surface is used to indicate a location of the second adapter in the subrack.

With reference to the second aspect, in an optional implementation, an outer wall of the extension piece curves inward to form a cabling channel.

With reference to the second aspect, in an optional implementation, the label system further includes a mark structure. The mark structure is used to indicate a correspondence between an identifier of the first adapter, location information of the first adapter, and location information of the label information.

With reference to the second aspect, in an optional implementation, the optical fiber connector body and the connecting piece are an integrally molded structure.

With reference the second aspect, in an optional implementation, the optical fiber connector body includes a plug, a middle part, and a rear retainer that are sequentially connected. The connecting piece includes a mounting groove and an extension rod. One end of the extension rod is connected to the mounting groove, and the other end of the extension rod is connected to the label module. The mounting groove is used to mount and fix the middle part.

With reference to the second aspect, in an optional implementation, the mounting groove has concave plugging space. The plugging space is used to mount and fix the middle part.

With reference to the second aspect, in an optional implementation, an accommodation channel is formed between the mounting groove, the extension rod, and the label module. The accommodation channel accommodates the rear retainer and some optical cables.

With reference to the second aspect, in an optional implementation, a clamping protrusion is disposed on a groove wall of the mounting groove, and a clamping groove is disposed on the middle part. The middle part is plugged in the mounting groove by using an opening of the mounting groove until the clamping protrusion is clamped and fixed in the clamping groove. The opening extends in an axial direction of the optical fiber connector body.

With reference to the second aspect, in an optional implementation, the connecting piece further includes a cover, and a guide rail is formed on an outer side of the opening. A slide rail is formed at a corresponding location between the cover and the guide rail. In a state in which the slide rail is plugged in the guide rail, the cover covers the opening.

With reference to the second aspect, in an optional implementation, the connecting piece includes a first component, a second component, and a third component. A first end of the first component forms the opening of the mounting groove. The opening extends in the axial direction of the optical fiber connector body. A second end of the first component is connected to the label module. The extension rod is between the first end of the first component and the second end of the first component. The second component and the third component are located on two sides at opposite locations at the first end of the first component. The third component covers the opening of the mounting groove. The first component, the second component, and the third component are buckled with each other to form the mounting groove.

With reference to the second aspect, in an optional implementation, a cut is disposed on the groove wall of the mounting groove in the axial direction of the optical fiber connector body. A gap of the cut is changed under a function of an external force until the middle part is clamped and fixed in the mounting groove.

With reference to the second aspect, in an optional implementation, the mounting groove has a first channel opening and a second channel opening at opposite locations in the axial direction of the optical fiber connector body. The connecting piece further includes a plurality of elastic arms. First ends of the plurality of elastic arms are connected to the second channel opening. Second ends of the plurality of elastic arms are close to each other. Accommodation space formed between the plurality of elastic arms that are close to each other is used to accommodate the middle part.

With reference to the second aspect, in an optional implementation, an annular groove is disposed on an outer peripheral surface of the middle part. In a state in which the plurality of elastic arms are plugged in the annular groove, the mounting groove is connected to the middle part.

With reference to the second aspect, in an optional implementation, a limiting protrusion is disposed on the first channel opening in a direction toward the plug. A limiting groove is disposed at a corresponding location between the middle part and the limiting protrusion. The limiting protrusion is plugged in the limiting groove, to limit rotation of the mounting groove.

With reference the second aspect, in an optional implementation, the connecting piece has a first channel, and the label module has a second channel. The first channel is connected to the second channel. The optical cable extends through the first channel and the second channel.

With reference to the second aspect, in an optional implementation, the optical fiber connector assembly includes a spring arm. One end of the spring arm is connected to the optical fiber connector assembly. A gap exists between the other end of the spring arm and the optical fiber connector assembly. The optical fiber connector assembly further includes an unlocking piece connected to the connecting piece. The unlocking piece includes an abutting end and a function end. The abutting end is connected to the function end by using a transition rod. The abutting end abuts against the spring arm. The function end extends to a location close to the target surface. Under a function of an external force, the function end drives the abutting end to exert an acting force on the spring arm to change a size of the gap.

With reference to the second aspect, in an optional implementation, a rotation protrusion is disposed on the connecting piece. A rotation hole is disposed on the transition rod. In a state in which the rotation protrusion is plugged in the rotation hole, the unlocking piece rotates by using the rotation hole as a center.

With reference to the second aspect, in an optional implementation, an outer wall of the connecting piece curves inward to form a cabling channel.

According to a third aspect, an embodiment of this application provides a label component applied to an optical fiber connector body. The label component includes a connecting piece and a label module. The connecting piece is connected to the label module. The label module has a target surface. The target surface is opposite to a location of the connecting piece. The target surface is used to set label information. The label information is used to identify the optical fiber connector body.

For description of beneficial effects of this aspect, refer to the first aspect for details. Details are not described again.

With reference the third aspect, in an optional implementation, the connecting piece includes a mounting groove and an extension rod. One end of the extension rod is connected to the mounting groove, and the other end of the extension rod is connected to the label module. The mounting groove is used to mount and fix the middle part of the optical fiber connector body.

With reference to the third aspect, in an optional implementation, the mounting groove has concave plugging space. The plugging space is used to mount and fix the middle part.

With reference to the third aspect, in an optional implementation, an accommodation channel is formed between the mounting groove, the extension rod, and the label module. The accommodation channel accommodates the rear retainer of the optical fiber connector body and some optical cables.

With reference to the third aspect, in an optional implementation, a clamping protrusion is disposed on a groove wall of the mounting groove, and a clamping groove is disposed on the middle part. The middle part is plugged in the mounting groove by using an opening of the mounting groove until the clamping protrusion is clamped and fixed in the clamping groove. The opening extends in an axial direction of the optical fiber connector body.

With reference to the third aspect, in an optional implementation, the connecting piece further includes a cover, and a guide rail is formed on an outer side of the opening. A slide rail is formed at a corresponding location between the cover and the guide rail. In a state in which the slide rail is plugged in the guide rail, the cover covers the opening.

With reference to the third aspect, in an optional implementation, the connecting piece includes a first component, a second component, and a third component. A first end of the first component forms the opening of the mounting groove. The opening extends in the axial direction of the optical fiber connector body. A second end of the first component is connected to the label module. The extension rod is between the first end of the first component and the second end of the first component. The second component and the third component are located on two sides at opposite locations at the first end of the first component. The third component covers the opening of the mounting groove. The first component, the second component, and the third component are buckled with each other to form the mounting groove.

With reference to the third aspect, in an optional implementation, a cut is disposed on the groove wall of the mounting groove in the axial direction of the optical fiber connector body. A gap of the cut is changed under a function of an external force until the middle part is clamped and fixed in the mounting groove.

With reference to the third aspect, in an optional implementation, the mounting groove has a first channel opening and a second channel opening at opposite locations in the axial direction of the optical fiber connector body. The connecting piece further includes a plurality of elastic arms. First ends of the plurality of elastic arms are connected to the second channel opening. Second ends of the plurality of elastic arms are close to each other. Accommodation space formed between the plurality of elastic arms that are close to each other is used to accommodate the middle part.

With reference the third aspect, in an optional implementation, the connecting piece has a first channel, and the label module has a second channel. The first channel is connected to the second channel. The optical cable extends through the first channel and the second channel.

With reference to the third aspect, in an optional implementation, the label component further includes an unlocking piece connected to the connecting piece. The unlocking piece includes an abutting end and a function end. The abutting end is connected to the function end by using a transition rod. The abutting end abuts against a spring arm of the optical fiber connector body. The function end extends to a location close to the target surface. Under a function of an external force, the function end drives the abutting end to exert an acting force on the spring arm to change a size of a gap between the spring arm and the optical fiber connector body.

With reference to the third aspect, in an optional implementation, a rotation protrusion is disposed on the connecting piece. A rotation hole is disposed on the transition rod. In a state in which the rotation protrusion is plugged in the rotation hole, the unlocking piece rotates by using the rotation hole as a center.

With reference to the third aspect, in an optional implementation, an outer wall of the connecting piece curves inward to form a cabling channel.

According to a fourth aspect, an embodiment of this application provides a recognition method. The method includes: obtaining a target image, where the target image is an image obtained through photographing a subrack by a camera; and obtaining a correspondence between label information and a first target adapter based on the target image, where the subrack is configured to fix the first target adapter, the first target adapter is configured to mount and fix an optical fiber connector assembly, and the optical fiber connector assembly includes the label information used to identify the optical fiber connector assembly.

It can be learned that by using the recognition method shown in this embodiment, optical fiber connectors plugged in all first target adapters included in the subrack can be recognized based on the target image, and the correspondence between the label information and the first target adapter can be recognized, so that batch entry and digitization processing are performed on the adapters of the subrack and the plugged optical fiber connector assemblies.

With reference to the fourth aspect, in an optional implementation, the method further includes: determining, based on a first preset correspondence, that the label information corresponds to a second target adapter, where the first preset correspondence includes a correspondence between the label information and an identifier of the second target adapter. After the obtaining a correspondence between label information and a first target adapter based on the target image, the method further includes: determining whether an identifier of the first target adapter is the same as the identifier of the second target adapter; and if the identifier of the first target adapter is the same as the identifier of the second target adapter, determining that the first target adapter is the second target adapter.

It can be learned that, by using the method shown in this aspect, it can be recognized whether the first target adapter in which the optical fiber connector assembly identified by using the label information is plugged is the correct second target adapter in which the optical fiber connector assembly needs to be plugged. It can be recognized in batches based on the target image whether correct optical fiber connector bodies are plugged in all the adapters included in the subrack, thereby improving recognition accuracy and recognition efficiency. In addition, in a recognition process, it is unnecessary to use a dedicated recognition apparatus to recognize whether the optical fiber connector assembly is plugged in the adapter corresponding to the optical fiber connector assembly, thereby reducing operation difficulty of the recognition and improving recognition efficiency.

With reference to the fourth aspect, in an optional implementation, the obtaining a correspondence between label information and a first target adapter based on the target image includes: determining location information of the label information in a label array based on the target image, where the label array is an array formed by at least some identification surfaces plugged in the subrack and the label information, any row included in the label array has at least one piece of the label information or at least one identification surface, any column included in the label array includes at least one piece of the label information or the identification surface, the subrack further includes a third target adapter, the third target adapter is configured to mount an identification component, and the identification surface of the identification component is configured to indicate a location of the third target adapter in the subrack; and determining the corresponding first target adapter based on the location information of the label information in the label array.

With reference to the fourth aspect, in an optional implementation, the determining the corresponding first target adapter based on the location information of the label information in the label array includes: determining location information of the first target adapter in an adapter array based on the location information of the label information in the label array, where the adapter array is an array formed by at least some adapters plugged in the subrack; and obtaining the identifier of the first target adapter based on the location information of the first target adapter in the adapter array and a first correspondence, where the first correspondence includes a correspondence between the location information of the first target adapter in the adapter array and the identifier of the first target adapter.

With reference to the fourth aspect, in an optional implementation, the determining the corresponding first target adapter based on the location information of the label information in the label array includes: obtaining the identifier of the first target adapter based on the location information of the label information in the label array and a second correspondence, where the second correspondence includes a correspondence between the location information of the label information in the label array and the identifier of the first target adapter.

With reference to the fourth aspect, in an optional implementation, the method further includes: determining, based on a second preset correspondence, that the first target adapter corresponds to target label information, where the second preset correspondence includes a correspondence between the target label information and the identifier of the first target adapter. After the obtaining a correspondence between label information and a first target adapter based on the target image, the method further includes: determining whether the label information is the same as the target label information; and if the label information is the same as the target label information, determining that the label information is the target label information.

It can be learned that, it can be recognized in batches based on the target image whether optical fiber connector bodies identified by using all the label information included in the target image are plugged in corresponding adapters, thereby improving recognition accuracy and recognition efficiency. In addition, in a recognition process, it is unnecessary to use a dedicated recognition apparatus to recognize whether the optical fiber connector assembly is plugged in the adapter corresponding to the optical fiber connector assembly, thereby reducing operation difficulty of the recognition and improving recognition efficiency.

With reference to the fourth aspect, in an optional implementation, the obtaining a correspondence between label information and a first target adapter based on the target image includes: obtaining a mark structure from the target image; determining location information of a target region in the target image, where a target relative location relationship exists between the target region and the mark structure, the target region corresponds to the first target adapter, and the target relative location relationship exists between the first target adapter and the mark structure; and obtaining label information in the target region.

With reference to the fourth aspect, in an optional implementation, after the determining location information of a target region in the label array based on the target relative location relationship, the method further includes: if the label information is not obtained in the target region, determining that the first target adapter is an adapter in which the optical fiber connector assembly is not plugged.

According to a fifth aspect, an embodiment of this application provides a computer readable storage medium. The storage medium stores a software program. When the software program is read and executed by one or more processors, the method provided in the fourth aspect can be implemented.

According to a sixth aspect, an embodiment of this application provides a chip. The chip includes a processor, configured to implement the method provided in the fourth aspect. The chip further includes a memory. The memory is configured to store program instructions and data that are executed by the processor.

DESCRIPTION OF EMBODIMENTS

The following clearly describes the technical solutions in embodiments of the present application with reference to the accompanying drawings in embodiments of the present application. It is clear that the described embodiments are merely a part rather than all of embodiments of the present application. All other embodiments obtained by persons skilled in the art based on embodiments of the present application without creative efforts shall fall within the protection scope of the present application.

This application provides an optical fiber connector assembly. Based on the optical fiber connector assembly provided in this application, the optical fiber connector assembly can be accurately and efficiently recognized, to effectively ensure that the optical fiber connector assembly can accurately transmit an optical signal. To better understand the optical fiber connector assembly provided in this application, the following first describes an optical network system to which the optical fiber connector assembly is applied.

Figure 1:
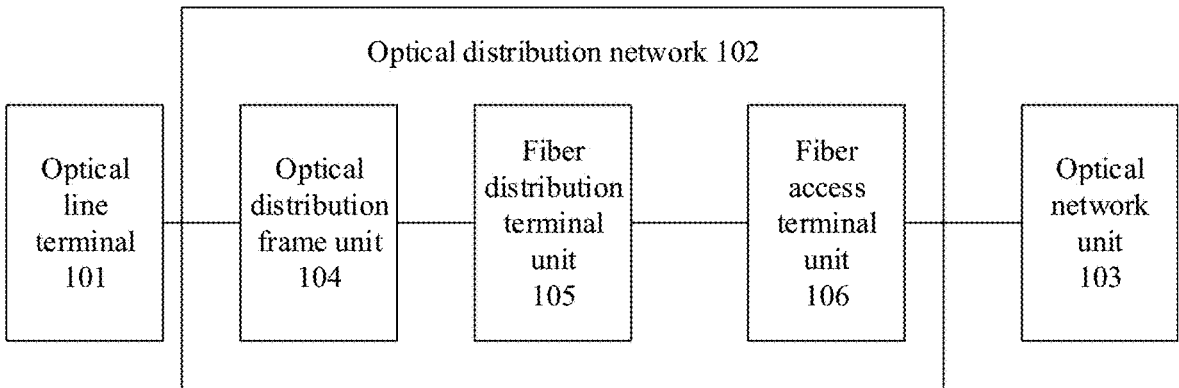
FIG. 1 is a schematic diagram of a structure of an embodiment of an optical network according to this application.

FIG. 1 is a schematic diagram of a structure of an embodiment of an optical network according to this application. It can be learned from FIG. 1 that an example in which an optical fiber connector assembly is applied to a passive optical network (PON) system is used for description in this application.

The PON system includes an optical line terminal (OLT) 101. The OLT 101 is configured to provide a network-side interface for an optical access network (OAN). The OLT 101 is connected to a network-side device (for example, a switch or a router) at an upper layer, and is connected to one or more optical distribution networks (ODN) 102 at a lower layer.

The ODN 102 includes a passive optical splitter for optical power allocation and a feeder optical cable connected between the passive optical splitter and the OLT 101. The feeder optical cable is configured to implement optical signal transmission between the OLT 101 and the ODN 102. The ODN 102 further includes a branch optical cable connected between the passive optical splitter and an optical network unit (ONU) 103. The branch optical cable is configured to implement optical signal transmission between the ODN 102 and the ONU 103.

When the OLT 101 needs to transmit a downlink optical signal to the ONU 103, the ODN 102 transmits the downlink optical signal from the OLT 101 to each ONU by using the passive optical splitter. Similarly, when the ONU 103 needs to transmit an uplink optical signal to the OLT 101, the ODN aggregates the uplink optical signal from the ONU 103 and then transmits the uplink optical signal to the OLT 101.

The ONU 103 provides a user-side interface for the OAN and is connected to the ODN 102. If the ONU 103 also provides a user port function, for example, the ONU provides an Ethernet user port or a plain old telephone service (POTS) user port, the ONU is referred to as an optical network terminal (ONT). In this application, the ONU or the ONT is collectively referred to as an optical network unit ONU.

To implement optical signal transmission, an optical cable output from the OLT 101 is connected to an optical distribution frame (ODF) unit 104 included in the ODN 102. The ODF unit 104 may include one or more ODFs.

Based on allocation of the ODF unit 104, the output optical cable is connected to a fiber distribution terminal (FDT) unit 105. The FDT unit 105 may include one or more FDTs.

The FDT unit 105 is configured to perform secondary allocation on an optical cable. A management range of the FDT unit 105 may be a cell, a street, or a building. A quantity of optical fiber connector assemblies connected to the FDT unit 105 may be selected based on a quantity of users that the FDT unit 105 needs to manage.

The FDT unit 105 is connected to a fiber access terminal (FAT) unit 106 by using the optical cable. The FAT unit 106 includes one or more FATs.

The FAT unit 106 is connected to the ONU 103. The FAT unit 106 is a user access point used to connect to a drop optical cable. The drop optical cable indicates an optical cable segment from the FAT unit 106 to a home of a user.

The optical fiber connector assembly provided in this application may be connected to a fiber patch cord, a fiber pigtail, or a similar scenario. This example uses an example in which the optical fiber connector assembly is applied to two sides of the fiber patch cord. In other words, two ends of one fiber patch cord are respectively connected to two optical fiber connector assemblies. The fiber patch cord may be applied to the ODF unit 104, the FDT unit 105, or the FAT unit 106. This is not specifically limited.

For example, the fiber patch cord is connected in any one of the following scenarios:

The fiber patch cord is connected between two mutually connected ODFs included in the ODF unit 104, connected between different adapters of the same ODF, connected between the OLT 101 and the ODF, connected between two mutually connected FDTs included in the FDT unit 105, connected between different adapters of the same FDT, connected between two mutually connected FATs included in the FAT unit 106, connected between the FAT unit 106 and an access terminal box (ATB), or connected between the FAT unit 106 and the ONU 103.

The following uses an example in which two ends of the fiber patch cord are connected between different adapters of the same FDT for description.

The two ends of the fiber patch cord are respectively connected to a first optical fiber connector assembly and a second optical fiber connector assembly. It can be learned that the first optical fiber connector assembly and the second optical fiber connector assembly are connected to different adapters of the same FDT, for example, an adapter A and an adapter B.

When the first optical fiber connector assembly connected to the fiber patch cord is accurately plugged in the adapter A, and the second optical fiber connector connected to the fiber patch cord is accurately plugged in the adapter B, optical signal transmission through the fiber patch cord is effectively ensured.

If the first optical fiber connector assembly is not plugged in the adapter A, and/or the second optical fiber connector is not plugged in the adapter B, optical signal transmission cannot be implemented through the fiber patch cord.

However, by using the optical fiber connector assembly provided in this application, efficiency and accuracy of recognizing whether the optical fiber connector assembly is accurately plugged in a corresponding adapter can be effectively improved. The optical fiber connector assembly provided in this application has a plurality of embodiments for implementation. For better understanding, the following describes the embodiments one by one.

It should be noted that embodiments shown in this application are merely intended for describing the technical solutions of the present application other than limiting the present application. Although the present application is described in detail with reference to the following embodiments, persons of ordinary skill in the art should understand that they may still make modifications to the technical solutions described in the following embodiments or make equivalent replacements to some technical features thereof. Such modifications or replacements do not make the essence of the corresponding technical solutions depart from the scope of the technical solutions of embodiments of the present application.

Embodiment 1

Figure 2:
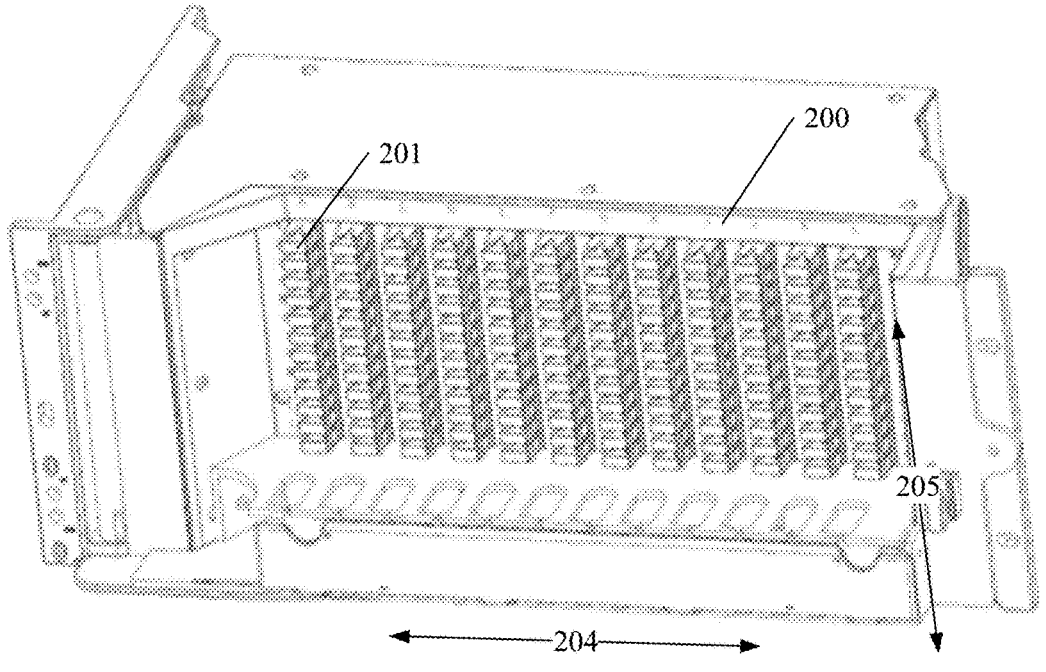
FIG. 2 is a schematic diagram of a structure of an embodiment of a network node in Embodiment 1 according to this application.
Figure 3:
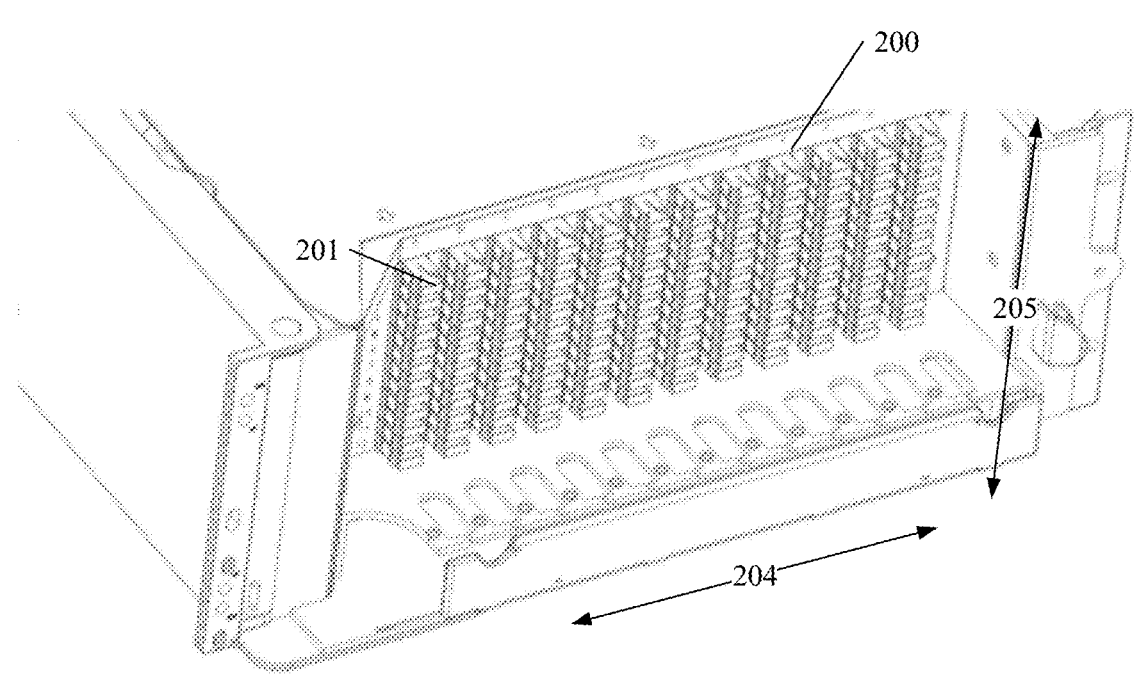
FIG. 3 is a schematic diagram of a structure of another embodiment of a network node in Embodiment 1 according to this application.
Figure 4:
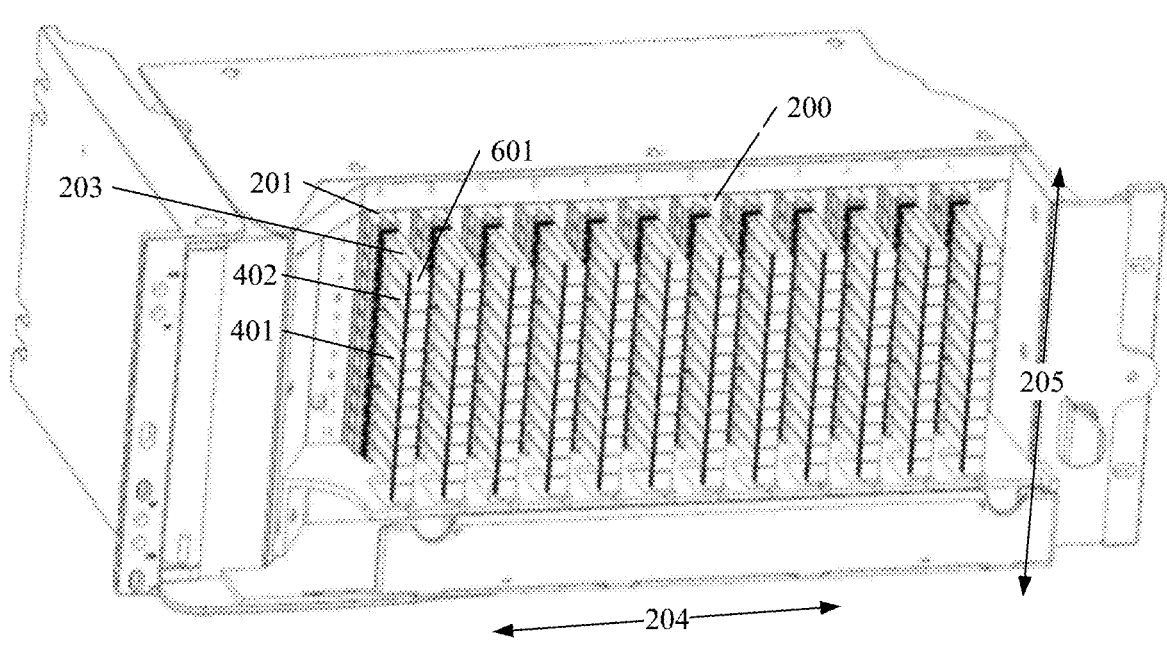
FIG. 4 is a schematic diagram of a structure of an embodiment of a network node with a plugged optical fiber connector assembly in Embodiment 1 according to this application.

First, FIG. 2, FIG. 3, and FIG. 4 show a network node, and are diagrams of a structure of the network node in different perspectives. The network node shown in this embodiment may be an OLT, an ONU, an ODF, an FDT, or an FAT. A specific type of the network node is not limited in this embodiment.

The network node includes a subrack 200. A plurality of adapters are fixed on the subrack 200. The adapter is configured to mount and fix an optical fiber connector assembly, for example, an optical fiber connector assembly 203, an optical fiber connector assembly 401, and an optical fiber connector assembly 402 shown in FIG. 4.

Specifically, an adapter 201 included in the subrack is used as an example. The adapter 201 has a connection interface. The connection interface is configured to mount and fix the optical fiber connector assembly 203. In a state in which the optical fiber connector assembly 203 is plugged in the adapter 201, optical signal exchange can be performed between the optical fiber connector assembly 203 and the network node.

The subrack 200 shown in this embodiment may be a high-density subrack. The high-density subrack indicates that a plurality of optical fiber connector assemblies are plugged in a unit region of a subrack panel, and a gap between adjacent optical fiber connector assemblies is very small. The following describes an arrangement manner of the high-density subrack.

The plurality of adapters included in the subrack 200 form an adapter array. The adapter array includes N rows of adapters arranged in a horizontal direction 204 of the subrack 200. The adapter array further includes M columns of adapters arranged in a vertical direction 205 of the subrack 200. The horizontal direction 204 is perpendicular to the vertical direction 205. Specific values of M and N are not limited in this embodiment.

It can be learned that in the high-density subrack, a gap between optical fiber connectors at adjacent locations is very small. In this case, a process of recognizing each optical fiber connector assembly is easily interfered with by another optical fiber connector assembly. As a result, the optical fiber connector assembly cannot be accurately recognized. When the optical fiber connector assembly shown in this embodiment is used, a recognition process is not interfered with by another optical fiber connector assembly, thereby improving accuracy of recognizing each optical fiber connector assembly. The following describes a specific structure of the optical fiber connector assembly 203 shown in this embodiment.

Figure 5:
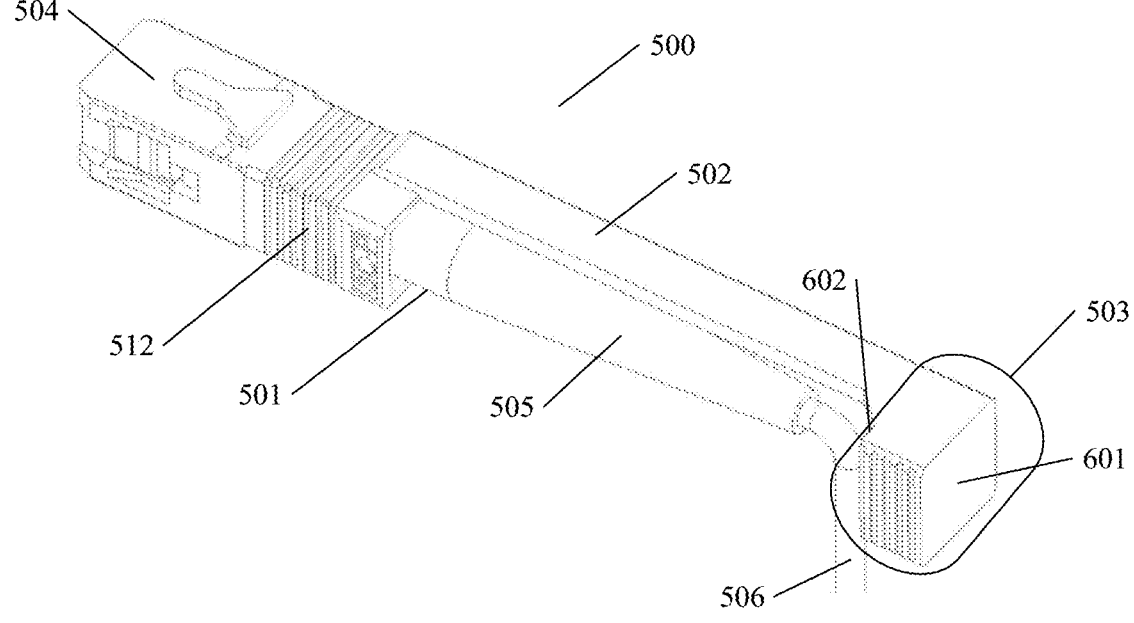
FIG. 5 is a schematic diagram of a structure of an embodiment of an optical fiber connector assembly in Embodiment 1 according to this application.
Figure 6:
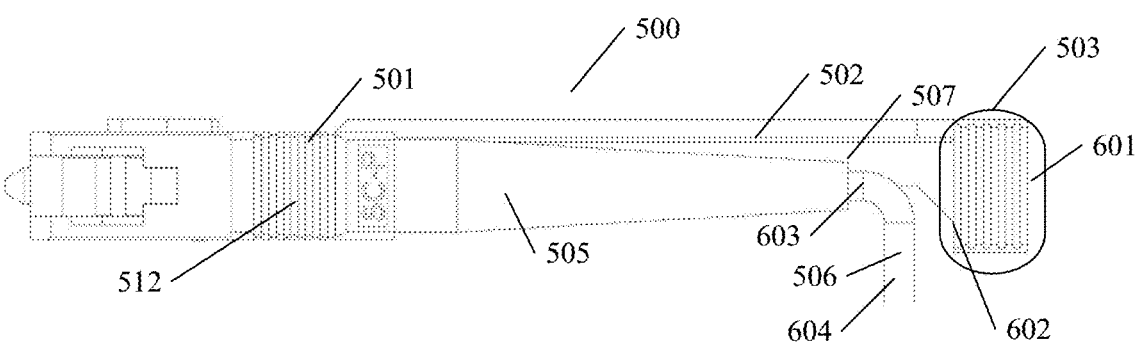
FIG. 6 is a schematic diagram of a structure of another embodiment of an optical fiber connector assembly in Embodiment 1 according to this application.
Figure 7:
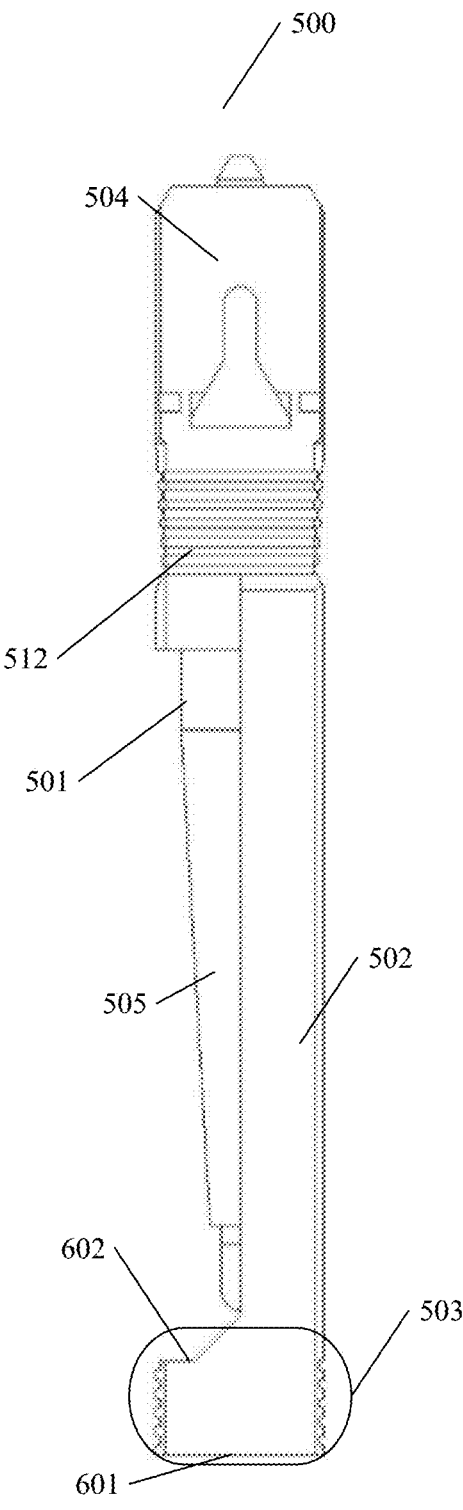
FIG. 7 is a schematic diagram of a structure of another embodiment of an optical fiber connector assembly in Embodiment 1 according to this application.

With reference to FIG. 5 to FIG. 7, an optical fiber connector assembly 500 includes an optical fiber connector body 501, a connecting piece 502, and a label module 503.

The optical fiber connector body 501 has a plug 504, a middle part 512, and a rear retainer 505. The middle part 512 is connected between the plug 504 and the rear retainer 505. The rear retainer 505 is connected to an optical cable 506. The optical cable 506 is connected to an optical cable located inside the optical fiber connector body 501, to implement optical signal transmission. The plug 504 is configured to be plugged in an adapter, to implement connection between the optical fiber connector assembly 500 and the adapter.

The connecting piece 502, the label module 503, and the plug 504 shown in this embodiment are an integrally molded structure; or the connecting piece 502, the label module 503, the plug 504, and the middle part 512 are an integrally molded structure; or the connecting piece 502, the label module 503, and the middle part 512 are an integrally molded structure.

The connecting piece 502 is separately connected to the optical fiber connector body 501 and the label module 503. Specifically, a first end of the connecting piece 502 is connected to the plug 504, and a second end of the connecting piece 502 is connected to the label module 503. In addition, the second end of the connecting piece 502 shown in this embodiment is located close to the rear retainer 505. An accommodation channel 507 (as shown in FIG. 6) is formed between the plug 504, the connecting piece 502, and the label module 503. The accommodation channel 507 is used to accommodate the rear retainer 505 and some optical cables 506 connected to the rear retainer 505.

A type of the optical fiber connector body 501 in this embodiment is not limited. For example, the type of the optical fiber connector body 501 shown in this embodiment is any one of the following:

a ferrule connector (FC)-type optical fiber connector, a square connector (SC)-type optical fiber connector, a lucent connector (LC)-type optical fiber connector, a straight tip (ST)-type optical fiber connector, a fiber distributed data interface (FDDI)-type optical fiber connector, or the like.

Figure 8:
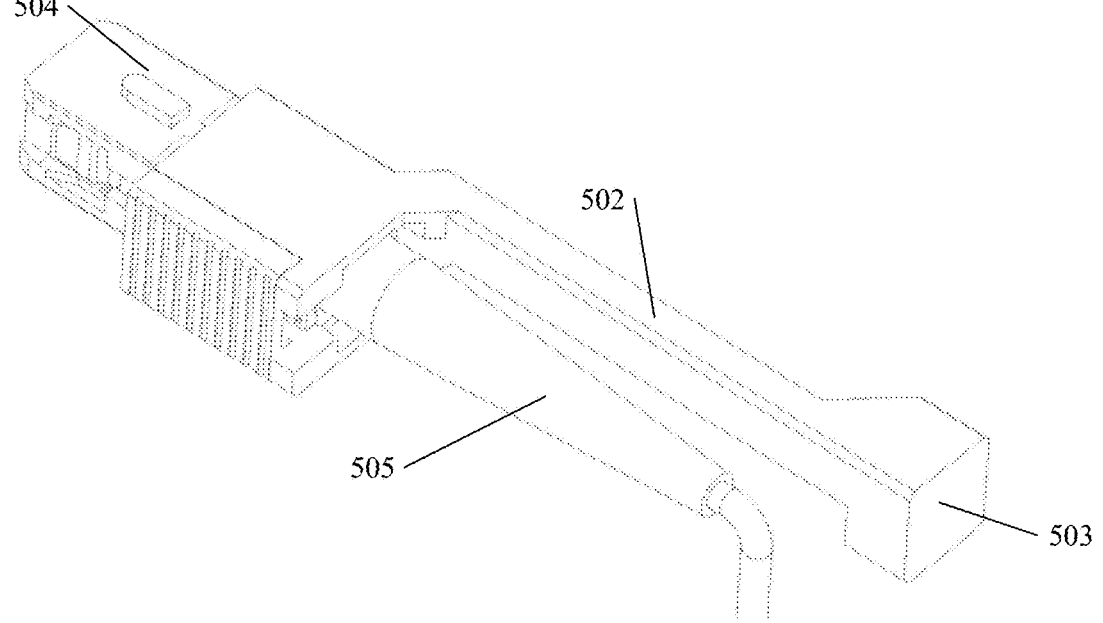
FIG. 8 is a schematic diagram of a structure of another embodiment of an optical fiber connector assembly in Embodiment 1 according to this application.

It should be noted that this embodiment is described by using an example in which the accommodation channel 507 is formed between the plug 504, the connecting piece 502, and the label module 503. In another example, as shown in FIG. 8, the rear retainer 505 is not accommodated between the plug 504, the connecting piece 502, and the label module 503.

The label module 503 shown in this embodiment is configured to indicate the optical fiber connector body 501. Specifically, the label module 503 has a target surface 601. The target surface 601 is opposite to a location of the optical fiber connector body 501. The target surface 601 is used to set label information. The label information is used to identify the optical fiber connector body 501.

First, a location relationship between opposite locations of the target surface 601 and the optical fiber connector body 501 is described as follows:

Specifically, the label module 503 shown in this embodiment has an inner surface 602. The inner surface 602 is disposed opposite to the location of the optical fiber connector body 501, that is, the inner surface 602 is disposed toward the optical fiber connector body 501. The target surface 601 and the inner surface 602 are two side surfaces at opposite locations of the label module 503. It can be learned from further description of orientations that the inner surface 602 faces inward relative to the location of the optical fiber connector body 501, and the target surface 601 faces outward relative to the location of the optical fiber connector body 501.

For better understanding of the location relationship between the opposite locations of the target surface 601 and the optical fiber connector body 501, the following is described with reference to FIG. 9.

Figure 9:
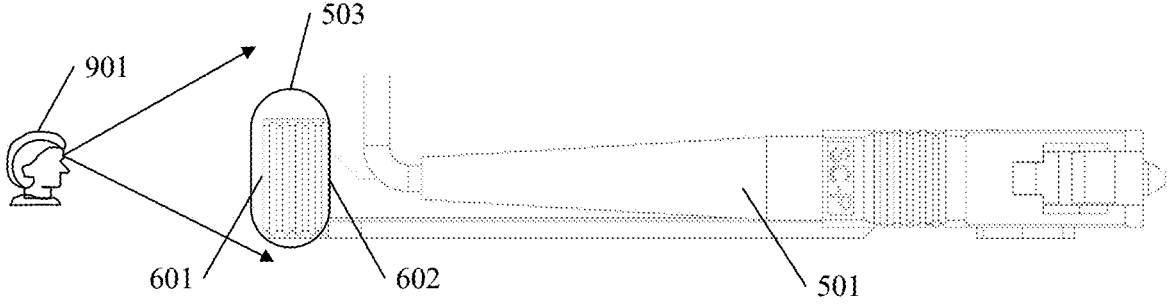
FIG. 9 is a schematic diagram of an application scenario of an optical fiber connector assembly in Embodiment 1 according to this application.

As shown in FIG. 9, if the label module 503 is within a line-of-sight range of a human eye 901, the target surface 601 that faces outward is a visible surface to the human eye 901, and the inner surface 602 that faces inward is an invisible surface to the human eye 901.

It can be learned that the target surface 601 is opposite to the location of the optical fiber connector body 501. Because the target surface 601 has a blocking function to a line of sight of the human eye 901, all or a part of the optical fiber connector body 501 is invisible to the human eye 901.

This embodiment is described by using an example in which the target surface 601 blocks the human eye 901, and consequently all or a part of the optical fiber connector body 501 is invisible to the human eye 901. This is not limited. Alternatively, as shown in FIG. 8, the target surface 601 does not block the human eye 901, so that the optical fiber connector body 501 can be within a visual range of the human eye. This is not specifically limited in this embodiment, provided that the orientation of the target surface 601 is outward.

In this embodiment, if the subrack 200 is all within a visual range of the human eye 901, target surfaces of various optical fiber connector assemblies plugged in the subrack 200 are all within the visual range of the human eye 901.

The foregoing is described by using an example in which the target surface 601 is within the line-of-sight range of the human eye 901. The target surface 601 shown in this embodiment is further within a photographing range of the camera.

Figure 10:
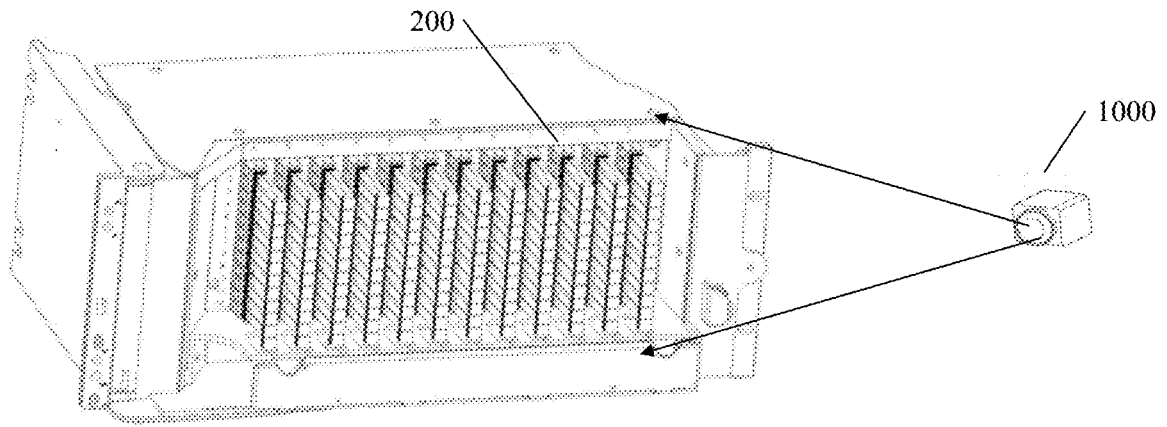
FIG. 10 is a schematic diagram of another application scenario of an optical fiber connector assembly in Embodiment 1 according to this application.

As shown in FIG. 10, if a surface of the subrack 200 is within a photographing range of the camera 1000, specifically, if no optical fiber connector assembly is plugged in the subrack 200, the camera 1000 photographs the surface of the subrack 200, and an obtained target image includes each adapter included in the subrack 200.

If one or more optical fiber connector assemblies are plugged in the subrack 200, the camera 1000 photographs the surface of the subrack 200, and an obtained target image can fully and clearly capture label information set on each target surface 601.

It can be learned from the foregoing description that the target surface 601 shown in this embodiment is within the visual range of the human eye and/or within the photographing range of the camera. The following is described by using an example in which the target surface 601 shown in this embodiment is within the range of the camera.

In order that the target surface 601 is within the photographing range of the camera, in this embodiment, the target surface 601 is parallel with the surface of the subrack 200 (as shown in FIG. 4). In another example, an included angle between the target surface 601 and the surface of the subrack 200 may also be an obtuse angle. In this embodiment, a specific angle is not limited, provided that the target surface 601 is within the photographing range.

It should be noted that this embodiment is described by using an example in which the target surface 601 is a planar structure. In another example, the target surface 601 may also be a curved surface or a surface in any other shape, provided that the label information set on the target surface 601 is within the photographing range.

In this embodiment, a plurality of optical fiber connector assemblies may be plugged in the subrack 200. This embodiment is described by using an example in which included angles between the surface of the subrack 200 and the target surfaces 601 of the label modules 503 of the optical fiber connector assemblies are equal. It can be learned that in this embodiment, the target surfaces 601 have a uniform orientation. For example, the target surfaces 601 are all parallel with the surface of the subrack 200, and the target surfaces 601 are located at the same surface, to facilitate photographing performed by the camera. In this way, it is effectively ensured that images of the subrack 200 photographed by the camera can fully and clearly capture the label information. In another example, the included angles between the surface of the subrack 200 and the target surfaces 601 of the different label modules may be alternatively not equal, provided that the target surfaces 601 are all within the photographing range.

Specifically, that the target surfaces 601 have the uniform orientation may further indicate that the plurality of target surfaces 601 of the plurality of optical fiber connector assemblies plugged in the subrack 200 are located at the same surface. The same surface may be a planar structure, a curved surface structure, or a concave and convex structure. This is not specifically limited, provided that the plurality of pieces of label information at the same surface are within the visual range or the photographing range.

Optionally, for the label information shown in this embodiment, the label information may be set on the target surface 601 during delivery of the optical fiber connector assembly, or the label information may be set on the target surface 601 during subsequent use of the optical fiber connector assembly.

In this embodiment, the label information used to identify the optical fiber connector body 501 is set on the target surface 601. This embodiment does not limit the label information, provided that the label information can be used to uniquely identify the optical fiber connector body 501. In other words, different label information is used to identify different optical fiber connector bodies 501. For example, the label information may be a two-dimensional barcode, a unique identifier, a barcode, digital text information, or the like that is used to uniquely identify the optical fiber connector body 501.

It can be learned from the foregoing that the target surfaces 601 of the label modules 503 are all within the photographing range, and the target image is obtained through photographing the subrack 200 by the camera. In this case, the label information of the optical fiber connector assemblies plugged in the subrack 200 may be obtained based on the target image. The optical fiber connector bodies 501 identified by using the label information may be determined based on the label information. It can be learned that the optical fiber connector body 501 is recognized based on the label information shown in this embodiment, thereby effectively improving efficiency of recognizing the optical fiber connector body 501.

The label information on the target surface 601 shown in this embodiment is used to uniquely identify the optical fiber connector body 501. Therefore, the label information needs to be complete and clear. In the photographing range, the label information cannot be blocked. Otherwise, when the label information is blocked, the camera cannot obtain clear and complete label information. This directly causes the following case: The optical fiber connector body 501 identified by using the label information cannot be accurately determined. However, the optical fiber connector assembly shown in this embodiment can be used to effectively prevent the label information from being blocked. Specifically, in this embodiment, the label information can be prevented from being blocked in the following two manners:

Manner 1

The optical cable 506 connected to the rear retainer 505 extends in a direction of the accommodation channel 507. For specific description of the accommodation channel 507, refer to FIG. 6 for details. Details are not described herein again. Still with reference to FIG. 6, it can be learned that the optical cable 506 has a first extension part 603 and a second extension part 604, one end of the first extension part 603 is connected to the rear retainer 505, the other end of the first extension part 603 is connected to the second extension part 604, and the first extension part 603 extends inside the accommodation channel 507 in an axial direction of the optical fiber connector body 501. There is a specific included angle between the first extension part 603 and the second extension part 604, so that the second extension part 604 can protrude from the accommodation channel 507. There is a specific gap between each of the first extension part 603 and the second extension part 604 and the inner surface 602 of the label module 503. In this way, extension paths of the first extension part 603 and the second extension part 604 are both isolated from the target surface 601. In other words, a non-coplanar state exists between each of the extension paths of the first extension part 603 and the second extension part 604 and the target surface 601. It can be learned that in the photographing range, the optical cable 506 does not block the label information, to effectively ensure that the camera obtains clear and complete label information.

Manner 2

In this manner, when the plurality of optical fiber connector assemblies are plugged in the subrack 200, the optical cable connected to the first optical fiber connector assembly does not block label information of another optical fiber connector assembly on the subrack 200, that is, the second optical fiber connector assembly.

The following example is used for description: The first optical fiber connector assembly 401 shown in FIG. 4 is located in a first column in an optical fiber connector assembly array. The optical fiber connector assembly array includes all the optical fiber connector assemblies plugged in the subrack. It should be noted that description of the location of the first optical fiber connector assembly 401 in the optical fiber connector assembly array in this embodiment is an optional example instead of limitation. In other words, the first optical fiber connector assembly 401 may be located at any location in the optical fiber connector assembly array.

The second optical fiber connector assembly shown in this embodiment indicates that a path of an optical cable connected to the second optical fiber connector assembly passes through the first optical fiber connector assembly 401. For example, description is described by using an example in which the second optical fiber connector assembly 402 and the first optical fiber connector assembly 401 are located in the same column in the optical fiber connector assembly array, and the second optical fiber connector assembly 402 is located above the first optical fiber connector assembly 401.

Optionally, in another example, the second optical fiber connector assembly 402 and the first optical fiber connector assembly 401 may be alternatively in the same column in the optical fiber connector assembly array.

Figure 11:
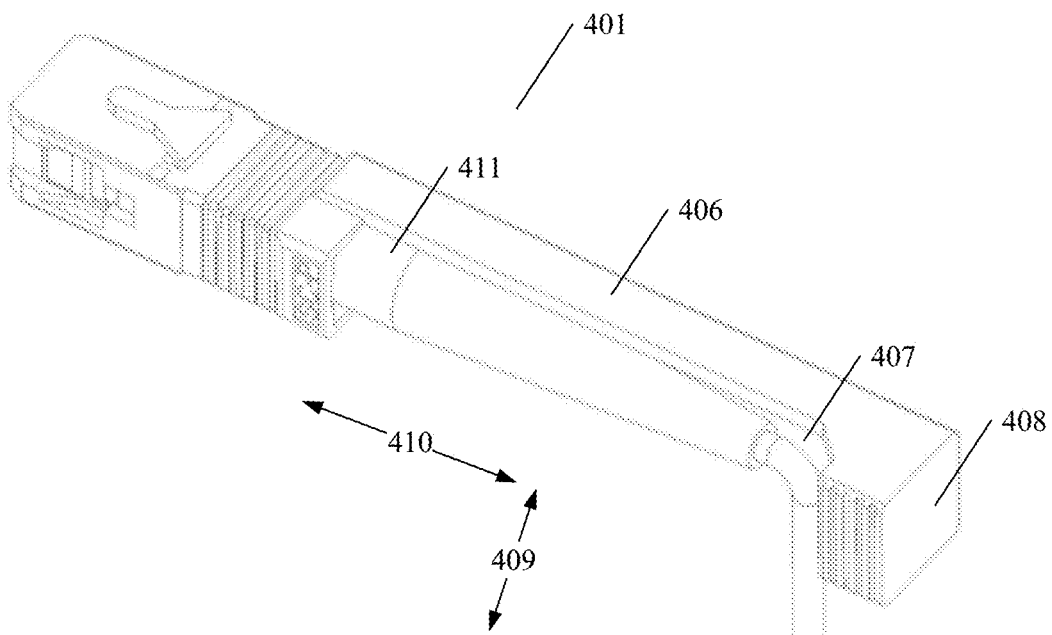
FIG. 11 is a schematic diagram of a structure of another embodiment of an optical fiber connector assembly in Embodiment 1 according to this application.

As shown in FIG. 11, an outer wall of the connecting piece 406 of the first optical fiber connector assembly 401 shown in this embodiment curves inward to form a cabling channel 407. The cabling channel 407 is used to avoid an extension direction of the optical cable connected to the second optical fiber connector assembly 402, thereby effectively avoiding a possibility that a hard contact occurs between the optical cable connected to the second optical fiber connector assembly 402 and the first optical fiber connector assembly 401. In this way, safety of the optical cable connected to the second optical fiber connector assembly 402 is effectively improved.

In addition, the optical cable connected to the second optical fiber connector assembly 402 can be limited to the cabling channel 407 by using the cabling channel 407, to effectively avoid a case in which the optical cable connected to the second optical fiber connector assembly 402 blocks the label information 408. Therefore, clarity and integrity of the label information 408 are effectively ensured.

This embodiment does not limit a manner of forming the cabling channel, provided that the cabling channel can avoid an optical cable connected to another optical fiber connector assembly. As shown in FIG. 11, for example, the connecting piece 406 curves inward in a direction 409 to form the cabling channel 407. A direction 410 is an axial direction of the optical fiber connector body 411. The direction 409 is a direction perpendicular to the direction 410. In another example, the connecting piece 406 may also curve inward in the direction 410 to form the cabling channel.

When the optical fiber connector assembly shown in this embodiment is used, the label information is set for the label module of the optical fiber connector assembly, and the optical fiber connector body can be uniquely identified by using the label information. The label information is within the photographing range or the line-of-sight range. The optical fiber connector body can be accurately recognized based on the label information.

In addition, the label information can be further used to recognize whether the optical fiber connector body identified by using the label information is accurately plugged in the corresponding adapter, thereby improving accuracy of recognizing whether the optical fiber connector body is accurately plugged in the corresponding adapter.

Because the label information of each optical fiber connector assembly plugged in the subrack is within the photographing range, the target image including each piece of label information may be obtained through photographing the subrack by a terminal device (for example, a smartphone) with a camera. Each optical fiber connector body identified by using each piece of label information in the target image may be recognized based on the target image. Recognition does not need to be performed by using a dedicated apparatus. The costs and complexity of recognizing the optical fiber connector body identified by using the label information are effectively reduced. Each optical fiber connector body identified by using each piece of label information included in the target image is recognized, thereby improving recognition efficiency.

By using the accommodation channel and the cabling channel disposed in the optical fiber connector assembly shown in this embodiment, the optical cable is effectively prevented from blocking the label information within the photographing range. Therefore, clarity and integrity of the label information are effectively ensured, to improve accuracy of recognizing the optical fiber connector body based on the label information.

As shown in this embodiment, the connecting piece, the label module, and the plug of the optical fiber connector assembly are an integrally molded structure; or the connecting piece, the label module, the plug, and the middle part are an integrally molded structure; or the connecting piece, the label module, and the middle part are an integrally molded structure. The integrally molded structure forms a housing, to effectively improve stability of a structure of the optical fiber connector assembly. Therefore, in a subsequent use process of the network node, location deviation does not occur for the label information of the optical fiber connector assembly, to effectively ensure that the label information can be always within the line-of-sight range or the photographing range, thereby improving accuracy of recognizing the optical fiber connector body identified by using the label information.

In addition, for the optical fiber connector assembly, setting of the label information may be completed during delivery of the optical fiber connector assembly, to simplify operation steps at an operational site. An optical fiber connector is directly plugged in a corresponding adapter at the operational site, to improve efficiency of mounting the optical fiber connector assembly onto the subrack. Optionally, the label information may not be set during delivery of the optical fiber connector assembly, and the label information is set on the target surface of the optical fiber connector assembly at the operational site.

In an existing solution, the large quantity of optical fiber connector assemblies are plugged in the subrack. As a result, locations of different optical fiber connector assemblies are very close to each other. Therefore, recognizing the optical fiber connector assembly based on an existing RFID is interfered with by another close optical fiber connector assembly. For example, a recognition process is interfered with by an adjacent optical fiber connector assembly. For another example, a recognition process is interfered with by an optical cable in the subrack, thereby reducing efficiency of recognizing the optical fiber connector assembly.

In addition, a label array is formed in the subrack shown in this embodiment. The label array includes the label information of all the optical fiber connector assemblies plugged in the subrack. Because different optical fiber connector assemblies are all in the label array, and the label array is entirely within the visual range or the photographing range, the optical fiber connector assemblies can be recognized in a manner of viewing or photographing the label array. A recognition process is not interfered with by another optical fiber connector assembly or an optical cable, to improve recognition efficiency and recognition accuracy.

Embodiment 2

Figure 12:
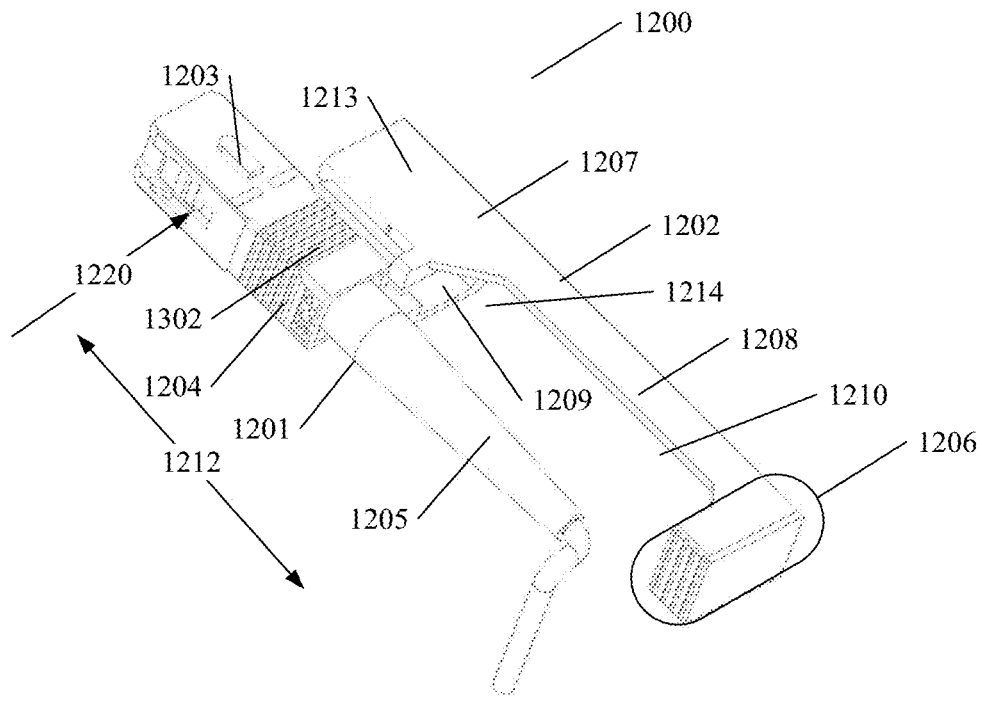
FIG. 12 is a schematic exploded diagram of a structure of an embodiment of an optical fiber connector assembly in Embodiment 2 according to this application.
Figure 13:
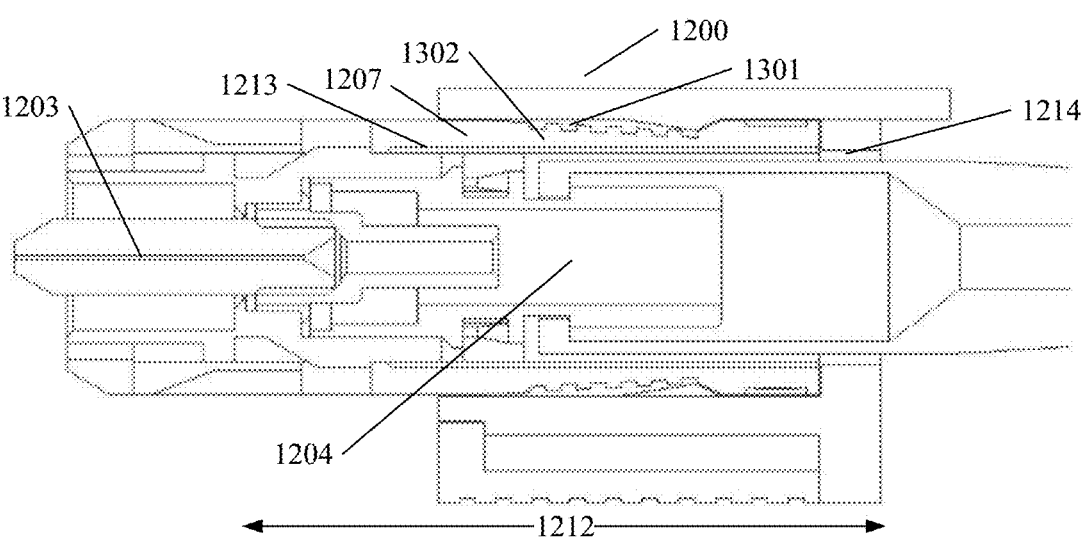
FIG. 13 is a schematic diagram of a local cross-sectional structure of an embodiment of an optical fiber connector assembly in Embodiment 2 according to this application.
Figure 14:
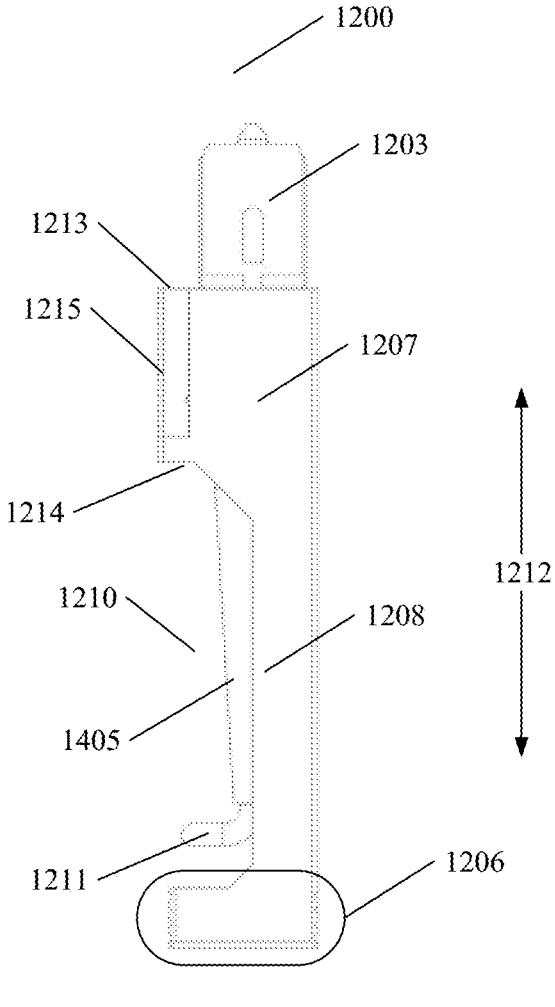
FIG. 14 is a schematic diagram of a structure of an embodiment of an optical fiber connector assembly in Embodiment 2 according to this application.

A housing of the optical fiber connector assembly shown in Embodiment 1 is an integrally molded structure. The optical fiber connector assembly shown in Embodiment 2 is a separable connection structure. By using the structure of the optical fiber connector assembly shown in this embodiment, free collocation and mounting may be implemented between the optical fiber connector body and the label component according to a requirement, to improve a degree of freedom of assembling the optical fiber connector assembly. For a specific structure of the optical fiber connector assembly shown in this embodiment, refer to FIG. 12 to FIG. 14.

An optical fiber connector assembly 1200 shown in this embodiment includes an optical fiber connector body 1201 and a label component 1202.

The following describes a structure of the optical fiber connector body 1201. For description of a type of the optical fiber connector body 1201 shown in this embodiment, refer to Embodiment 1. Details are not described again.

Specifically, the optical fiber connector body 1201 includes a plug 1203, a middle part 1204, and a rear retainer 1205 that are sequentially connected. The plug 1203 is configured to be plugged in an adapter in a subrack. For specific description of the subrack and the adapter, refer to Embodiment 1 for details. Details are not described again.

The middle part 1204 shown in this embodiment is connected between the plug 1203 and the rear retainer 1205. For specific description of the rear retainer 1205, refer to Embodiment 1 for details. Details are not described again.

The following describes a structure of the label component 1202.

The label component 1202 shown in this embodiment includes a connecting piece and a label module 1206 connected to the connecting piece. For specific description of the label module 1206, refer to Embodiment 1 for details. Details are not described again.

The connecting piece includes a mounting groove 1207 and an extension rod 1208. One end of the extension rod 1208 is connected to the mounting groove 1207, and the other end of the extension rod 1208 is connected to the label module 1206. The mounting groove 1207 shown in this embodiment is configured to mount and fix the middle part 1204.

With reference to a specific structure of the mounting groove 1207, the following describes how the mounting groove 1207 specifically mounts and fixes the middle part 1204 to implement connection between the label component and the optical fiber connector body 1201.

The mounting groove 1207 shown in this embodiment has concave plugging space 1209. The plugging space 1209 is used to mount and fix the middle part 1204.

In a state in which the middle part 1204 is plugged in the mounting groove 1207, an accommodation channel 1210 is formed between the mounting groove 1207, the extension rod 1208, and the label module 1206. The accommodation channel 1210 is used to accommodate the rear retainer 1205 and some optical cables 1211 connected to the rear retainer 1205.

The mounting groove 1207 shown in this embodiment has a first channel opening 1213 and a second channel opening 1214 at opposite locations in an axial direction 1212 of the optical fiber connector body 1201. It can be learned that the first channel opening 1213 and the second channel opening 1214 are both connected to the plugging space 1209, the plug 1203 protrudes from the mounting groove 1207 by using the first channel opening 1213, and the second channel opening 1214 is connected to the accommodation channel 1210, so that the rear retainer 1205 protruding from the second channel opening 1214 can be accommodated in the accommodation channel 1210.

Specifically, the mounting groove 1207 has an opening 1215. Specifically, the opening 1215 is disposed at an end face that is of the mounting groove 1207 and that is opposite to the connecting piece. The opening 1215 is connected to the plugging space 1209. The opening 1215 extends in the axial direction 1212 of the optical fiber connector body 1201.

In a process of mounting the optical fiber connector body 1201 and the label component, the middle part 1204 of the optical fiber connector body 1201 may be moved in a direction 1220 toward the opening 1215 relative to the mounting groove 1207 until the middle part 1204 is plugged in the mounting groove 1207, to implement connection between the middle part 1204 and the mounting groove 1207. In addition, in a state in which the middle part 1204 is plugged in the plugging space 1209, the plug 1203 protrudes from the mounting groove 1207 by using the first channel opening 1213, and the rear retainer 1205 protrudes from the mounting groove 1207 by using the second channel opening 1214, so that the rear retainer 1205 and some optical cables connected to the rear retainer 1205 can be accommodated in the accommodation channel 1210.

The following describes how to implement fixing for the middle part 1204 and the mounting groove 1207.

A clamping protrusion 1301 is disposed on a groove wall of the mounting groove 1207. A clamping groove 1302 is disposed on the middle part 1204.

In a state in which the middle part 1204 is plugged in the plugging space 1209 by using the opening 1215 of the mounting groove 1207, the clamping protrusion 1301 is clamped and fixed in the clamping groove 1302.

This embodiment uses an example in which the mounting groove 1207 and the middle part 1204 are connected in a clamping fixing manner. In another example, the mounting groove 1207 and the middle part 1204 may be connected in any manner such as a magnetic connection manner, an elastic connection manner, or an adhesive manner.

Specifically, the magnetic connection manner may be as follows: A first magnetic part is disposed on an inner wall of the mounting groove 1207, and a second magnetic part is disposed on an outer wall of the middle part 1204. The first magnetic part and the second magnetic part have different magnetic poles. Therefore, in a state in which the first magnetic part and the second magnetic part are attracted and connected, the middle part 1204 is plugged and fixed in the mounting groove 1207.

The elastic connection manner may be as follows: The mounting groove 1207 is made of an elastic material. A gap of the opening 1215 of the mounting groove 1207 may be changed under a function of an external force. In a state in which the middle part 1204 is plugged in the mounting groove 1207, the mounting groove 1207 and the middle part 1204 are fit in a swelling manner.

The adhesive manner may be as follows: An adhesive layer may be disposed between the mounting groove 1207 and the middle part 1204. Connection between the inner wall of the mounting groove 1207 and the outer wall of the middle part 1204 is implemented by using the adhesive layer.

It should be noted that a connection manner between the mounting groove 1207 and the middle part 1204 is not limited in this embodiment, provided that separable connection can be implemented between the mounting groove 1207 and the middle part 1204.

In this embodiment, in a state in which the middle part 1204 is plugged in the plugging space 1209, label information of the label module 1206 is within a visual range or a photographing range. For specific description of the label information within the visual range and the photographing range, refer to Embodiment 1 for details. Details are not described again.

When the optical fiber connector assembly shown in this embodiment is used, by using the accommodation channel 1210 and a cabling channel disposed in the optical fiber connector assembly, the label information of the label module 1206 can be effectively prevented from being blocked within the photographing range. For specific description of the accommodation channel 1210 and the cabling channel, refer to Embodiment 1. Details are not described again.

When the optical fiber connector assembly shown in this embodiment is used, the label information is set for the label module of the optical fiber connector assembly, and the optical fiber connector body can be uniquely identified by using the label information. The label information is within the photographing range or the line-of-sight range. It can be recognized based on the label information whether the optical fiber connector body identified by using the label information is accurately plugged in a corresponding adapter, to improve accuracy of recognizing whether the optical fiber connector body is accurately plugged in the corresponding adapter.

Because the label information of each optical fiber connector assembly plugged in the subrack is within the photographing range, a target image including each piece of label information may be obtained through photographing the subrack by a terminal device (for example, a smartphone) with a camera. Each optical fiber connector body identified by using each piece of label information in the target image may be recognized based on the target image. Recognition does not need to be performed by using a dedicated apparatus. The costs and complexity of recognizing the optical fiber connector body identified by using the label information are effectively reduced. Each optical fiber connector body identified by using each piece of label information included in the target image is recognized, thereby improving recognition efficiency.

By using the accommodation channel and the cabling channel disposed in the optical fiber connector assembly shown in this embodiment, the optical cable is effectively prevented from blocking the label information within the photographing range. Therefore, clarity and integrity of the label information are effectively ensured, to improve accuracy of recognizing the optical fiber connector body based on the label information.

The optical fiber connector assembly shown in this embodiment is a separable connection structure. The label component may be connected to the optical fiber connector body according to a requirement during delivery or at an operational site, to improve a degree of freedom of connection between the optical fiber connector body and the label component.

In this embodiment, the middle part of the optical fiber connector body is plugged in the mounting groove, to implement connection between the label component and the optical fiber connector body, thereby reducing operation difficulty of connecting the label component to the optical fiber connector body and improving operation efficiency.

In addition, because a structure between the label component and the optical fiber connector body is stable, stability of the structure of the optical fiber connector assembly is effectively improved. Therefore, in a subsequent use process of a network node, location deviation does not occur for the label information of the optical fiber connector assembly, to effectively ensure that the label information can be always within the line-of-sight range or the photographing range, thereby improving accuracy of recognizing the optical fiber connector body identified by using the label information.

For the optical fiber connector assembly in FIG. 15 to FIG. 28, surfaces on two sides of a target surface of the label component may be held between fingers of a hand, and a plugging force and an unplugging force are transferred to the optical fiber connector body by using an extension rod, to achieve a purpose of remotely plugging the optical fiber connector assembly in the adapter and remotely unplugging the optical fiber connector assembly from the adapter. It can be learned that in a process of plugging and unplugging the optical fiber connector assembly, construction personnel does not need to exert an acting force in a region of the plug by using hands, thereby improving operation efficiency of plugging and unplugging the optical fiber connector assembly. In addition, because a remote operation is performed on the optical fiber connector assembly, the following case is avoided: The hands of the construction personnel are in contact with the optical fiber connector assembly and the optical cable. Therefore, a possibility that the optical fiber connector assembly and the optical cable become faulty under a function of the external force is avoided, thereby improving safety.

Embodiment 3

The optical fiber connector assembly provided in Embodiment 2 is a separable connection structure. Based on Embodiment 2, this embodiment provides an optical fiber connector assembly that can be used to effectively improve stability of a structure of the optical fiber connector assembly. For a specific structure of the optical fiber connector assembly shown in this embodiment, refer to FIG. 15 to FIG. 19.

An optical fiber connector assembly 1500 shown in this embodiment includes an optical fiber connector body and a label component. For description of a specific structure of the optical fiber connector body shown in this embodiment, refer to Embodiment 2 for details. Details are not described again in this embodiment.

The label component shown in this embodiment includes a connecting piece and a label module 1501 connected to the connecting piece. For specific description of the label module 1501, refer to Embodiment 1 for details. Details are not described again in this embodiment.

The connecting piece includes a mounting groove 1502 and an extension rod 1503. One end of the extension rod 1503 is connected to the mounting groove 1502, and the other end of the extension rod 1503 is connected to the label module 1501. For description of specific structures of the mounting groove 1502 and the extension rod 1503, refer to Embodiment 2 for details. Details are not described again in this embodiment.

In this embodiment, to improve stability of a structure between the mounting groove 1502 and the optical fiber connector body, the label component further includes a cover 1504.

In a state in which a middle part 1505 of the optical fiber connector body is plugged in the mounting groove 1502, the cover 1504 covers an opening of the mounting groove 1502. For description of the middle part 1505, the opening of the mounting groove 1502, and a fixing manner between the middle part 1505 and the mounting groove 1502, refer to Embodiment 1 for details. Details are not described again in this embodiment.

In this embodiment, in a state in which the middle part 1505 of the optical fiber connector body is plugged in the mounting groove 1502, due to an abutting function of the cover 1504 for the middle part 1505, stability of a structure between the middle part 1505 and the mounting groove 1502 is effectively improved, thereby avoiding a case in which the label component is detached from the optical fiber connector body.

The following describes a connection manner between the cover 1504 and the mounting groove 1502.

An outer side of the opening curves inward to form a guide rail 1506. A slide rail 1507 protrudes from a corresponding location between the cover 1504 and the guide rail 1506. In a state in which the slide rail 1507 is plugged in the guide rail 1506, the slide rail 1507 can slide along the guide rail 1506 until the cover 1504 covers the opening of the mounting groove 1502.

The following describes a specific process of mounting the optical fiber connector body onto the label component.

First, the middle part 1505 of the optical fiber connector body is plugged in the mounting groove 1502. For specific description, refer to Embodiment 2 for details. Details are not described again.

Figure 15:
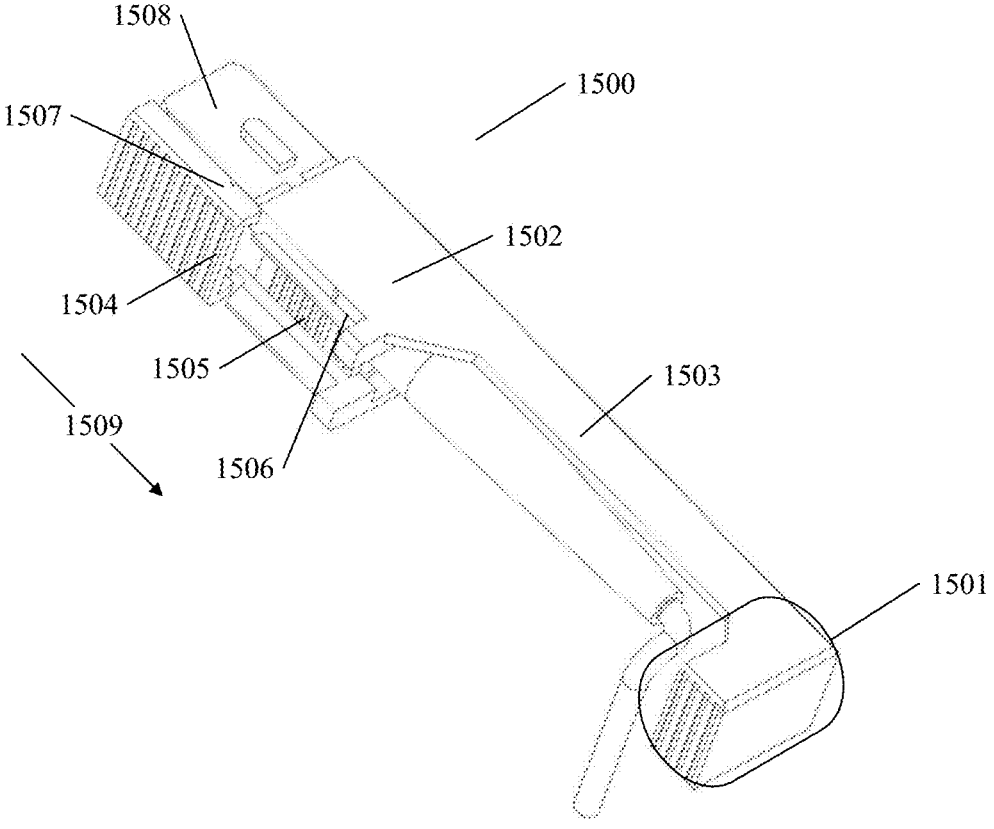
FIG. 15 is a schematic diagram of a structure of an embodiment of an optical fiber connector assembly in Embodiment 3 according to this application.

Next, as shown in FIG. 15, the slide rail 1507 of the cover 1504 is plugged in an end of the guide rail 1506 close to a plug 1508, so that the slide rail 1507 can slide in the guide rail 1506 in a direction 1509. The direction 1509 is an axial direction of the optical fiber connector body.

Figure 16:
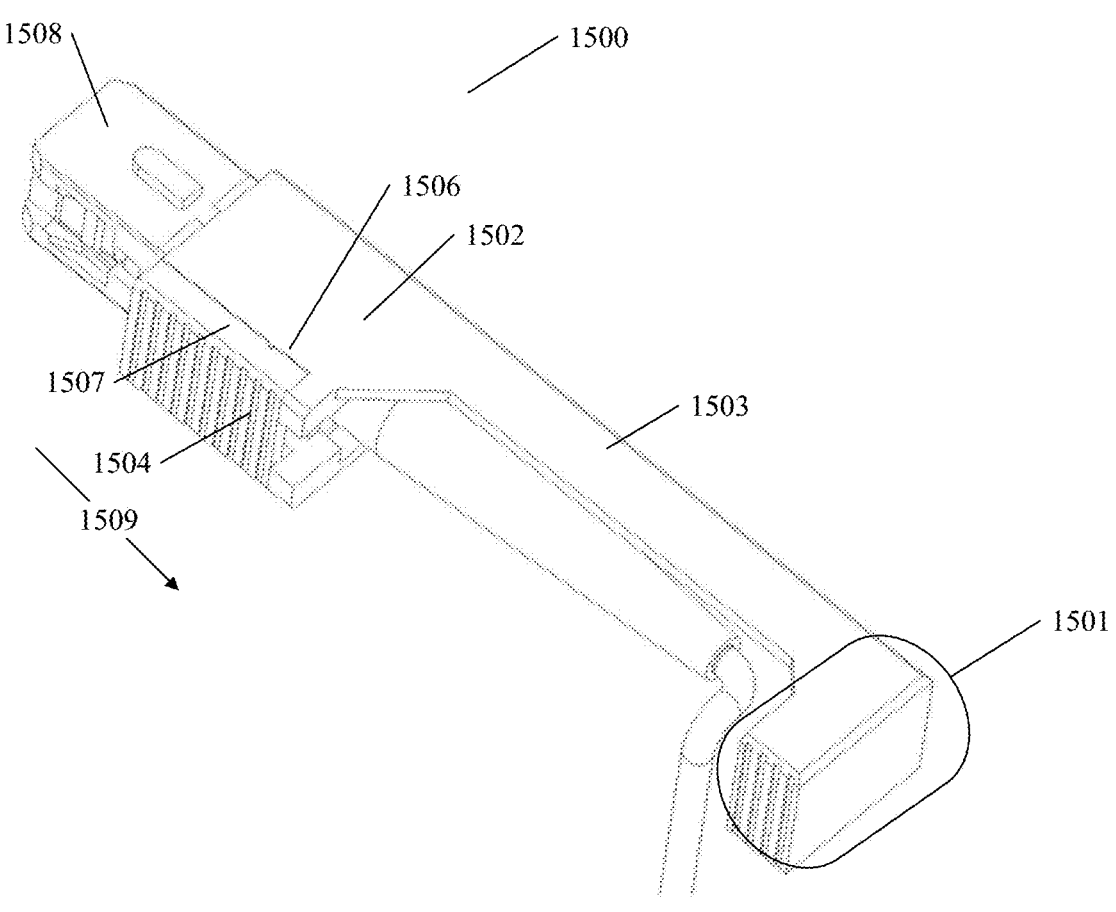
FIG. 16 is a schematic diagram of a structure of another embodiment of an optical fiber connector assembly in Embodiment 3 according to this application.
Figure 17:
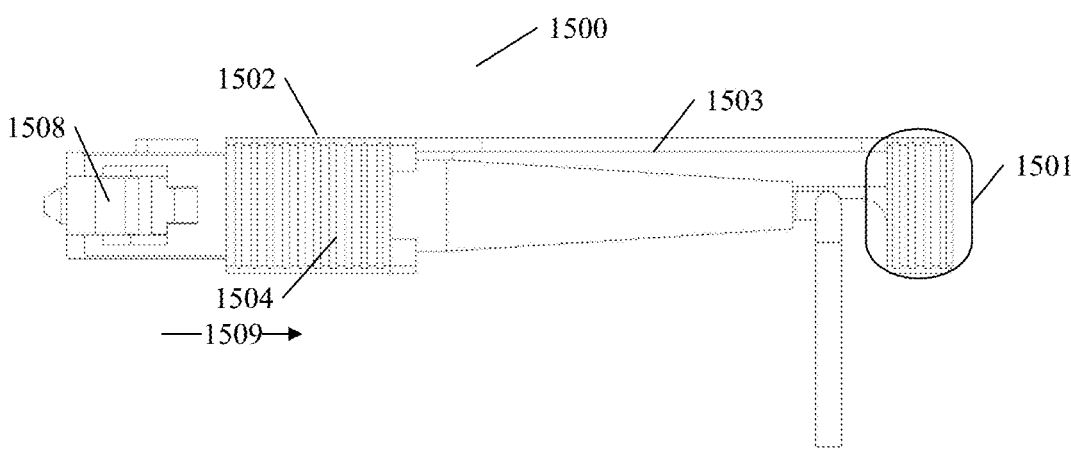
FIG. 17 is a schematic diagram of a structure of another embodiment of an optical fiber connector assembly in Embodiment 3 according to this application.
Figure 18:
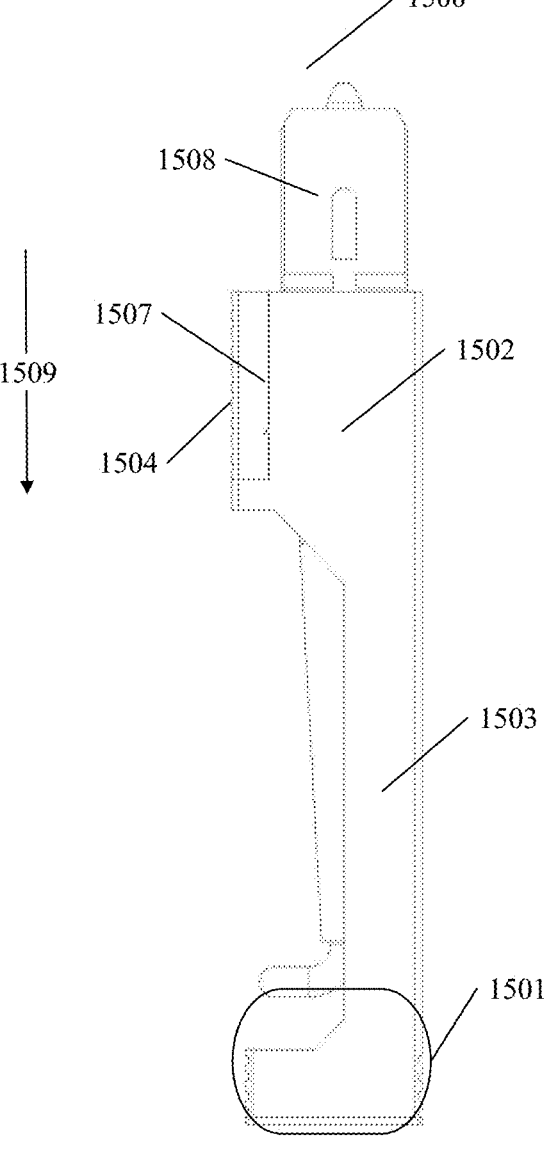
FIG. 18 is a schematic diagram of a structure of another embodiment of an optical fiber connector assembly in Embodiment 3 according to this application.
Figure 19:
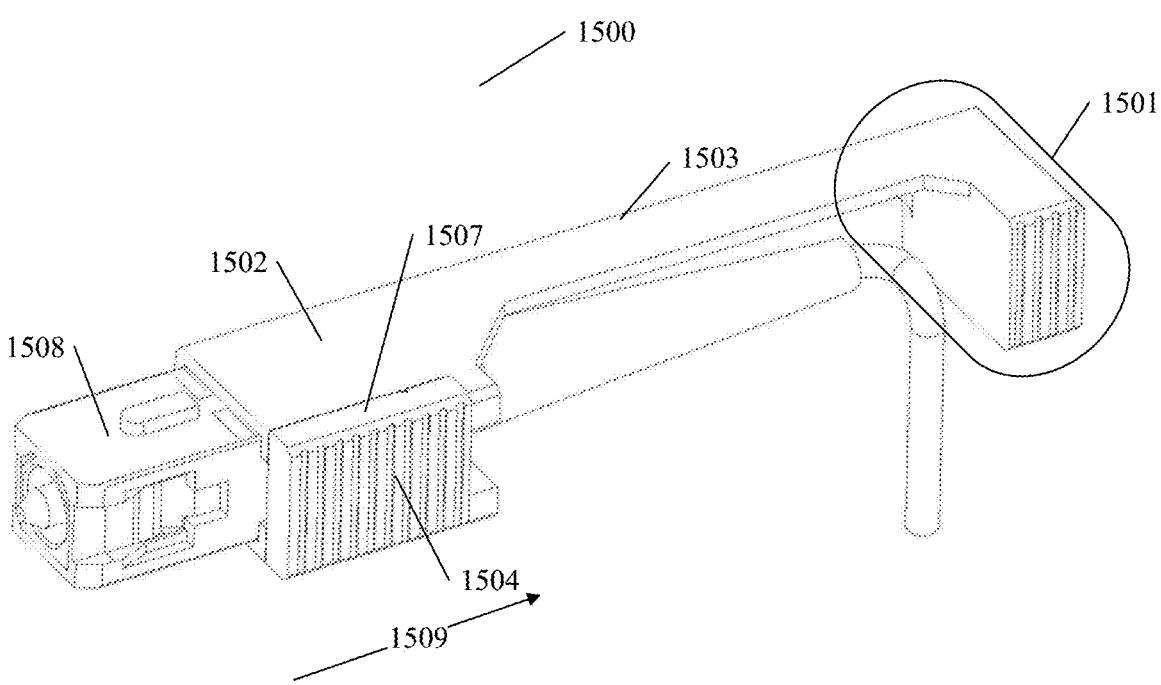
FIG. 19 is a schematic diagram of a structure of another embodiment of an optical fiber connector assembly in Embodiment 3 according to this application.
Figure 20:
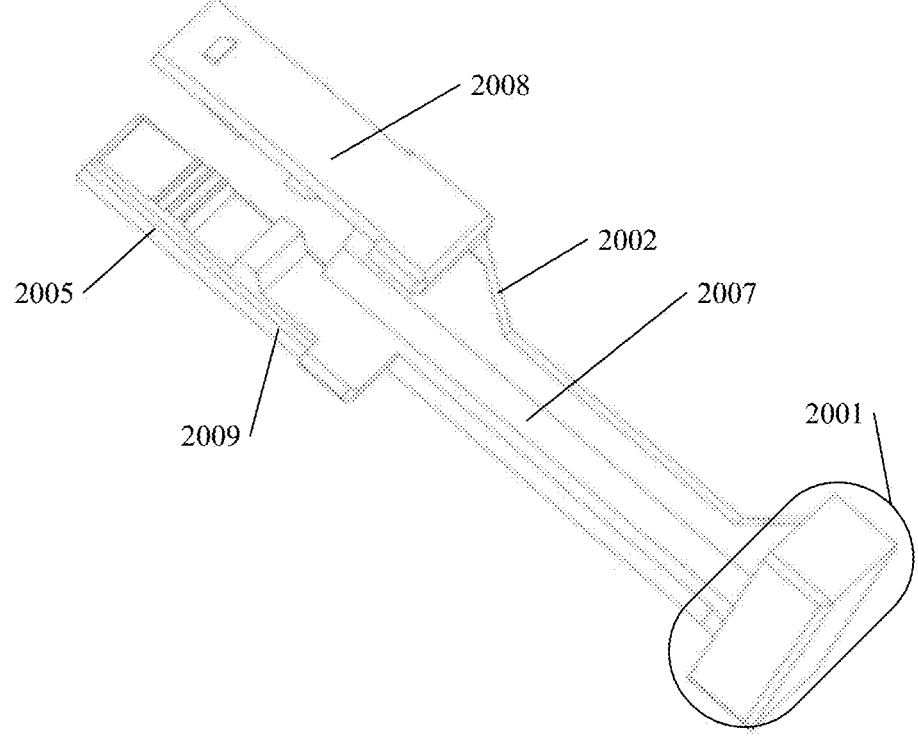
FIG. 20 is a schematic diagram of a local structure of an embodiment of an optical fiber connector assembly in Embodiment 4 according to this application.
Figure 21:
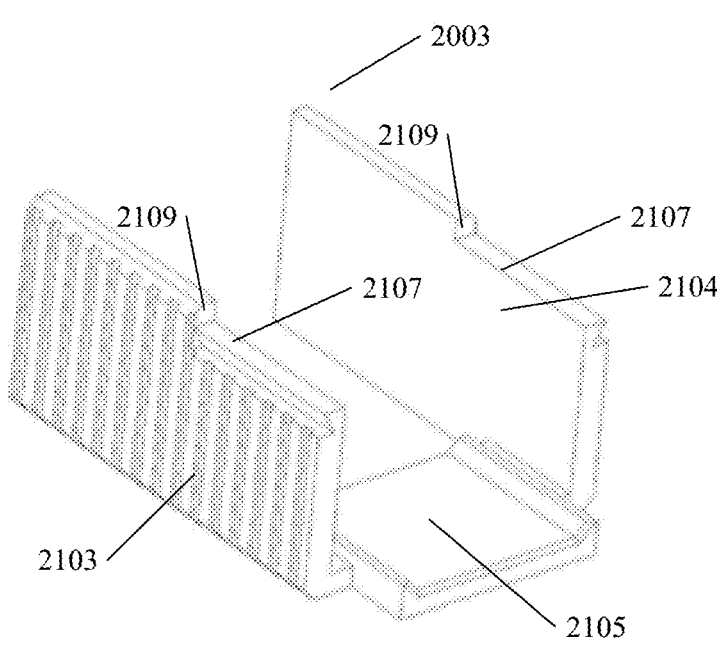
FIG. 21 is a schematic diagram of a local structure of another embodiment of an optical fiber connector assembly in Embodiment 4 according to this application.
Figure 22:
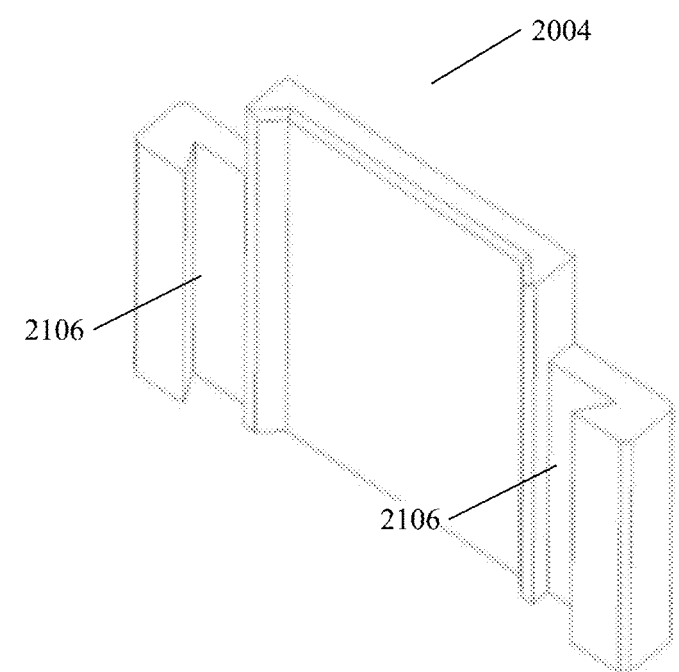
FIG. 22 is a schematic diagram of a structure of an embodiment of an optical fiber connector assembly in Embodiment 4 according to this application.
Figure 23:
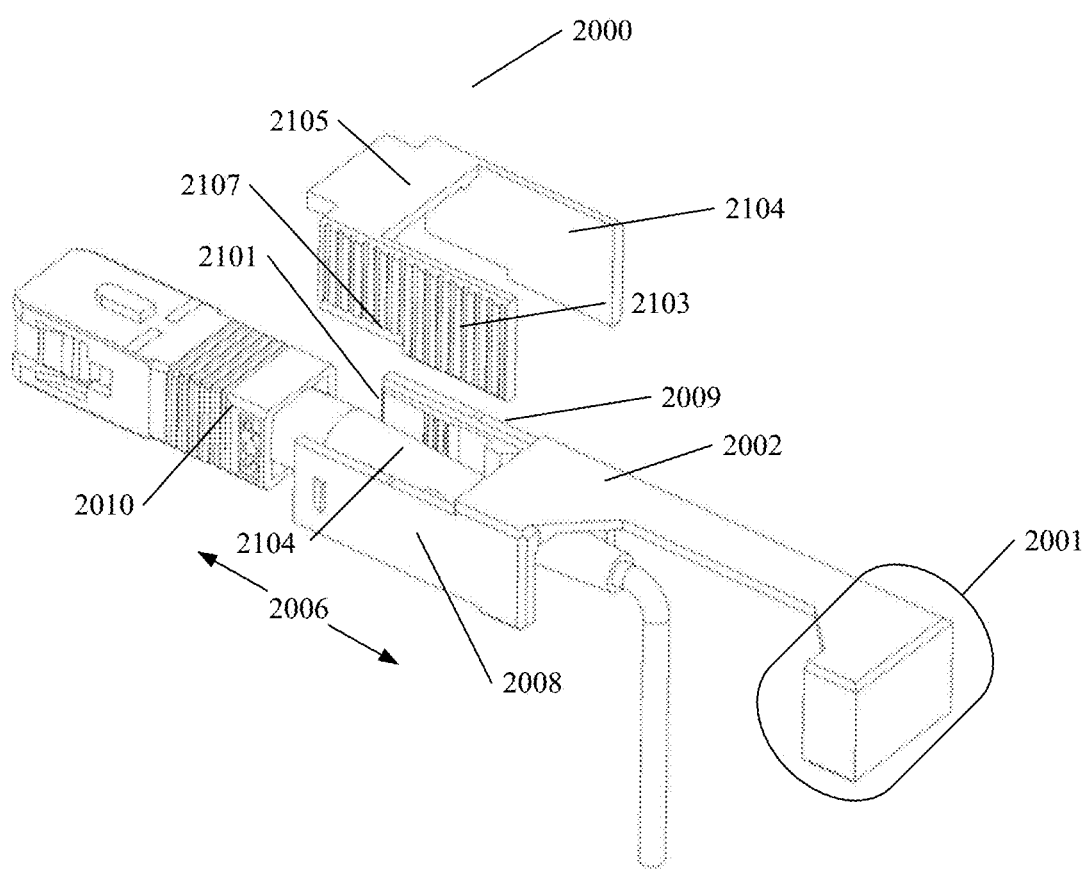
FIG. 23 is a schematic exploded diagram of a structure of an embodiment of an optical fiber connector assembly in Embodiment 4 according to this application.
Figure 24:
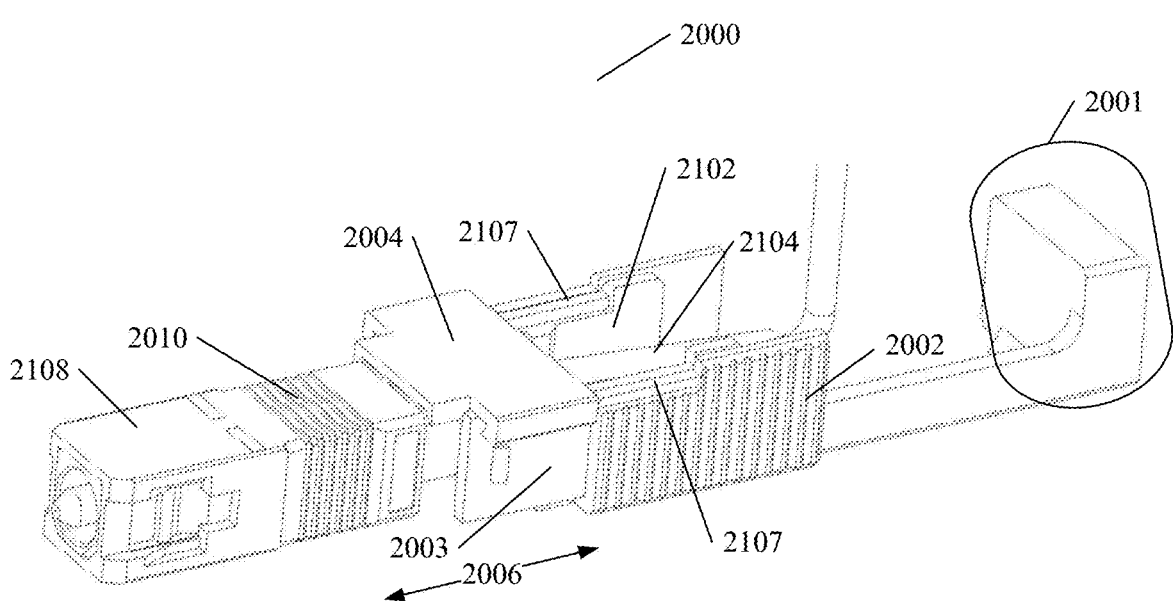
FIG. 24 is a schematic diagram of a structure of an embodiment of an optical fiber connector assembly in Embodiment 4 according to this application.
Figure 25:
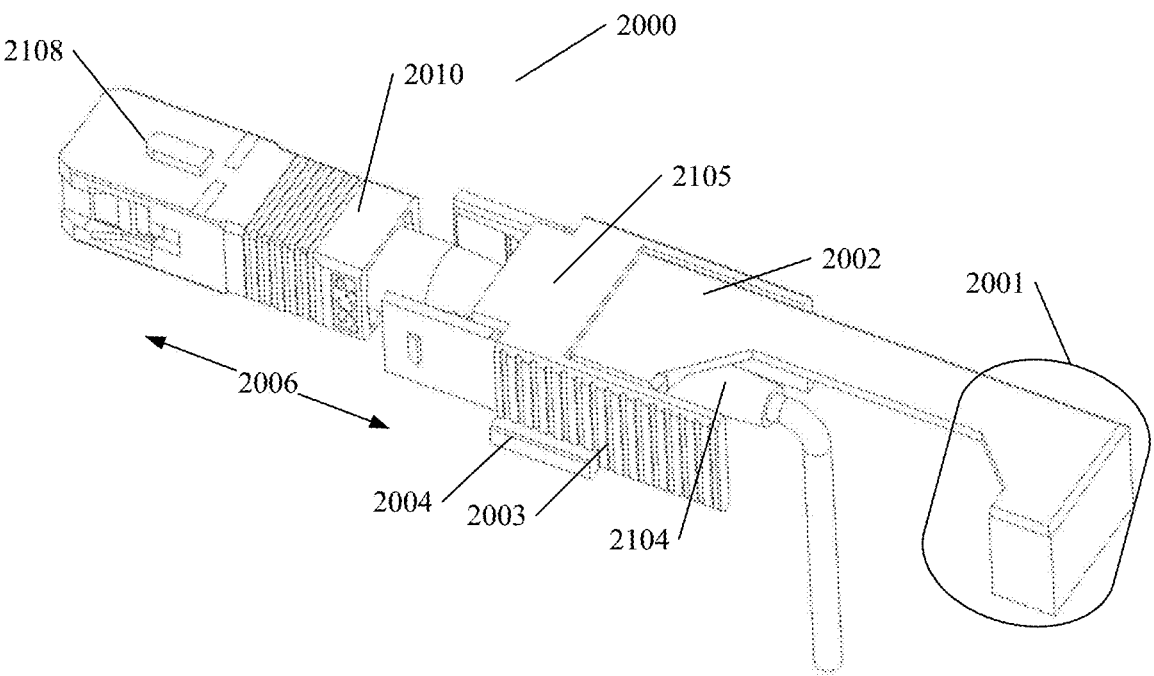
FIG. 25 is a schematic diagram of a structure of another embodiment of an optical fiber connector assembly in Embodiment 4 according to this application.
Figure 26:
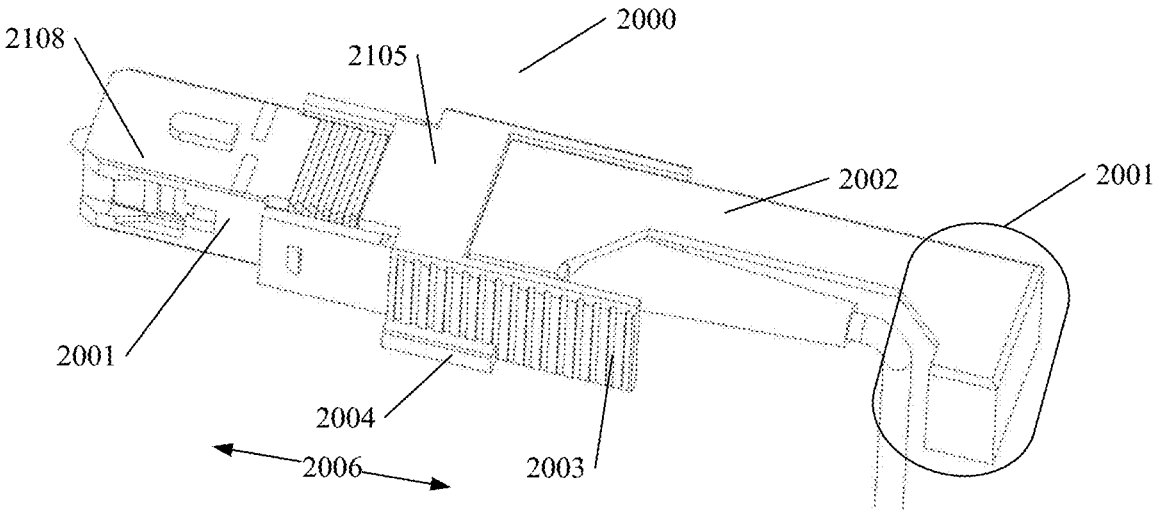
FIG. 26 is a schematic diagram of a structure of another embodiment of an optical fiber connector assembly in Embodiment 4 according to this application.
Figure 27:
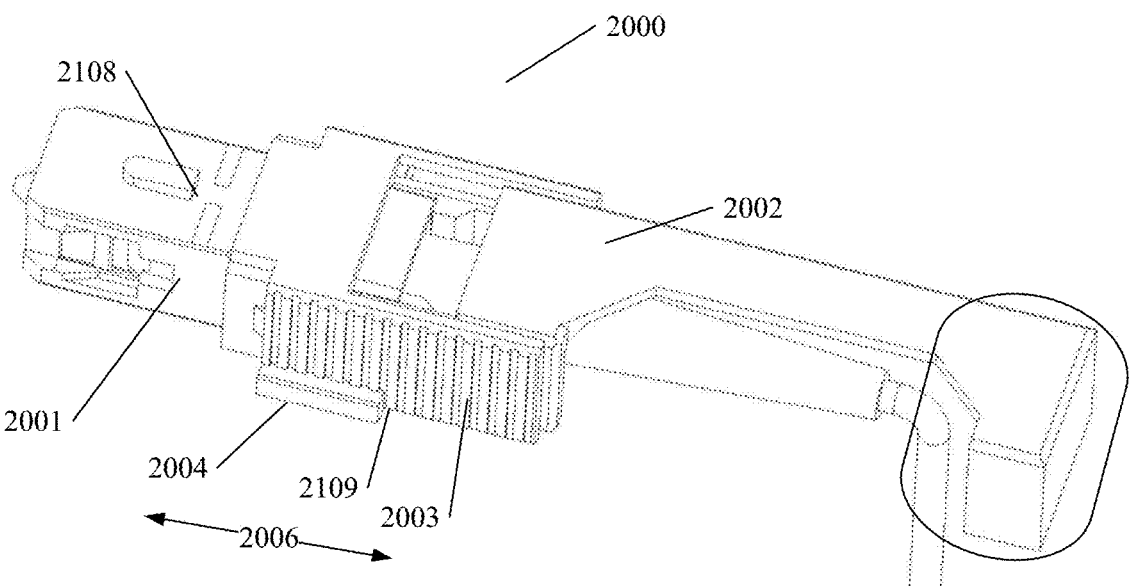
FIG. 27 is a schematic diagram of a structure of another embodiment of an optical fiber connector assembly in Embodiment 4 according to this application.
Figure 28:
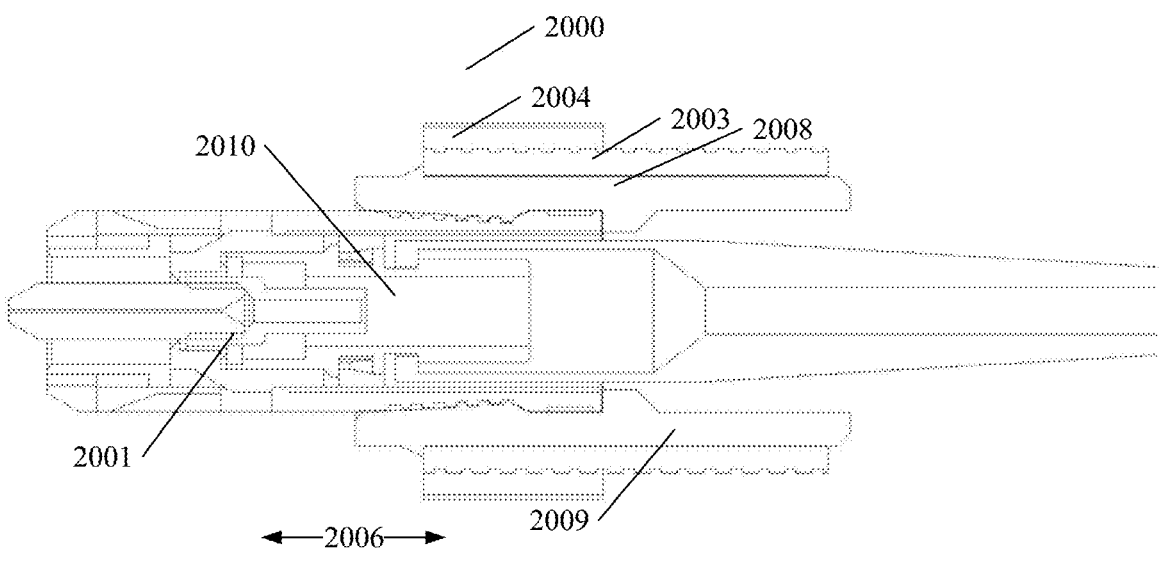
FIG. 28 is a schematic diagram of a local cross-sectional structure of another embodiment of an optical fiber connector assembly in Embodiment 4 according to this application.
Figure 29:
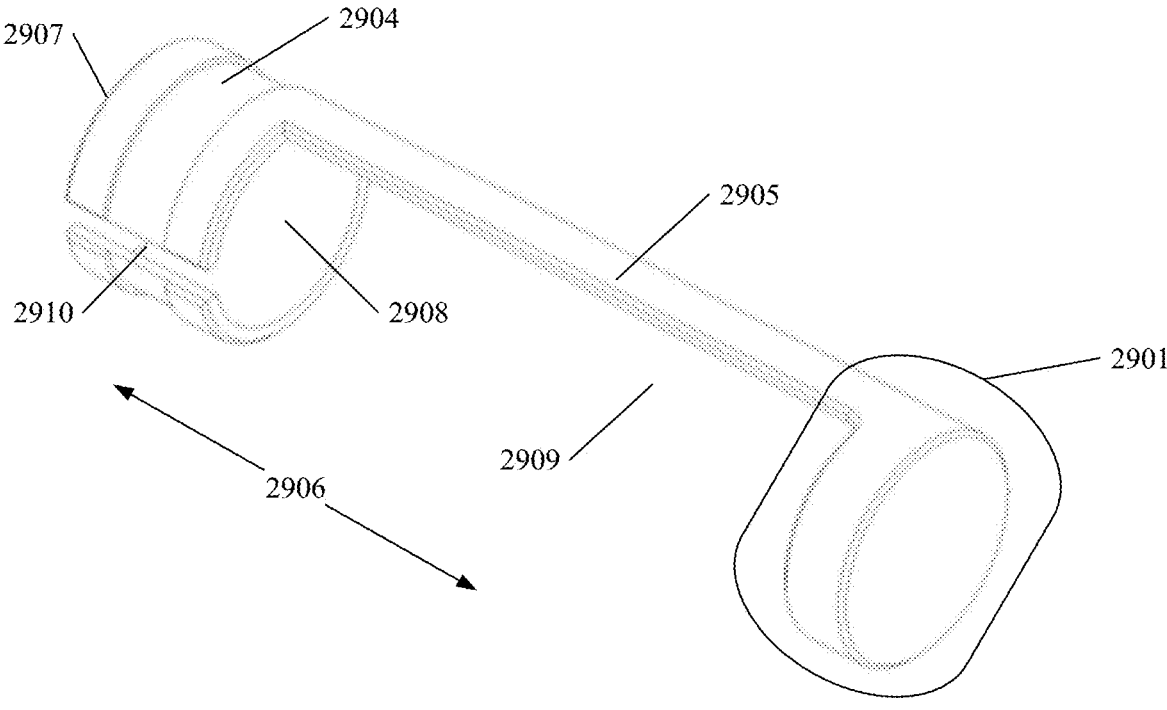
FIG. 29 is a schematic diagram of a local structure of an embodiment of an optical fiber connector assembly in Embodiment 5 according to this application.
Figure 30:
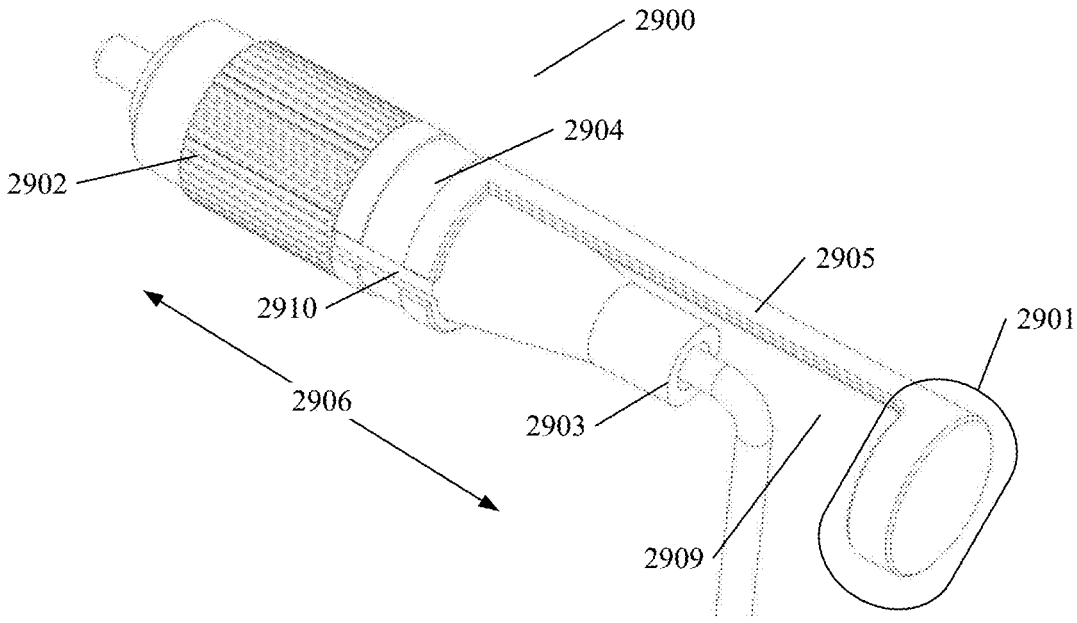
FIG. 30 is a schematic diagram of a structure of an embodiment of an optical fiber connector assembly in Embodiment 5 according to this application.
Figure 31:
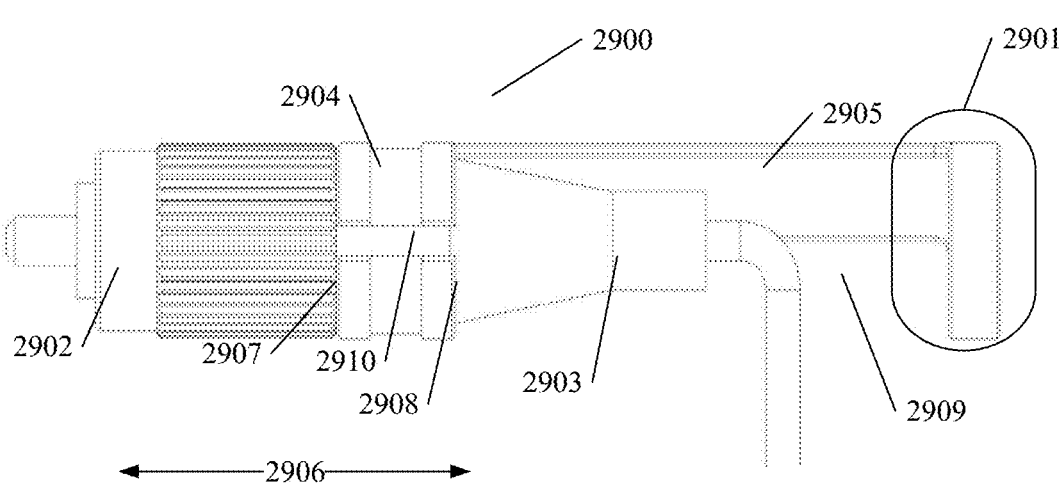
FIG. 31 is a schematic diagram of a structure of another embodiment of an optical fiber connector assembly in Embodiment 5 according to this application.
Figure 32:
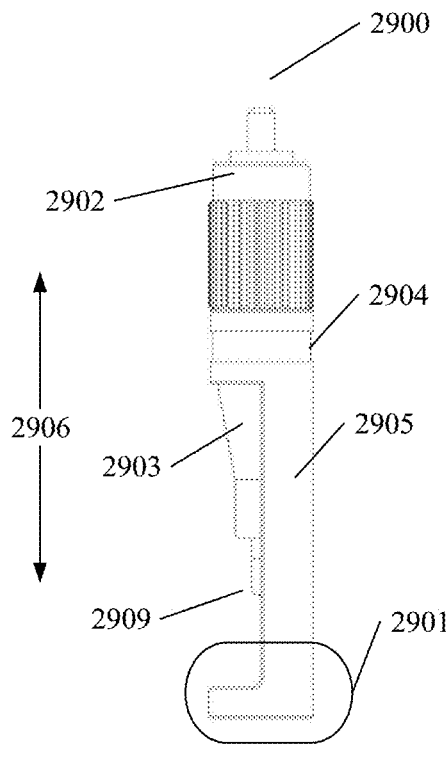
FIG. 32 is a schematic diagram of a structure of another embodiment of an optical fiber connector assembly in Embodiment 5 according to this application.
Figure 33:
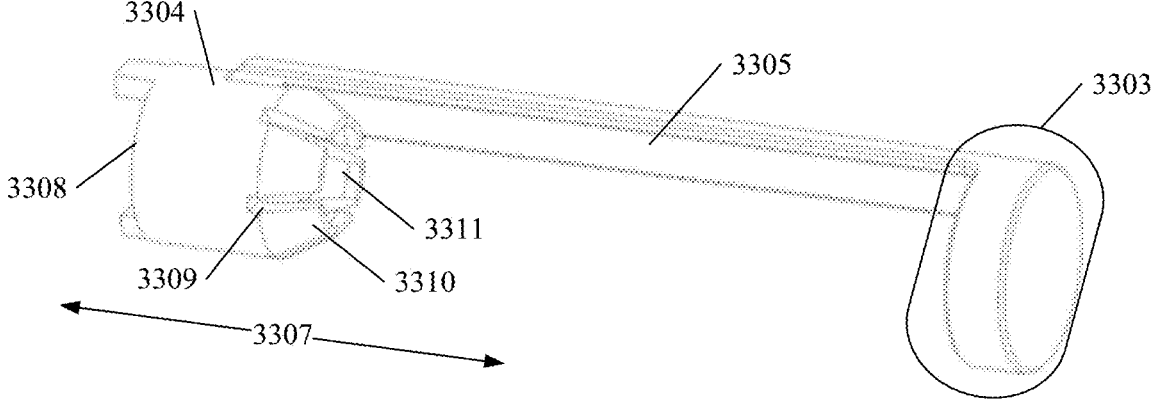
FIG. 33 is a schematic diagram of a local structure of an embodiment of an optical fiber connector assembly in Embodiment 6 according to this application.
Figure 34:
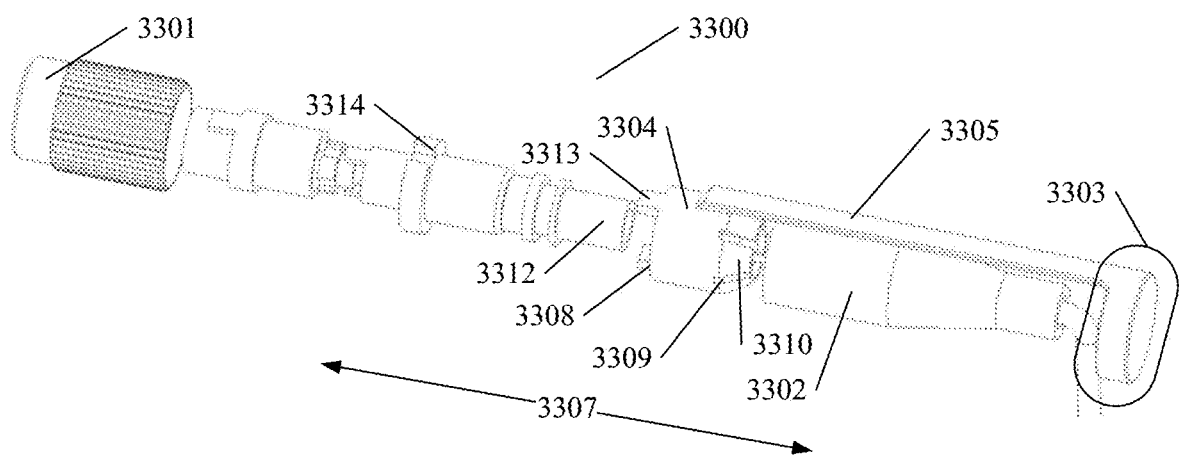
FIG. 34 is a schematic exploded diagram of a structure of an embodiment of an optical fiber connector assembly in Embodiment 6 according to this application.
Figure 35:
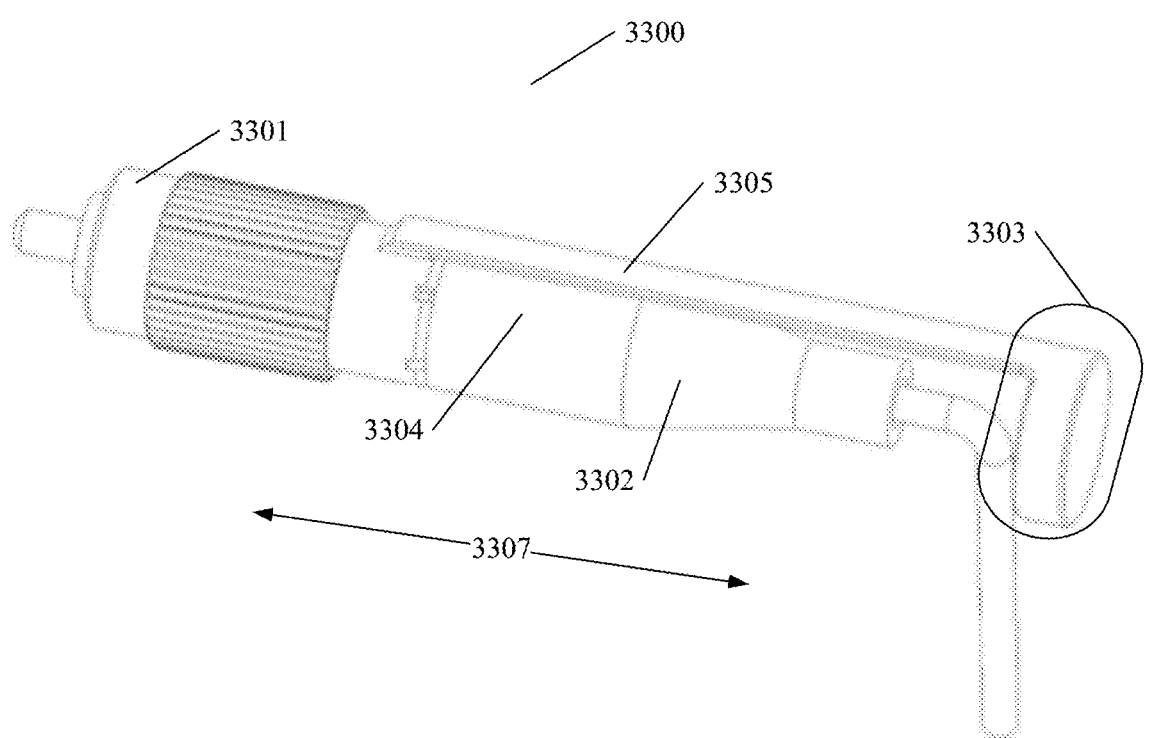
FIG. 35 is a schematic diagram of a structure of an embodiment of an optical fiber connector assembly in Embodiment 6 according to this application.
Figure 36:
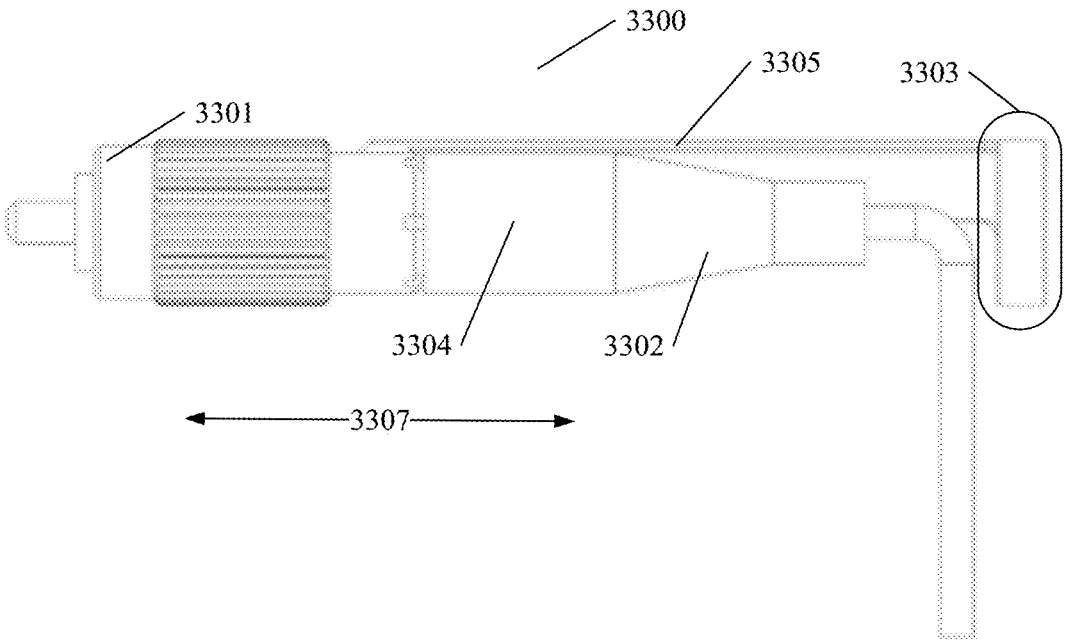
FIG. 36 is a schematic diagram of a structure of another embodiment of an optical fiber connector assembly in Embodiment 6 according to this application.
Figure 37:
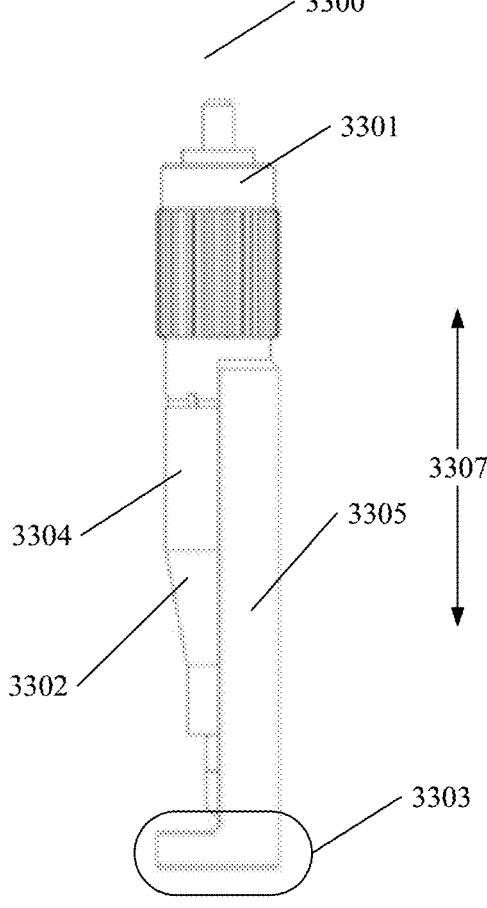
FIG. 37 is a schematic diagram of a structure of another embodiment of an optical fiber connector assembly in Embodiment 6 according to this application.
Figure 38:
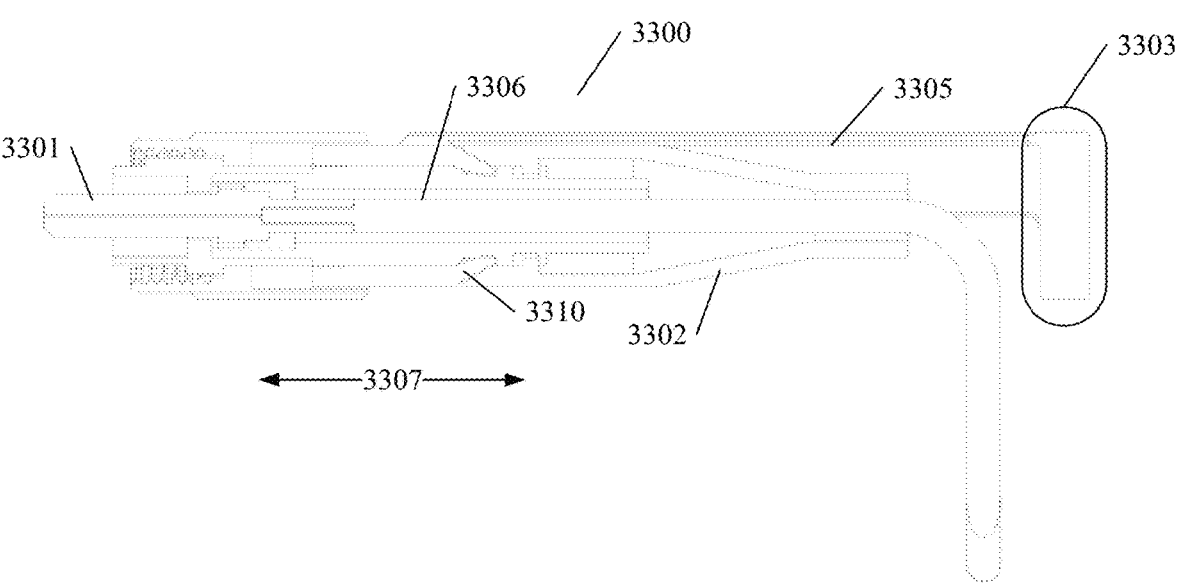
FIG. 38 is a schematic diagram of a local cross-sectional structure of an embodiment of an optical fiber connector assembly in Embodiment 6 according to this application.

Further, as shown in FIG. 16, the slide rail 1507 continues to be pushed until the cover 1504 covers the opening of the mounting groove 1502.

In this embodiment, description of the connection manner between the cover 1504 and the mounting groove 1502 is an optional example instead of limitation, provided that a separable connection can be implemented between the cover 1504 and the mounting groove 1502. For example, any manner such as a magnetic connection manner, an elastic connection manner, or an adhesive manner may further be used between the cover 1504 and the mounting groove 1502. For specific description, refer to Embodiment 2. Details are not described again.

In this embodiment, in a state in which the middle part 1505 is plugged in the mounting groove 1502, label information of the label module 1501 is within a visual range or a photographing range. For specific description of the label information within the visual range and the photographing range, refer to Embodiment 1 for details. Details are not described again.

When the optical fiber connector assembly shown in this embodiment is used, by using an accommodation channel and a cabling channel disposed in the optical fiber connector assembly, the label information of the label module 1501 can be effectively prevented from being blocked. For specific description of the accommodation channel and the cabling channel, refer to Embodiment 1. Details are not described again.

For description of beneficial effects of the label module shown in this embodiment, refer to Embodiment 2. Details are not described again.

Based on Embodiment 2, in this embodiment, in a state in which the middle part of the optical fiber connector body is plugged in the mounting groove, due to an abutting function of the cover for the middle part, stability of a structure between the middle part and the mounting groove is effectively improved, thereby avoiding a case in which the label component is detached from the optical fiber connector body. Therefore, it is effectively ensured that the label information of the optical fiber connector assembly is always within the line-of-sight range or the photographing range, to effectively ensure accuracy and efficiency of recognizing the optical fiber connector body identified by using the label information.

Embodiment 4

The optical fiber connector assembly shown in Embodiment 1 is an integrally molded structure. The optical fiber connector assemblies shown in Embodiment 2 and Embodiment 3 are separable connection structures. For an optical fiber connector assembly shown in this embodiment, in a state in which an optical fiber connector body is plugged in a subrack, a label component may be directly mounted onto the optical fiber connector body without unplugging the optical fiber connector body from the subrack. As shown in this embodiment, it can be learned that, in a process of mounting the label component onto the optical fiber connector body, optical signal transmission of the optical fiber connector body is not interrupted, thereby improving safety of optical signal transmission. For a specific structure of the optical fiber connector assembly shown in this embodiment, refer to FIG. 20 to FIG. 28.

An optical fiber connector assembly 2000 shown in this embodiment includes an optical fiber connector body and a label component. For description of a specific structure of the optical fiber connector body shown in this embodiment, refer to Embodiment 2 for details. Details are not described again in this embodiment.

The label component shown in this embodiment includes a connecting piece and a label module 2001 connected to the connecting piece. For specific description of the label module 2001, refer to Embodiment 1 for details. Details are not described again in this embodiment.

The connecting piece shown in this embodiment includes a first component 2002, a second component 2003, and a third component 2004. The first component 2002, the second component 2003, and the third component 2004 are combined to form the connecting piece.

A first end of the first component 2002 forms an opening 2005 of the mounting groove. The opening 2005 extends in an axial direction 2006 of the optical fiber connector body. For specific description of the opening 2005 of the mounting groove, refer to Embodiment 2 for details. Details are not described again.

A second end of the first component 2002 is connected to the label module 2001. An extension rod 2007 is between the first end of the first component 2002 and the second end of the first component 2002. For specific description of the extension rod 2007, refer to Embodiment 2 for details. Details are not described again.

A first abutting wall 2008 and a second abutting wall 2009 are formed at opposite locations at the first end of the first component 2002. In a state in which the label component is mounted onto the optical fiber connector body, the first abutting wall 2008 and the second abutting wall 2009 are configured to abut against a middle part 2010 of the optical fiber connector body. For specific description of the middle part 2010 of the optical fiber connector body, refer to Embodiment 2 for details. Details are not described again.

A first hollowed-out region 2101 is formed between a first end of the first abutting wall 2008 and a first end of the second abutting wall 2009. A second hollowed-out region 2102 is formed between a second end of the first abutting wall 2008 and a second end of the second abutting wall 2009. It can be learned that the first hollowed-out region 2101 and the second hollowed-out region 2102 are at opposite locations.

The second component 2003 and the third component 2004 are located on two sides at opposite locations at the first end of the first component 2002. Specifically, the second component 2003 covers the first hollowed-out region 2101 of the first component 2002, and the third component 2004 covers the second hollowed-out region 2102 of the first component 2002. The first component 2002, the second component 2003, and the third component 2004 are combined to form the connecting piece.

It can be learned that the second component 2003 and the third component 2004 are located on the two sides at the opposite locations at the first end of the first component 2002, and the third component 2004 covers the opening 2005 of the mounting groove. The first component 2002, the second component 2003, and the third component 2004 are buckled with each other to form the mounting groove for accommodating the middle part 2010.

The optical fiber connector assembly shown in this embodiment is used. When the optical fiber connector body is plugged in an adapter in the subrack, if label information used to identify the optical fiber connector body needs to be put on the optical fiber connector body, the first component 2002, the second component 2003, and the third component 2004 may be directly combined on the optical fiber connector body to form the label component, while the optical fiber connector body does not need to be plugged in or unplugged from the adapter. For specific description of the adapter and the label information, refer to Embodiment 1 for details. Details are not described again. It can be learned that in a process of mounting the label component onto the optical fiber connector body shown in this embodiment, optical signal transmission performed by the optical fiber connector body does not need to be interrupted.

The following describes specific structures of the first component 2002, the second component 2003, and the third component 2004 with reference to a process of combining the first component 2002, the second component 2003, and the third component 2004.

First, to mount the label component onto the optical fiber connector body, a rear retainer 505 of the optical fiber connector body is first disposed between the first abutting wall 2008 and the second abutting wall 2009 of the first component 2002. For specific description of the rear retainer 505, refer to Embodiment 1 for details. Details are not described again.

Next, the second component 2003 is buckled to the first hollowed-out region 2101, so that the second component 2003 covers the first hollowed-out region 2101.

Specifically, the second component 2003 has a third abutting wall 2103 and a fourth abutting wall 2104. When the second component 2003 covers the first hollowed-out region 2101, the third abutting wall 2103 abuts against the first abutting wall 2008, and the fourth abutting wall 2104 abuts against the second abutting wall 2009.

Specifically, the second component 2003 further includes a coverage part 2105 connected between the third abutting wall 2103 and the fourth abutting wall 2104. In a state in which the third abutting wall 2103 abuts against the first abutting wall 2008, and the fourth abutting wall 2104 abuts against the second abutting wall 2009, the coverage part 2105 covers the first hollowed-out region 2101.

Further, the third component 2004 is buckled to the second hollowed-out region 2102, so that the third component 2004 covers the second hollowed-out region 2102.

Specifically, the third component 2004 curves inward on two sides to form a track 2106. A guide rail 2107 is disposed at a corresponding location between the track 2106 and each of the third abutting wall 2103 and the fourth abutting wall 2104. In a state in which the guide rail 2107 is plugged in the track 2106, a purpose that the third component 2004 covers the second hollowed-out region 2102 is achieved. In addition, when the guide rail 2107 slides in a direction of the track 2106, a purpose that the third component 2004 slides above the second hollowed-out region 2102 is achieved.

Then, after assembling of the label module is completed, the first component 2002, the second component 2003, and the third component 2004 between which connection is implemented are moved in a direction close to a plug 2108 of the optical fiber connector body until connection between the connecting piece and the middle part 2010 is implemented.

For description of the plug 2108, refer to Embodiment 1. Details are not described again.

In a process in which the first component 2002 is moved in the direction close to the plug 2108 of the optical fiber connector body, a gap between a first end of the elastic first abutting wall 2008 and the elastic second abutting wall 2009 may be expanded. In this case, the first component 2002, the second component 2003, and the third component 2004 are moved from a region of the rear retainer 505 of the optical fiber connector body to a location of the middle part 2010. For specific description of the plug 2108, refer to Embodiment 2 for details. Details are not described again in this embodiment.

A clamping protrusion is disposed on the first abutting wall 2008 and the second abutting wall 2009. A clamping groove is disposed on the middle part 2010. In a state in which the clamping protrusion is clamped and fixed in the clamping groove, connection between the middle part 2010 and the first component 2002 is implemented. For specific description of the clamping protrusion and the clamping groove, refer to Embodiment 2 for details. Details are not described again.

It should be noted that this embodiment uses an example in which the middle part 2010 and the first component 2002 are connected in a clamping fixing manner. In another example, any manner such as a magnetic connection manner, an elastic connection manner, or an adhesive manner may be alternatively used. For specific description, refer to Embodiment 2 for details. Details are not described again.

To implement stability of a structure between the first component 2002, the second component 2003, and the third component 2004, and prevent the label component from falling from the optical fiber connector body, an abutting step 2109 is further disposed on the second component 2003 shown in this embodiment. When the guide rail 2107 is moved to a location abutting against the abutting step 2109, under circumferential constraints of the second component 2003 and the third component 2004, locations the first end of the first abutting wall 2008 and the second abutting wall 2009 of the first component 2002 are fixed on the middle part 2010, so that the first component 2002, the second component 2003, and the third component 2004 in combination tightly hold the middle part 2010.

It can be learned that when the label component needs to be detached from the optical fiber connector body, an inverse process of the foregoing process may be performed. A specific detaching process is not described again.

In this embodiment, in a state in which the middle part is plugged in the mounting groove, the label information of the label module is within a visual range or a photographing range. For specific description of the label information within the visual range and the photographing range, refer to Embodiment 1 for details. Details are not described again.

When the optical fiber connector assembly shown in this embodiment is used, by using an accommodation channel and a cabling channel disposed in the optical fiber connector assembly, the label information of the label module can be effectively prevented from being blocked. For specific description of the accommodation channel and the cabling channel, refer to Embodiment 1. Details are not described again.

For description of beneficial effects shown in this embodiment, refer to Embodiment 2. Details are not described again.

By using the optical fiber connector assembly shown in this embodiment, in a process of mounting the label assembly onto the optical fiber connector body, it is unnecessary to unplug the optical fiber connector body from the adapter to achieve a purpose of mounting the label assembly onto the optical fiber connector body. Therefore, when operation space is limited in a scenario in which adapters are disposed in high density on the subrack, and it is required that network disconnection cannot occur, the optical fiber connector assembly in this embodiment can be assembled in a state in which the optical fiber connector body keeps being plugged in the adapter, thereby effectively avoiding network disconnection in a process of mounting the label component.

Embodiment 5

For an optical fiber connector assembly shown in this embodiment, in a state in which an optical fiber connector body is plugged in a subrack, a label component may be directly mounted onto the optical fiber connector body without unplugging the optical fiber connector body from the subrack. As shown in this embodiment, it can be learned that, in a process of mounting the label component onto the optical fiber connector body, optical signal transmission of the optical fiber connector body is not interrupted, thereby improving safety of optical signal transmission. In addition, efficiency of mounting the label component onto the optical fiber connector body can be effectively improved by using the optical fiber connector assembly shown in this embodiment.

For a specific structure of the optical fiber connector assembly shown in this embodiment, refer to FIG. 29 to FIG. 32.

An optical fiber connector assembly 2900 shown in this embodiment includes an optical fiber connector body and a label component.

In this embodiment, an example in which a type of the optical fiber connector body is an FC-type optical fiber connector is used for description. Specifically, the optical fiber connector body includes a plug 2902, a middle part, and a rear retainer 2903 that are sequentially connected. The plug 2902 is configured to be plugged in an adapter in a subrack. For specific description of the subrack, the adapter, the plug 2902, the middle part, and the rear retainer 2903, refer to Embodiment 2 for details. Details are not described again.

The label component shown in this embodiment includes a connecting piece and a label module 2901 connected to the connecting piece. For specific description of the label module 2901, refer to Embodiment 1 for details. Details are not described again in this embodiment.

The connecting piece includes a mounting groove 2904 and an extension rod 2905. One end of the extension rod 2905 is connected to the mounting groove 2904, and the other end of the extension rod 2905 is connected to the label module 2901. The mounting groove 2904 shown in this embodiment is configured to mount and fix the middle part.

An entire structure of the mounting groove 2904 shown in this embodiment is a cylindrical structure in which two top faces are hollowed out. It should be noted that description of the entire structure of the mounting groove 2904 in this embodiment is an optional example and is not limited, provided that the mounting groove 2904 can mount and fix the middle part.

With reference to a specific structure of the mounting groove 2904, the following describes how the mounting groove 2904 specifically mounts and fixes the middle part 1204 to implement connection between the label component and the optical fiber connector body.

The mounting groove 2904 shown in this embodiment has a channel extending in an axial direction 2906 of the optical fiber connector body. The channel has a first channel opening 2907 and a second channel opening 2908 at opposite locations in the axial direction 2906 of the optical fiber connector body. It can be learned that the first channel opening 2907 and the second channel opening 2908 are both connected to the channel.

In a state in which the middle part is plugged in the mounting groove 2904, the plug 2902 protrudes from the mounting groove 2904 by using the first channel opening 2907, and the rear retainer 2903 protruding from the second channel opening 2908 can be accommodated in the accommodation channel 2909. For specific description of the accommodation channel 2909, refer to Embodiment 2. Details are not described again.

To implement mounting of the middle part in the mounting groove 2904, a cut 2910 is disposed on a groove wall of the mounting groove 2904 in the axial direction 2906 of the optical fiber connector body. The cut 2910 is connected to the channel of the mounting groove 2904.

The mounting groove 2904 shown in this embodiment may be made of an elastic material, so that a gap of the cut 2910 can be changed under a function of an external force until the middle part is clamped and fixed in the mounting groove 2904.

In a mounting process of the optical fiber connector body and the label component, the channel of the mounting groove 2904 is sleeved on the rear retainer 2903. Then, an acting force may be applied to the cut 2910, so that the gap of the cut 2910 is enlarged. The mounting groove 2904 is moved in a direction toward the plug 2902 until the middle part is plugged in the channel of the mounting groove 2904.

To improve stability of a structure between the middle part and the channel of the mounting groove 2904, a groove may be disposed around an outer peripheral wall of the middle part. In a state in which the channel of the mounting groove 2904 is sleeve on the groove of the middle part, fixing is implemented between the mounting groove 2904 and the middle part.

It should be noted that description of a fixing manner between the mounting groove 2904 and the middle part in this embodiment is an optional example and is not limited, provided that a detachable connection relationship can be implemented between the mounting groove 2904 and the middle part. For example, any manner such as a magnetic connection manner, an elastic connection manner, or an adhesive manner may be used. For specific description, refer to Embodiment 2. Details are not described again.

In this embodiment, in a state in which the middle part is plugged in the channel of the mounting groove 2904, label information of the label module 2901 is within a visual range or a photographing range. For specific description of the label information within the visual range and the photographing range, refer to Embodiment 1 for details. Details are not described again.

When the optical fiber connector assembly shown in this embodiment is used, by using the accommodation channel 2909 and a cabling channel disposed in the optical fiber connector assembly, the label information of the label module 2901 can be effectively prevented from being blocked. For specific description of the accommodation channel 2909 and the cabling channel, refer to Embodiment 1. Details are not described again.

For description of beneficial effects shown in this embodiment, refer to Embodiment 4. Details are not described again.

In addition, when the optical fiber connector assembly shown in this embodiment is used, the label component is an integrally molded structure. When the label component needs to be mounted onto the optical fiber connector body, the label component may be directly mounted onto the optical fiber connector body, thereby improving mounting efficiency. In addition, in a mounting process shown in this embodiment, connection can be implemented without performing an alignment operation on the label module and the optical fiber connector body, thereby effectively reducing operation difficulty of mounting the label component onto the optical fiber connector assembly.

Embodiment 6

In this embodiment, an example of another structure of an optical fiber connector assembly is described with reference to FIG. 33 to FIG. 38.

An optical fiber connector assembly 3300 shown in this embodiment includes an optical fiber connector body and a label component.

In this embodiment, an example in which a type of the optical fiber connector body is an FC optical fiber connector is used for description. Specifically, the optical fiber connector body includes a plug 3301, a middle part 3306, and a rear retainer 3302 that are sequentially connected. The plug 3301 is configured to connect to an adapter, to achieve a purpose of plugging the optical fiber connector assembly 3300 in a subrack. For specific description of the subrack, the adapter, the plug 3301, the middle part 3306, and the rear retainer 3302, refer to Embodiment 1 for details. Details are not described again.

The label component shown in this embodiment includes a connecting piece and a label module 3303 connected to the connecting piece. For specific description of the label module 3303, refer to Embodiment 1 for details. Details are not described again in this embodiment.

The connecting piece includes a mounting groove 3304 and an extension rod 3305. One end of the extension rod 3305 is connected to the mounting groove 3304, and the other end of the extension rod 3305 is connected to the label module 3303. The mounting groove 3304 shown in this embodiment is configured to mount and fix the middle part 3306.

An entire structure of the mounting groove 3304 shown in this embodiment is a cylindrical structure in which two top faces are hollowed out. It should be noted that description of the entire structure of the mounting groove 3304 in this embodiment is an optional example and is not limited, provided that the mounting groove 3304 can mount and fix the middle part 3306.

With reference to a specific structure of the mounting groove 3304, the following describes how the mounting groove 3304 specifically mounts and fixes the middle part 3306 to implement connection between the label component and the optical fiber connector body.

The mounting groove 3304 shown in this embodiment has a channel extending in an axial direction 3307 of the optical fiber connector body. The channel has a first channel opening 3308 and a second channel opening 3309 at opposite locations in the axial direction 3307 of the optical fiber connector body. It can be learned that the first channel opening 3308 and the second channel opening 3309 are both connected to the channel.

The connecting piece shown in this embodiment further includes a plurality of elastic arms 3310. First ends of the plurality of elastic arms 3310 are connected to the second channel opening 3309. Second ends of the plurality of elastic arms 3310 are close to each other.

Specifically, the second ends of the plurality of elastic arms 3310 are in a state of being close to each other in a natural state, so that the plurality of elastic arms 3310 that are close to each other cover the second channel opening 3309. In addition, accommodation space 3311 is formed between the plurality of elastic arms 3310 that are close to each other. The accommodation space 3311 is used to accommodate the middle part 3306.

In a process of mounting the mounting groove 3304 onto the optical fiber connector body, the middle part 3306 may be plugged in the channel of the mounting groove 3304 from the first channel opening 3308. When the middle part 3306 is moved between the plurality of elastic arms 3310 that are close to each other, the plurality of elastic arms 3310 are splayed in a radial direction of the channel of the mounting groove 3304, so that each elastic arm 3310 has an elastic force to spring back to an axial line of the channel of the mounting groove 3304.

To implement fixing between the mounting groove 3304 and the middle part 3306, an outer peripheral wall of the middle part 3306 curves inward to form an annular groove 3312, and the annular groove 3312 is located on the outer peripheral wall at an end that is of the middle part 3306 and that is away from the plug 3301. When the annular groove 3312 is moved to the accommodation space 3311 formed between the plurality of elastic arms 3310, at least a part of the elastic force of the plurality of elastic arms 3310 is released on the annular groove 3312, to implement a purpose of holding and fixing the plurality of elastic arms 3310 in the annular groove 3312, thereby implementing the fixing between the middle part 3306 and the mounting groove 3304.

It should be noted that description of a fixing manner between the mounting groove 3304 and the middle part 3306 in this embodiment is an optional example and is not limited, provided that a detachable connection relationship can be implemented between the mounting groove 3304 and the middle part 3306. For example, any manner such as a magnetic connection manner, an elastic connection manner, or an adhesive manner may be used. For specific description, refer to Embodiment 2. Details are not described again.

In this embodiment, in a state in which the middle part 3306 is plugged in the channel of the mounting groove 3304, label information of the label module 3303 is within a visual range or a photographing range. For specific description of the label information within the visual range and the photographing range, refer to Embodiment 1 for details. Details are not described again.

It may be learned that, to improve accuracy of recognizing the optical fiber connector body identified by using the label information, a location of the label information needs to be fixed as much as possible. In this embodiment, in a manner of avoiding as much as possible rotation of the mounting groove 3304 by using an axial line of the optical fiber connector body as a center, the location of the label information may be fixed, thereby effectively ensuring recognition of the optical fiber connector body identified by using the label information.

A limiting protrusion 3313 is disposed on the first channel opening 3308 in a direction toward the plug 3301. A limiting groove 3314 is disposed at a corresponding location between the middle part 3306 and the limiting protrusion 3313. In a state in which the middle part 3306 is plugged and fixed in the mounting groove 3304, the limiting protrusion 3313 is plugged in the limiting groove 3314.

In a state in which the limiting protrusion 3313 is plugged in the limiting groove 3314, the limiting groove 3314 can limit rotation of the mounting groove 3304 by using the limiting protrusion 3313, thereby implementing fixing of the location of the label information.

Optionally, in a state in which the middle part 3306 is plugged in the channel of the mounting groove 3304, the rear retainer 3302 may be sleeved on outer peripheral walls of the plurality of elastic arms 3310, to implement assembling of the optical fiber connector assembly.

This embodiment does not limit how the rear retainer 3302 is specifically sleeved on the outer peripheral walls of the plurality of elastic arms 3310. For example, the rear retainer 3302 shown in this embodiment may be made of an elastic material. When the rear retainer 3302 is sleeved on an outer peripheral wall of the middle part 3306, the rear retainer 3302 and the annular groove 3312 are fit in a swelling manner to implement connection. In a state in which the rear retainer 3302 and the annular groove 3312 are connected, the plurality of the elastic arms 3310 are located in the rear retainer 3302.

When the optical fiber connector assembly shown in this embodiment is used, by using an accommodation channel and a cabling channel disposed in the optical fiber connector assembly, the label information of the label module 3303 is effectively prevented from being blocked. For specific description of the accommodation channel and the cabling channel, refer to Embodiment 1. Details are not described again.

The optical fiber connector assembly shown in this embodiment is used. For specific description of beneficial effects of the label information, refer to Embodiment 1 for details. Details are not described again.

By using the accommodation channel and the cabling channel disposed in the optical fiber connector assembly shown in this embodiment, an optical cable is effectively prevented from blocking the label information. Therefore, clarity and integrity of the label information are effectively ensured, to improve accuracy of recognizing the optical fiber connector body based on the label information.

The optical fiber connector assembly shown in this embodiment is a separable connection structure. The label component may be connected to the optical fiber connector body according to a requirement during delivery or at an operational site, to improve a degree of freedom of connection between the optical fiber connector body and the label component.

In this embodiment, the middle part of the optical fiber connector body is plugged in the mounting groove, to implement connection between the label component and the optical fiber connector body, thereby reducing operation difficulty of connecting the label component to the optical fiber connector body and improving operation efficiency.

Because a structure between the label component and the optical fiber connector body is stable, stability of the structure of the optical fiber connector assembly is effectively improved. Therefore, in a subsequent use process of a network node, location deviation does not occur for the label information of the optical fiber connector assembly, to effectively ensure that the label information can be always within a line-of-sight range or the photographing range, thereby improving accuracy of recognizing the optical fiber connector body identified by using the label information.

When the optical fiber connector assembly shown in this embodiment is used, the label component is an integrally molded structure. When the label component needs to be mounted onto the optical fiber connector body, the label component may be directly mounted onto the optical fiber connector body, thereby improving mounting efficiency.

Embodiment 7

It can be learned from Embodiment 1 to Embodiment 6 that, to avoid a case in which the optical fiber connector body identified by using the label information cannot be accurately recognized because the label information is blocked, the accommodation channel and the cabling channel need to be disposed on the label component, to limit an extension path of the optical cable by using the accommodation channel and the cabling channel, so that the extension path of the optical cable does not block the label information within the line-of-sight range or the photographing range.

However, the accommodation channel and the cabling channel do not need to be additionally disposed in an optical fiber connector assembly shown in this embodiment, to achieve a purpose that the extension path of the optical cable does not block the label information within the line-of-sight range or the photographing range. For specific description, refer to FIG. 39 and FIG. 40.

An optical fiber connector assembly 3900 includes an optical fiber connector body 3901 and a label component. For description of a type of the optical fiber connector body 3901, refer to Embodiment 1. Details are not described again in this embodiment.

The label component shown in this embodiment specifically includes a connecting piece 3902 and a label module 3903.

The connecting piece 3902 is separately connected to the optical fiber connector body 3901 and the label module 3903. Specifically, a first end of the connecting piece 3902 is connected to the optical fiber connector body 3901, and a second end of the connecting piece 3902 is connected to the label module 3903.

Label information 3904 is set on a target surface of the label module 3903 shown in this embodiment. For specific description of the target surface and the label information 3904, refer to Embodiment 1. Details are not described again.

Specifically, the connecting piece 3902 shown in this embodiment has a first channel, and the label module 3903 has a second channel. The first channel is connected to the second channel. An optical cable 3905 of the optical fiber connector body 3901 extends through the first channel and the second channel.

Figure 39:
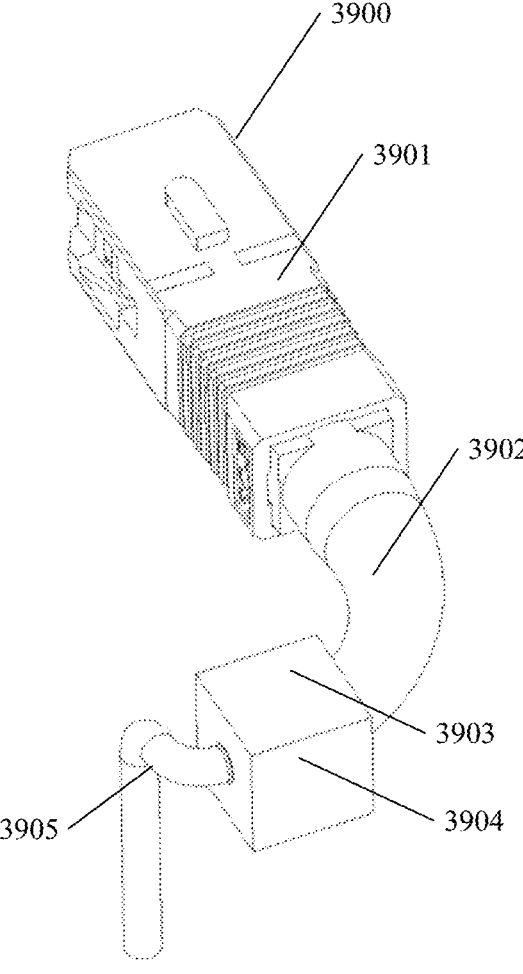
FIG. 39 is a schematic diagram of a structure of an embodiment of an optical fiber connector assembly in Embodiment 7 according to this application.

As shown in FIG. 39, this embodiment is described by using an example in which an entire structure of the label module 3903 is a square structure. It should be noted that the description of the entire structure of the label module 3903 in this embodiment is an optional example and is not limited, provided that the second channel in the label module 3903 can be connected to the first channel in the connecting piece 3902 and label information set on the label module 3903 is within a photographing range.

This embodiment is described by using an example in which an optical fiber connector assembly is an integrally molded structure. Specifically, the optical fiber connector body 3901 shown in this embodiment may include a plug and a middle part. For specific description of the plug and the middle part, refer to Embodiment 2. Details are not described again in this embodiment.

The connecting piece 3902 shown in this embodiment may be a rear retainer. Optionally, the rear retainer shown in this embodiment has specific rigidity, so that a location of the rear retainer can be changed under a function of an external force. In a process of plugging the optical fiber connector assembly shown in this embodiment into a subrack, construction personnel may exert an acting force on the rear retainer, so that the label information 3904 is in the photographing range.

Optionally, a structure of the rear retainer cannot be changed. In this case, it is ensured that the label information 3904 is within the photographing range by using the structure of the rear retainer during delivery.

It should be noted that description of the connecting piece 3902 in this embodiment is an optional example and is not limited. For example, the optical fiber connector body 3901 shown in this embodiment may include a plug, a middle part, and a rear retainer. For specific description of the plug, the middle part, and the rear retainer, refer to Embodiment 1 for details. Details are not described again in this embodiment.

The connecting piece 3902 shown in this embodiment may be sleeved on an outer peripheral surface of the rear retainer, so that the optical cable 3905 of the optical fiber connector body can extend in a first channel inside the connecting piece 3902.

In this example, a connection manner between the connecting piece 3902 and the rear retainer is not limited. For example, the connecting piece 3902 and the rear retainer may be connected in any manner such as a swelling fitting manner, a clamping connection manner, a magnetic connection manner, an elastic connection manner, or an adhesive manner. For specific description, refer to Embodiment 2. Details are not described again in this embodiment.

The following describes a reason why the connecting piece 3902 shown in this embodiment does not block the label information within the photographing range.

The optical cable 3905 of the optical fiber connector body 3901 shown in this embodiment can extend through the first channel and the second channel. In other words, the optical cable 3905 extends inside the connecting piece 3902 and the label module 3903. It can be learned that an extension path of the optical cable 3905 and the label information 3904 are in a non-coplanar state. Therefore, the optical cable 3905 does not block the label information 3904 in the photographing range, to effectively ensure that a camera obtains clear and complete label information.

Figure 40:
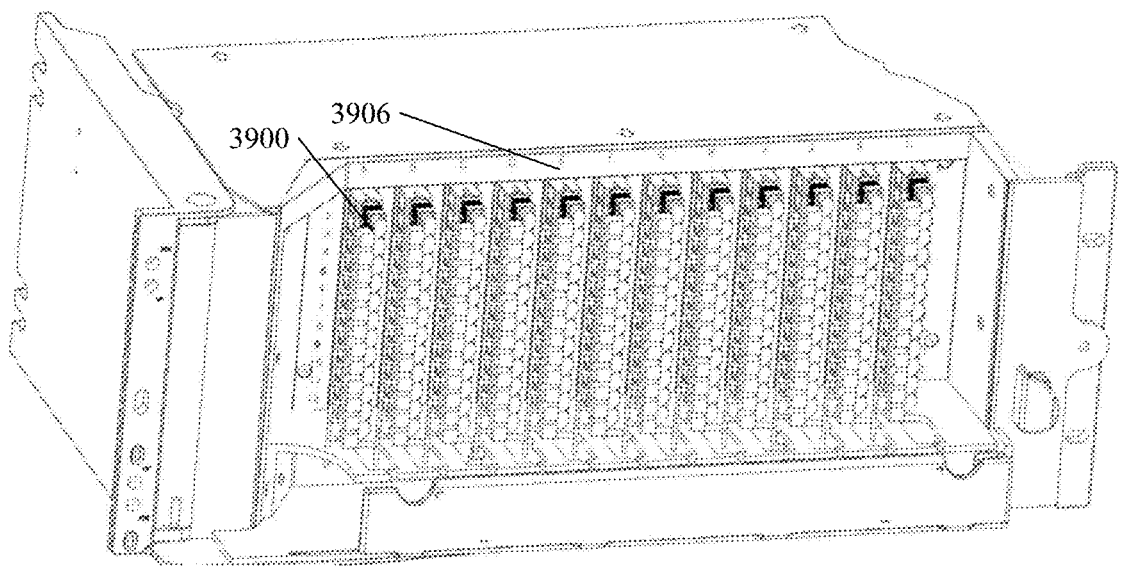
FIG. 40 is a schematic diagram of a structure of an embodiment of a network node with a plugged optical fiber connector assembly in Embodiment 7 according to this application.
Figure 41:
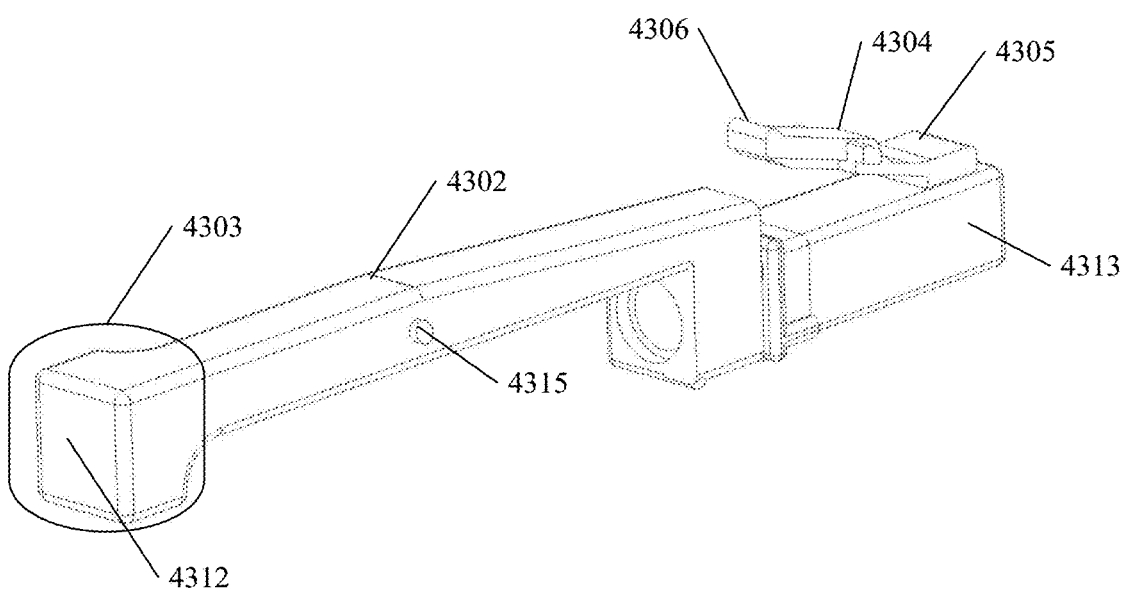
FIG. 41 is a schematic diagram of a local structure of an embodiment of an optical fiber connector assembly in Embodiment 8 according to this application.
Figure 42:
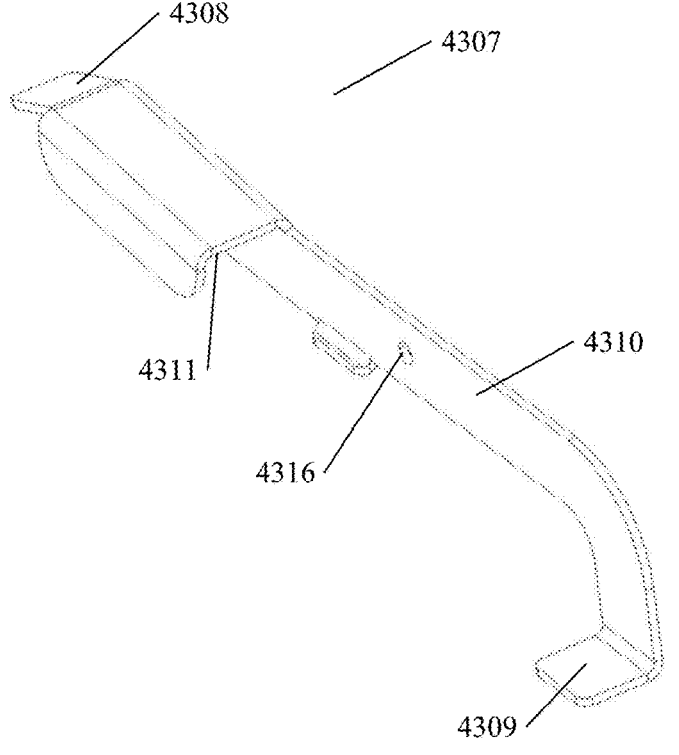
FIG. 42 is a schematic diagram of a local structure of another embodiment of an optical fiber connector assembly in Embodiment 8 according to this application.

The optical fiber connector assembly 3900 shown in this embodiment is plugged in a subrack 3906 shown in FIG. 40. For specific description of the subrack 3906, refer to Embodiment 1. Details are not described again.

It can be learned from FIG. 40 that, when a plurality of optical fiber connector assemblies are plugged in the subrack 3906, an optical cable connected to a first optical fiber connector assembly does not block label information of a second optical fiber connector assembly on the subrack 3906. For description of the first optical fiber connector assembly and the second optical fiber connector assembly, refer to Embodiment 1. Details are not described again in this embodiment.

For example, the optical cable of the first optical fiber connector assembly may extend through a region between the connecting piece 3902, the optical fiber connector body 3901, and the label module 3903 of the second optical fiber connector assembly, so that the optical cable of the first optical fiber connector assembly does not block the label information 3904.

For another example, to avoid a winding possibility of optical cables connected to different optical fiber connector assemblies plugged in the subrack 3906, the connecting pieces 3902 of the various optical fiber connector assemblies may be bent in the same direction. For example, in this embodiment, each connecting 3902 is bent toward a left side. In this embodiment, an angle at which the connecting piece 3902 is bent is not limited, provided that it can be ensured that the label information 3904 is within the photographing range after the connecting piece 3902 is bent.

When the connecting piece 3902 of each optical fiber connector assembly is bent toward the left side, the optical cable connected to each optical fiber connector assembly may be led out from the left side of the label module 3903, so that an extension path of the optical cable to which each optical fiber connector assembly is connected does not block label information of any optical fiber connector assembly plugged in the subrack 3906.

For description of beneficial effects of the label information of the optical fiber connector assembly shown in this embodiment, refer to Embodiment 1 for details. Details are not described again in this embodiment.

The optical fiber connector assembly shown in this embodiment is an integrally molded structure, and setting of the label information may be completed during delivery of the optical fiber connector assembly, to simplify operation steps at an operational site. An optical fiber connector is directly plugged in a corresponding adapter at the operational site, to improve efficiency of mounting the optical fiber connector assembly onto the subrack. Optionally, the label information may not be set during delivery of the optical fiber connector assembly, and the label information is set on the target surface of the optical fiber connector assembly at the operational site.

A specific location of the connecting piece of the optical fiber connector assembly shown in this embodiment is adjustable. In a construction phase, construction personnel adjust the location of the connecting piece based on an extension status of the optical cable in the subrack, to prevent the optical cable from blocking the label information. Alternatively, the location of the connecting piece may be adjusted based on a location of a camera, so that the label information can be always within the photographing range, thereby accurately recognizing the optical fiber connector body identified by using the label information.

Because the optical fiber connector assembly is an integrally molded structure, stability of a structure of the optical fiber connector assembly is effectively improved, and difficulty of plugging the optical fiber connector assembly into the subrack is reduced, and efficiency of plugging the optical fiber connector assembly into the subrack is improved.

Embodiment 8

Embodiments 1 to 7 provide an optical fiber connector assembly. In a phase of using the optical fiber connector assembly, the optical fiber connector assembly needs to be plugged in an adapter corresponding to a subrack according to a requirement, and the optical fiber connector assembly also needs to be unplugged from the adapter.

This embodiment provides an optical fiber connector assembly, to reduce operation difficulty in a process of plugging the optical fiber connector assembly in the adapter in the subrack and in a process of unplugging the optical fiber connector assembly from the adapter, thereby improving operation efficiency.

The optical fiber connector assembly shown in this embodiment includes an optical fiber connector body, a connecting piece, and a label module. For specific description of the optical fiber connector body, the connecting piece, and the label module, refer to any one of Embodiment 1 to Embodiment 7. Details are not described again in this embodiment.

This embodiment is described by using an example in which the optical fiber connector body is an LC-type optical fiber connector. With reference to FIG. 41 to FIG. 45, the following specifically describes a structure of the optical fiber connector assembly shown in this embodiment.

An optical fiber connector assembly 4300 shown in this embodiment includes an optical fiber connector body 4301, a connecting piece 4302, and a label module 4303.

The optical fiber connector assembly 4300 shown in this embodiment further includes a spring arm 4304. Specifically, a first end 4305 of the spring arm 4304 is connected to a plug 4313 of the optical fiber connector body 4301. For description of the plug 4313, refer to the foregoing embodiment. Details are not described again.

A gap exists between a second end 4306 of the spring arm 4304 and the optical fiber connector body 4301. In other words, in a state in which an acting force in a direction toward the plug 4313 is exerted on the second end 4306 of the spring arm 4304, a gap between the second end 4306 of the spring arm 4304 and the optical fiber connector body 4301 is compressed. In a state in which an acting force in a direction toward the plug 4313 is not exerted on the second end 4306 of the spring arm 4304, the spring arm 4304 springs back, thereby enlarging the gap between the second end 4306 of the spring arm 4304 and the optical fiber connector body 4301 until the spring arm 4304 is restored to an initial state.

The optical fiber connector assembly further includes an unlocking piece 4307 connected to the connecting piece 4302. The unlocking piece 4307 includes an abutting end 4308 and a function end 4309. The abutting end 4308 is connected to the function end 4309 by using a transition rod 4310.

Specifically, a clamping groove 4311 is formed on an end that is of the unlocking piece 4307 and that is close to the abutting end 4308, and the optical fiber connector body 4301 is plugged in the clamping groove 4311, to effectively ensure stability of a structure between the unlocking piece 4307 and the optical fiber connector body 4301, thereby avoiding a case in which the unlocking piece 4307 is detached from the connecting piece 4302.

The clamping groove 4311 extends in a direction toward the plug 4313 to form the abutting end 4308. In a state in which the optical fiber connector body 4301 is plugged in the clamping groove 4311, the abutting end 4308 abuts against the second end 4306 of the spring arm 4304.

The function end 4309 extends to a location close to a target surface 4312 of the label module 4303. For specific description of the target surface 4312, refer to Embodiment 1 for details. Details are not described again in this embodiment.

In a state in which the function end 4309 extends to the location close to the target surface 4312 of the label module 4303, construction personnel may not exert an acting force on the plug 4313 of the optical fiber connector body 4301, to achieve a purpose of remotely plugging the optical fiber connector body 4301 in the adapter and unplugging the optical fiber connector body 4301 from the adapter.

The following describes a process of remotely unplugging the optical fiber connector body 4301 from the adapter.

Figure 43:
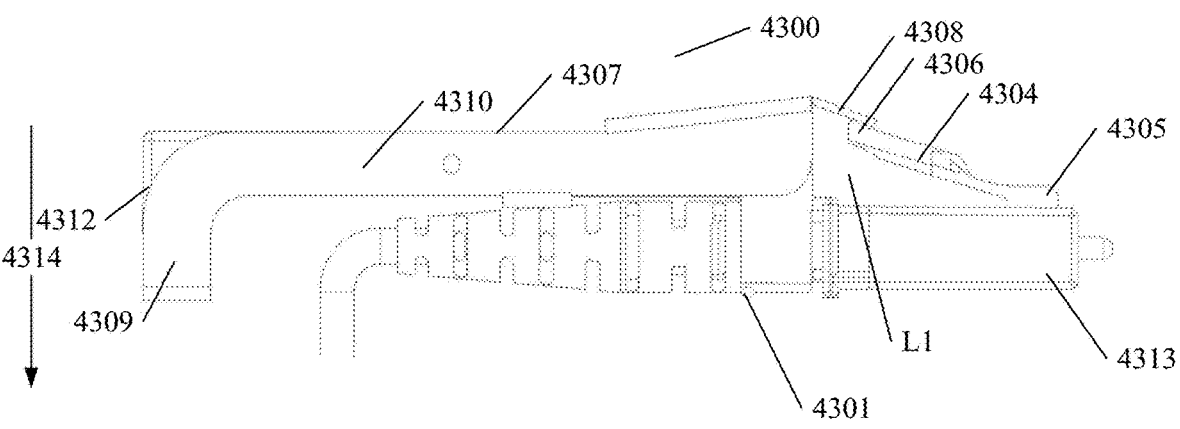
FIG. 43 is a schematic diagram of a structure of an embodiment of an optical fiber connector assembly in Embodiment 8 according to this application.

In a state in which the optical fiber connector assembly 4300 shown in this embodiment is plugged in the adapter, reference may be made to FIG. 43 for a structure of the optical fiber connector assembly 4300. In other words, a gap L1 exists between the spring arm 4304 and the plug 4313, and the spring arm 4304 is clamped and fixed on an inner peripheral wall of the adapter, thereby implementing fixing between the optical fiber connector assembly 4300 and the adapter. In addition, the abutting end 4308 shown in this embodiment is located between the adapter and the abutting end 4308. In this case, the function end 4309 is in an unstressed state.

To achieve a purpose of unplugging the optical fiber connector assembly 4300 from the adapter, as shown in FIG. 43, an acting force that is used to drive the unlocking piece 4307 to rotate is exerted on the function end 4309. For example, a downward acting force (that is, a direction 4314 shown in FIG. 43) is exerted on the function end 4309, so that the unlocking piece 4307 rotates. It should be noted that in this embodiment, description of a direction of the acting force exerted on the function end 4309 is an optional example and is not limited, provided that the acting force can enable the unlocking piece 4307 to rotate and the function end 4309 exerts an acting force on the spring arm 4304 to compress a gap between the second end 4306 of the spring arm 4304 and the optical fiber connector body 4301.

Specifically, to implement rotation of the unlocking piece 4307, a rotation protrusion 4315 is disposed on the connecting piece 4302, a rotation hole 4316 is disposed on the transition rod 4310, and the rotation protrusion 4315 fits the rotation hole 4316. In a state in which the rotation protrusion 4315 is plugged in the rotation hole 4316, the unlocking piece 4307 rotates by using the rotation hole 4316 as a center.

Figure 44:
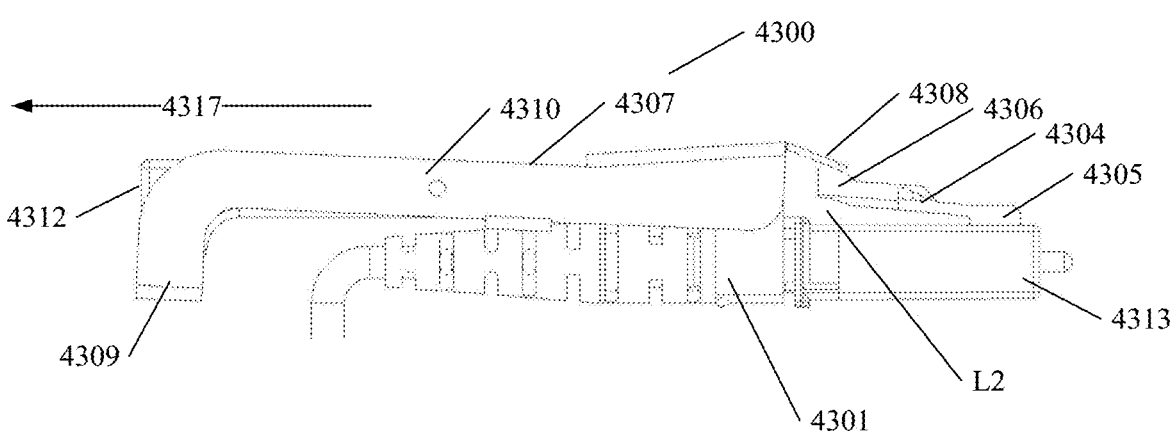
FIG. 44 is a schematic diagram of a structure of another embodiment of an optical fiber connector assembly in Embodiment 8 according to this application.
Figure 45:
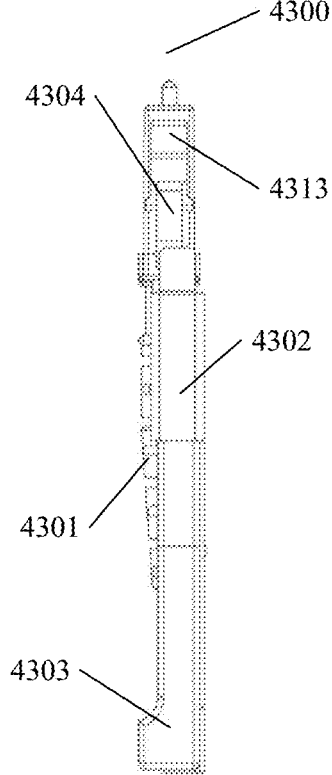
FIG. 45 is a schematic diagram of a structure of another embodiment of an optical fiber connector assembly in Embodiment 8 according to this application.

It can be learned that, as shown in FIG. 44, the acting force exerted on the function end 4309 in the direction 4314 causes a gap between the spring arm 4304 and the plug 4313 to become L2. Herein, L2 is less than L1.

In a state in which the gap between the spring arm 4304 and the plug 4313 is L2, a gap exists between the spring arm 4304 and the inner peripheral wall of the adapter, so that the spring arm 4304 cannot continue to abut against the adapter to be fixed. In this case, an acting force in a direction away from the adapter (that is, a direction 4317 shown in FIG. 44) may be exerted on the connecting piece 4302. Because the spring arm 4304 cannot continue to abut against the adapter to be fixed, the optical fiber connector assembly 4300 may be unplugged from the adapter under a function of the acting force in the direction away from the adapter.

A process of plugging the optical fiber connector assembly 4300 in the adapter is a reverse process of unplugging the optical fiber connector assembly 4300 from the adapter. Details are not described.

For beneficial effects of the optical fiber connector assembly shown in this embodiment, refer to any one of Embodiment 1 to Embodiment 7. Details are not described again.

Based on the beneficial effects of the foregoing embodiment, when the optical fiber connector assembly shown in this embodiment is used, a purpose of remotely plugging the optical fiber connector assembly in the adapter and remotely unplugging the optical fiber connector assembly from the adapter can be achieved by using the unlocking piece. It can be learned that in a process of plugging and unplugging the optical fiber connector assembly, construction personnel does not need to exert acting force in a region of the plug by using hands, thereby improving operation efficiency of plugging and unplugging the optical fiber connector assembly. In addition, because a remote operation is performed on the optical fiber connector assembly, the following case is avoided: The hands of the construction personnel are in contact with the optical fiber connector assembly and the optical cable. Therefore, a possibility that the optical fiber connector assembly and the optical cable become faulty under a function of the external force is avoided, thereby improving safety.

Embodiment 9

This embodiment provides a label system 4600. The following describes the label system 4600 with reference to FIG. 46 to FIG. 49.

The label system 4600 shown in this embodiment includes a subrack 4601. For specific description of the subrack 4601, refer to Embodiment 1 for details. Details are not described again in this embodiment.

The subrack 4601 includes a plurality of adapters 4602. Specifically, a plurality of ports are disposed in the subrack 4601. A first end 4603 of the adapter 4602 is configured to be plugged and fixed in the port of the subrack 4601, to implement fixing between the adapter 4602 and the subrack. A second end 4604 of the adapter 4602 is configured to connect to the optical fiber connector assembly 4605.

An elastic buckle 4606 is disposed on a sidewall of the first end 4603 of the adapter 4602 shown in this embodiment. A buckle slot is disposed at a location on an inner peripheral wall of the port corresponding to the elastic buckle 4606. In a state in which the elastic buckle 4606 is clamped and fixed in the buckle slot, fixing between the adapter 4602 and the port of the subrack 4601 is implemented.

A fixing manner between the adapter 4602 and the port of the subrack 4601 is not limited in this embodiment. For example, a magnetic connection manner, an elastic connection manner, or an adhesive manner may be used between the adapter 4602 and the port of the subrack 4601. For specific description, refer to Embodiment 2. Details are not described again in this embodiment.

For a structure of the optical fiber connector assembly 4605 shown in this embodiment, refer to any one of Embodiment 1 to Embodiment 8. Details of the specific structure of the optical fiber connector assembly are not described again in this embodiment.

A positioning protrusion 4607 is disposed on a housing body of the optical fiber connector assembly 4605 shown in this embodiment. A positioning groove 4608 is disposed at a corresponding location between the second end 4604 of the adapter 4602 and the positioning protrusion 4607. In a state in which the positioning protrusion 4607 is plugged and fixed in the positioning groove 4608, connection between the optical fiber connector assembly 4605 and the adapter 4602 is implemented.

Specific structures of the positioning protrusion 4607 and the positioning groove 4608 are not limited in this embodiment, provided that shapes of the positioning groove 4608 and the positioning protrusion 4607 match to improve stability of a connection structure between the optical fiber connector assembly 4605 and the adapter 4602. For example, the positioning protrusion 4607 is a tapered structure, and the positioning groove 4608 whose shape matches the shape of the positioning protrusion 4607 may be a horn mouth structure. For another example, the positioning protrusion 4607 and the positioning groove 4608 may be both rectangular structures or the like.

It should be noted that a specific structure of the adapter 4602 is not limited in this embodiment, provided that the adapter 4602 can be connected to the optical fiber connector assembly 4605 to implement optical signal transmission.

Figure 46:
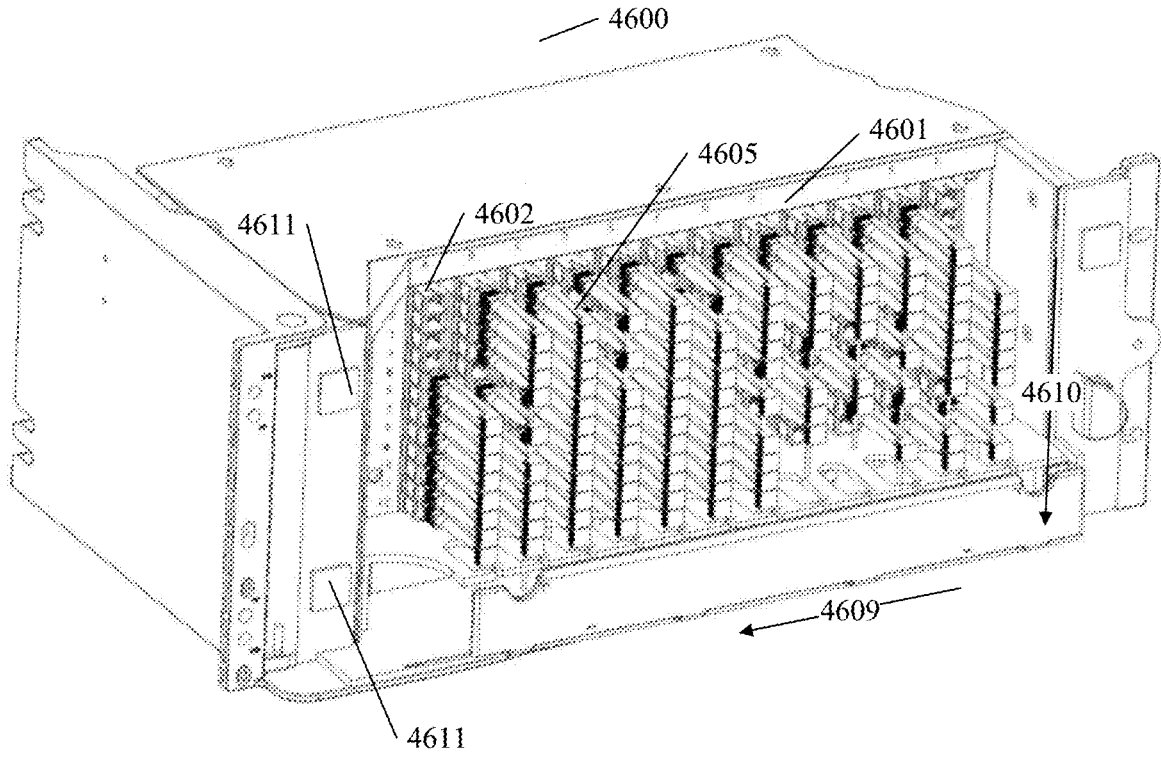
FIG. 46 is a schematic diagram of a structure of an embodiment of a label system in Embodiment 9 according to this application.
Figure 47:
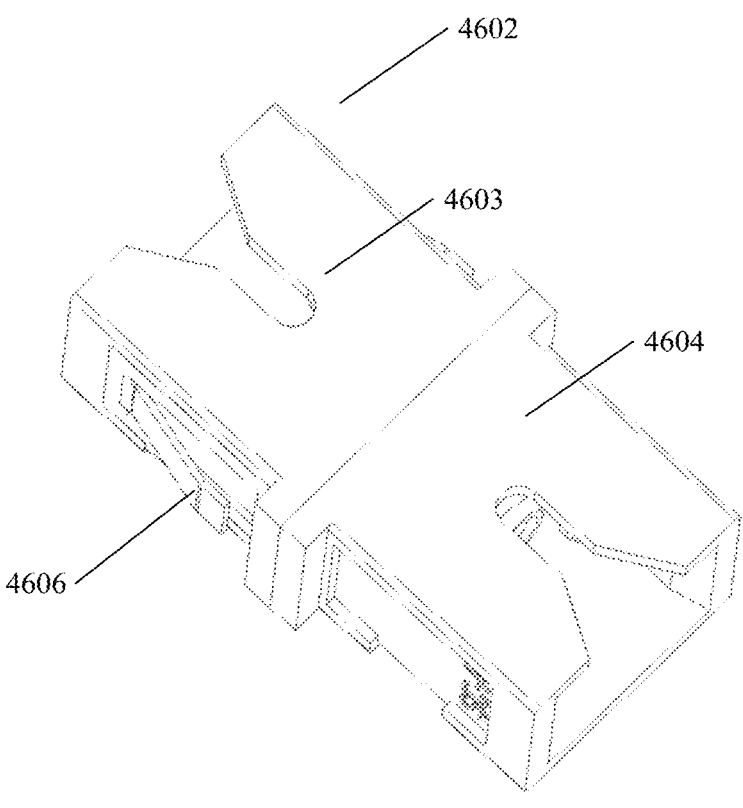
FIG. 47 is a schematic diagram of a structure of an embodiment of an adapter in Embodiment 9 according to this application.
Figure 48:
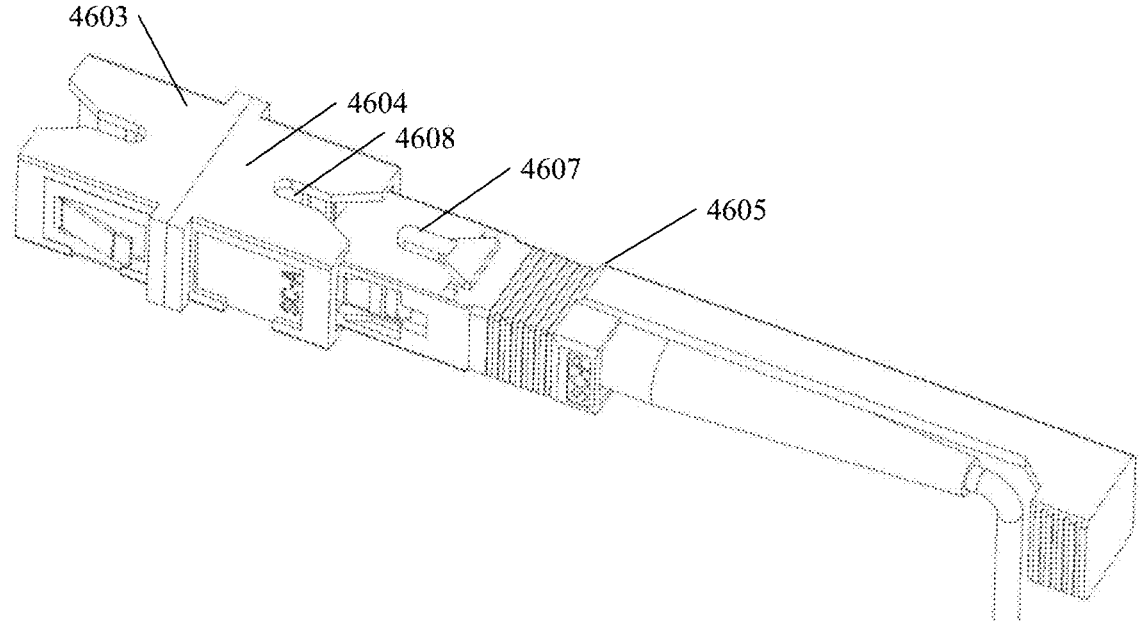
FIG. 48 is a schematic diagram of a structure of an embodiment of an optical fiber connector assembly plugged in an adapter in Embodiment 9 according to this application.
Figure 49:
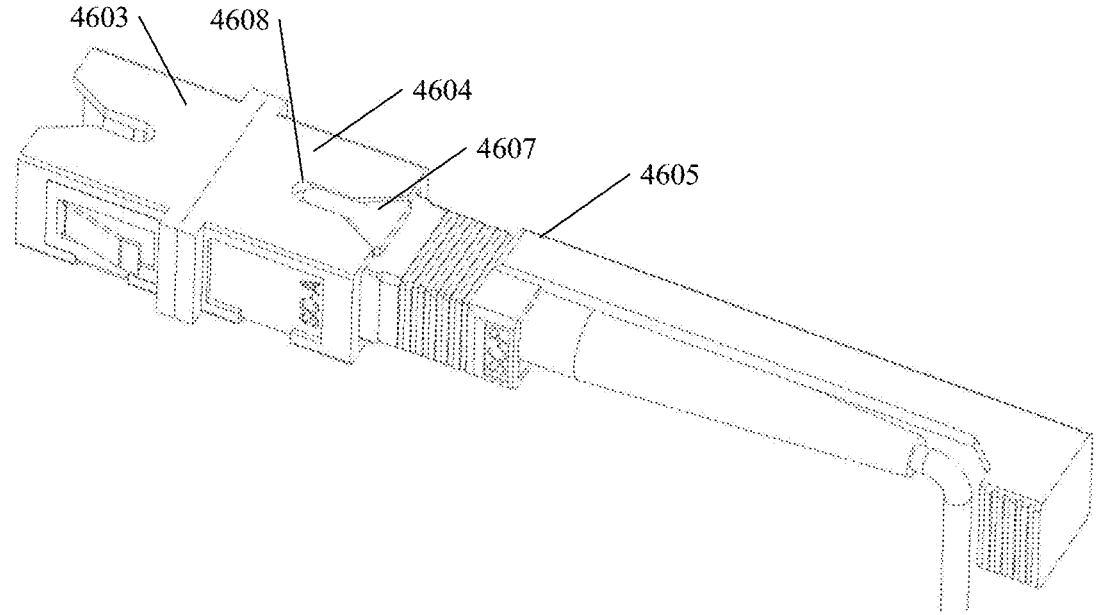
FIG. 49 is a schematic diagram of a structure of another embodiment of an optical fiber connector assembly plugged in an adapter in Embodiment 9 according to this application.

As shown in FIG. 46, when a plurality of optical fiber connector assemblies 4605 are plugged in the subrack 4601 by using the adapters 4602, and the subrack 4601 is within a visual range or a photographing range, label information of the various optical fiber connector assemblies 4605 plugged in the subrack 4601 may have a uniform orientation, and the label information of the various optical fiber connector assemblies 4605 are within a line-of-sight range or the photographing range. For specific description of the label information, the line-of-sight range, and the photographing range, refer to Embodiment 1 for details. Details are not described again.

That the label information of various optical fiber connector assemblies 4605 plugged in the subrack 4601 may have the uniform orientation may indicate that the label information of various optical fiber connector assemblies 4605 plugged in the subrack 4601 forms a label array. The label information included in the label array may be located at the same surface. The surface at which the label array is located may be a planar structure, a curved surface structure, a concave and convex structure, or the like, provided that each piece of label information included in the label array is within the visible range or the photographing range.

It can be learned that when the subrack 4601 is photographed by using a camera, an obtained target image may include the label information of all the optical fiber connector assemblies 4605 plugged in the subrack 4601, so that various optical fiber connector bodies plugged in the subrack 4601 can be recognized based on the label information. For specific description of the optical fiber connector body, refer to Embodiment 1 for details. Details are not described again.

Optionally, in the label system shown in this embodiment, when the plurality of optical fiber connector assemblies 4605 are plugged in the subrack 4601, to avoid winding of optical cables led out from the various optical fiber connector assemblies 4605 and facilitate sorting of optical cables in the label system, the optical cables led out from the various optical fiber connector assemblies 4605 shown in this embodiment may extend in the same direction in the subrack 4601.

For example, the optical cables connected to the various optical fiber connector assemblies 4605 are led out from the label modules of the various optical fiber connector assemblies 4605 in a direction 4609. The direction 4609 is a horizontal direction of the subrack 4601. The direction 4609 is further a left direction of each optical fiber connector assembly 4605.

Subsequently, the optical cables led out from the label modules of the various optical fiber connector assemblies 4605 are led out from the subrack 4601 in a direction 4610. The direction 4610 is a vertical direction of the subrack 4601.

It should be noted that in this embodiment, description of an extension path of the optical cable connected to each optical fiber connector assembly 4605 in the subrack 4601 is an optional example and is not limited, provided that winding does not occur between the optical cables connected to different optical fiber connector assemblies 4605 to facilitate sorting of the optical cables.

By using the label system shown in this embodiment, it can be further accurately recognized whether the optical fiber connector body identified by using the label information is plugged in the corresponding adapter.

For better understanding, the following first describes a process in an existing solution for implementing recognition on whether an optical fiber connector assembly is plugged in an adapter corresponding to the optical fiber connector assembly.

In an optical network, to ensure that an optical signal can be accurately transmitted from a source node to a target node, each optical fiber connector assembly needs to be accurately plugged in an adapter corresponding to the optical fiber connector assembly. In the existing solution, whether the optical fiber connector assembly is accurately plugged in the adapter corresponding to the optical fiber connector assembly can be recognized in an RFID manner.

Specifically, paired RFID labels are added to the adapter and the optical fiber connector assembly, and the RFID label of the adapter and the RFID label of the optical fiber connector assembly are recognized by using a dedicated recognition apparatus. If it is detected that the RFID label of the adapter and the RFID label of the optical fiber connector assembly are paired, it is recognized that the optical fiber connector assembly is plugged in the adapter corresponding to the optical fiber connector assembly.

However, recognition performed in the RFID manner requires the dedicated recognition apparatus, thereby increasing the recognition costs. In addition, when the label system includes a large quantity of adapters and a large quantity of optical fiber connector assemblies, recognition needs to be performed one by one by using the recognition apparatus, thereby greatly reducing recognition efficiency.

In a process of performing recognition by using the label system shown in this embodiment, based on the target image obtained through photographing the subrack by using the camera, it may be determined whether each optical fiber connector assembly included in the target image is plugged in the corresponding adapter. This recognition process requires no dedicated recognition apparatus, and no independent operation needs to be performed on each fiber connector assembly, thereby reducing recognition difficulty and improving recognition efficiency.

When the label system shown in this embodiment is used, to implement the recognition process, preset arrangement information needs to be obtained in advance. The preset arrangement information is an arrangement status of an adapter array in a world coordinate system. The preset arrangement information is, in N rows of adapters and M columns of adapters included in the adapter array, specific values of N and M, and specific coordinates of each adapter included in the adapter array in the world coordinate system. The adapter array includes the plurality of adapters plugged in the subrack.

In other words, a total quantity of adapters included in the adapter array, row and column arrangement statuses of all the adapters in the subrack, a quantity of adapters included in each row, a quantity of adapters included in each column, and coordinates of each adapter in the word coordinate system are determined based on the preset arrangement information.

In the label system shown in this embodiment, the preset arrangement information may be determined in the following manner:

A mark structure 4611 is disposed on a surface of the subrack 4601 shown in this embodiment. The mark structure 4611 is used to indicate the preset arrangement information.

Specifically, in a process of recognizing, by using an electronic apparatus such as a smartphone, a tablet computer, a computer, or a processor in a network node, whether the optical fiber connector assembly is plugged in the corresponding adapter, a correspondence between the mark structure 4611 and the preset arrangement information may be prestored in the electronic apparatus. When recognition needs to be performed, the electronic apparatus may obtain, based on the mark structure 4611, the preset arrangement information corresponding to the mark structure 4611.

The preset arrangement information shown in this embodiment further includes a relative location relationship between each adapter included in the adapter array and the mark structure 4611 in the world coordinate system. When obtaining the target image and the arrangement information of the adapter array, the electronic apparatus can recognize whether each optical fiber connector assembly included in the target image is plugged in the corresponding adapter.

The mark structure 4611 shown in this embodiment may be a two-dimensional barcode, a unique identifier, a barcode, digital text information, a preset color, a preset structure, or the like. The preset structure is any shape of the entire mark structure, for example, a rectangle, a square, or a circle, and the preset color may be any color such as red or blue, provided that the mark structure 4611 having the preset structure and the mark structure having the preset color can be easily recognized by using an image recognition technology. For example, as shown in FIG. 46, the preset structure is a square.

This embodiment does not limit a specific quantity of mark structures 4611 and a specific location on the surface of the subrack 4601, provided that the mark structure 4611 is within the photographing range of the camera when the camera photographs the subrack 4601.

This embodiment does not limit a fixing manner between the mark structure 4611 and the subrack 4601. For example, the mark structure 4611 may be fixed on the surface of the subrack 4601 in any manner such as a magnetic connection manner, an elastic connection manner, or an adhesive manner.

Optionally, this embodiment is described by using an example in which a detachable connection relationship exists between the mark structure 4611 and the surface of the subrack 4601. In another example, the mark structure 4611 may be alternatively a part of the subrack 4601. For example, the surface of the subrack 4601 extends to form the mark structure 4611. Alternatively, the mark structure 4611 may be an easily recognized structural feature of the subrack, for example, an edge of the subrack or a structural feature of the adapter.

For description of beneficial effects of the label system shown in this embodiment, refer to any one of the foregoing embodiments. Details are not described again.

In addition, by using the label system shown in this embodiment, it can be recognized whether the optical fiber connector assembly identified by using the label information is plugged in the corresponding adapter. An operation of the recognition process is simple and highly efficient.

By using the label system shown in this embodiment, digitization management of all adapter resources included in the subrack can be further implemented. The digitization management may indicate that the target image may be obtained through photographing the subrack. Through image analysis performed on the target image, the following information may be obtained: in the plurality of adapters included in the subrack, an adapter connected to the optical fiber connector assembly, an adapter in an idle state, a specific adapter included in the subrack, and a route of a fiber patch cord connected between different adapters. Therefore, specific statuses of all the adapters included in the subrack can be digitized and visualized, and the operation and maintenance costs of a network node can be effectively reduced through digitization management.

Embodiment 10

This embodiment provides a recognition method based on Embodiment 9. For a specific structure of a label system to which the recognition method shown in this embodiment is applied, refer to Embodiment 9 for details. Details are not described again.

Figure 50:
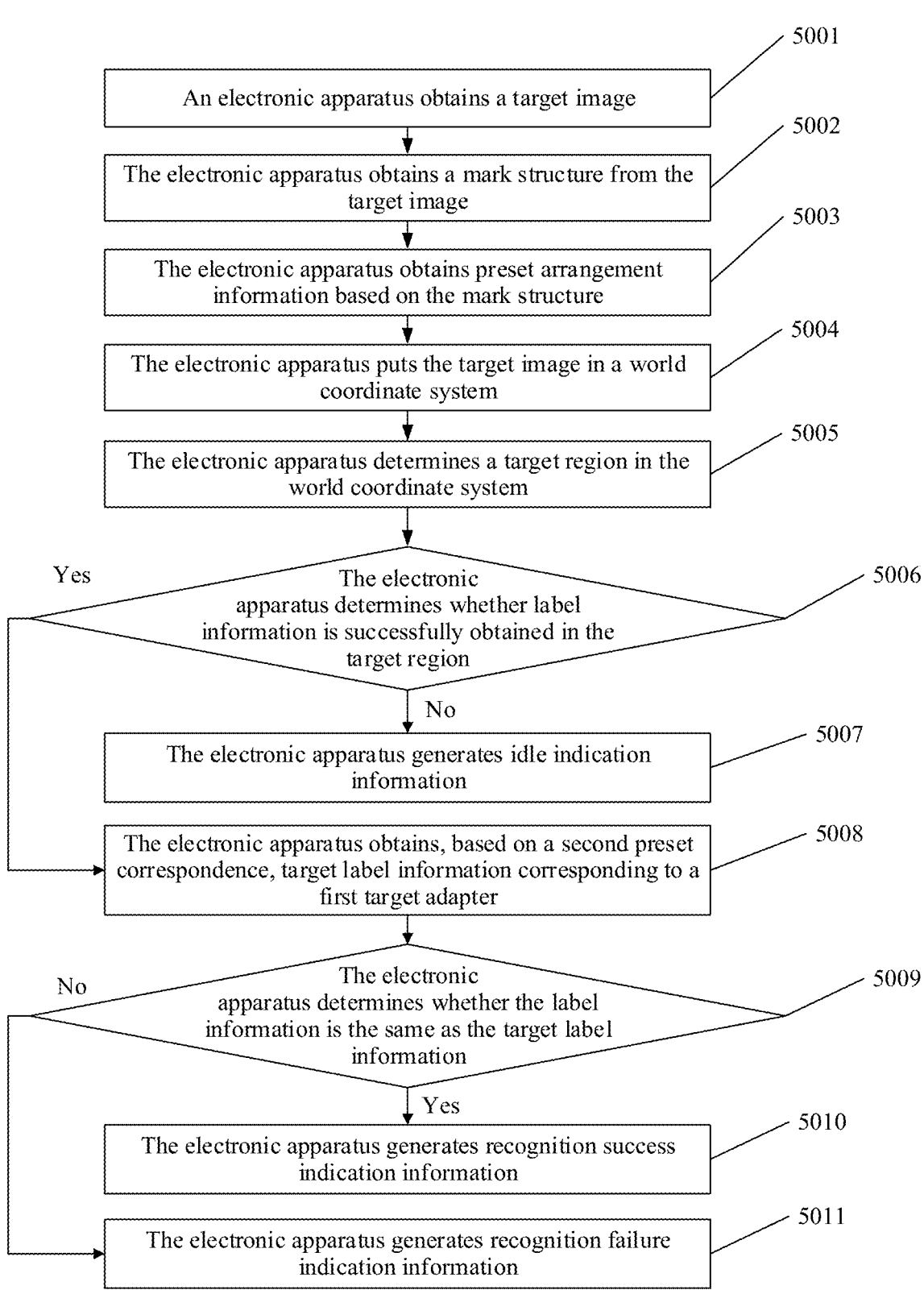
FIG. 50 is a flowchart of steps of an embodiment of an identification method in Embodiment 10 according to this application.

With reference to FIG. 50, the following describes an execution process of the recognition method shown in an embodiment.

Step 5001: An electronic apparatus obtains a target image.

In this embodiment, if an optical fiber connector assembly is plugged in an adapter array on a subrack, a camera may obtain a target image when the adapter array is photographed.

It may be learned from the description in Embodiment 9 that, when a plurality of optical fiber connector assemblies are plugged in the subrack, a label array formed by label information of all the optical fiber connector assemblies plugged in the subrack are within a photographing range. It can be learned that the target image obtained after the camera photographs the adapter array includes the label array.

An execution entity of the method shown in this embodiment is described below.

The execution entity of the method shown in this embodiment is an electronic apparatus. The electronic apparatus may be a smartphone, a tablet computer, or the like including a camera. The electronic apparatus shown in this embodiment may be alternatively a processor or the like in a network node included in a computer or a label system. If the execution entity is the processor included in the computer or the label system, when the camera of the smartphone or the tablet computer photographs the subrack to obtain the target image, the processor included in the computer or the label system may obtain the target image, to perform recognition based on the target image.

It should be noted that description of the execution entity in this embodiment is an optional example and is not limited, provided that the method shown in this embodiment can be performed.

It should be noted that this embodiment is described by using an example in which the target image is obtained through photographing all regions of the subrack by the camera. In another example, the target image may be alternatively obtained through photographing some regions of the subrack by the camera. This is not specifically limited in this embodiment.

Step 5002: The electronic apparatus obtains a mark structure from the target image.

For specific description of the mark structure, refer to Embodiment 9. Details are not described again in this embodiment.

Step 5003: The electronic apparatus obtains preset arrangement information based on the mark structure.

In this embodiment, the electronic apparatus prestores a correspondence between the mark structure and the preset arrangement information. It can be learned that, when the electronic apparatus obtains the mark structure from the target image, the corresponding preset arrangement information may be obtained. For specific description, refer to Embodiment 9 for details. Details are not described again.

It can be learned from Embodiment 9 that the preset arrangement information indicates an arrangement status of the adapter array in a world coordinate system. For details, refer to FIG. 51A for details. It can be learned that an observation direction of the world coordinate system shown in this embodiment is a Z-axis positive direction of the world coordinate system.

Figure 51A:
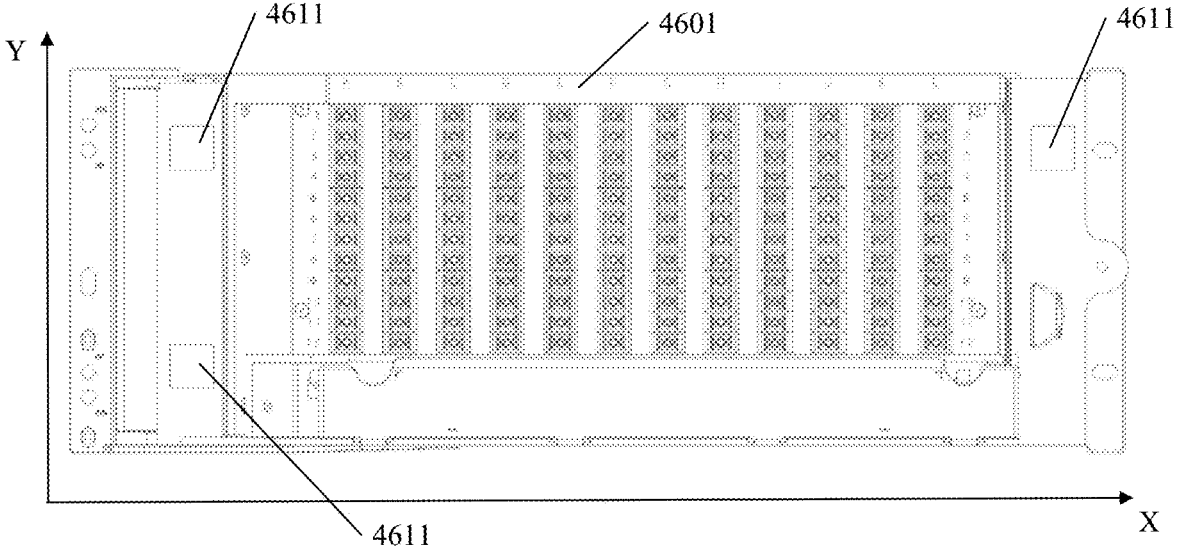
FIG. 51A is a schematic diagram of an embodiment of a coordinate system including a subrack in Embodiment 10 according to this application.

As shown in FIG. 51A, it can be learned that the preset arrangement information includes: a total quantity of adapters included in the adapter array in a state in which an optical fiber connector assembly is not plugged in the subrack 4601, a row and column arrangement status of all the adapters on the subrack 4601, a quantity of adapters included in each row and a quantity of adapters included in each column, coordinates of each adapter in the world coordinate system, and a relative location relationship between each adapter included in the adapter array and the mark structure 4611 in the world coordinate system.

Step 5004: The electronic apparatus puts the target image in the world coordinate system.

Figure 51B:
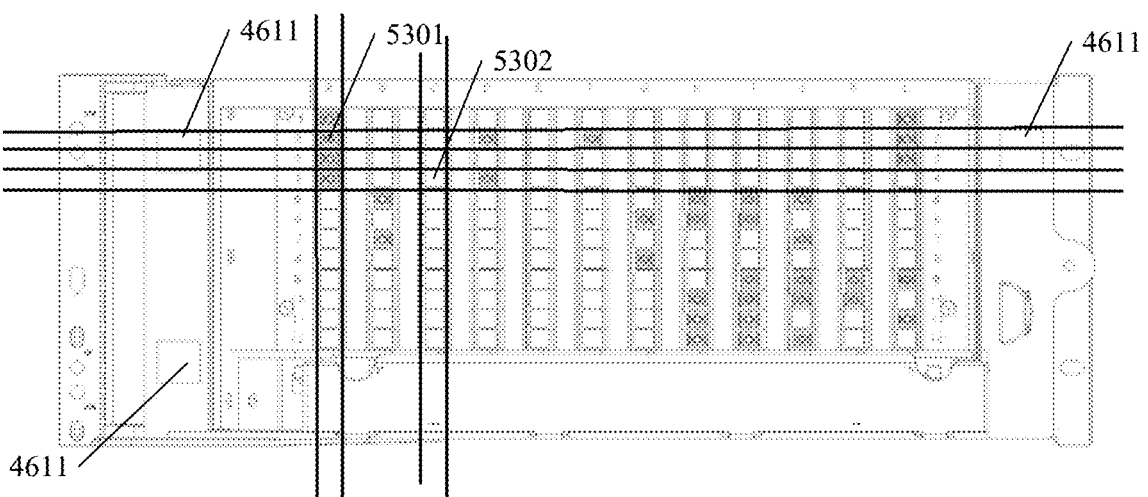
FIG. 51B is a schematic diagram of another embodiment of a coordinate system including a subrack in Embodiment 10 according to this application.

The electronic apparatus may put the target image in the world coordinate system shown in FIG. 51B by using a conversion matrix. For description of the world coordinate system, refer to the description of the world coordinate system shown in Embodiment 9. Details are not described again.

Specifically, the electronic apparatus may put the target image in the world coordinate system based on the mark structure 4611 included in the target image, and ensure that a location, a posture, and an angle of the mark structure 4611 in the preset arrangement information are all the same as those in the world coordinate system shown in FIG. 51B. Therefore, a relative location relationship between the mark structure 4611 and the adapter in the preset arrangement information is the same as a relative location relationship between the mark structure 4611 and the same adapter in the world coordinate system shown in FIG. 51B.

Step 5005: The electronic apparatus determines a target region in the world coordinate system.

Specifically, in a state in which the electronic apparatus puts the target image in the world coordinate system shown in FIG. 51B, the electronic apparatus may divide, in the world coordinate system based on the arrangement status that is of the adapter array and that is included in the preset arrangement information, a surface of the subrack shown in the world coordinate system to form a plurality of regions. An arrangement manner of the plurality of regions is the same as an arrangement manner of the plurality of adapters included in the adapter array. In addition, the plurality of regions are in one-to-one correspondence with the plurality of adapters.

For example, the plurality of adapters included in the adapter array are arranged in a manner of N rows and M columns. In this case, the plurality of regions are also arranged in a manner of N rows and M columns in the world coordinate system to form a region array. A location of each region in the world coordinate system is the same as a location of an adapter that corresponds to the region and that is in the adapter array.

For example, if a region 5301 is located in a second row and a first column in the region array, an adapter corresponding to the region 5301 is also located in a second row and a first column in the adapter array.

In this embodiment, location information that is of the target region and that is obtained by the electronic apparatus is coordinates of the target region in the world coordinate system.

The target region shown in this embodiment may be any region included in the region array.

Step 5006: The electronic apparatus determines whether label information is successfully obtained in the target region, and if the label information is not successfully obtained in the target region, performs step 5007; or if the label information is successfully obtained in the target region, performs step 5008.

In this embodiment, if an optical fiber connector assembly is plugged in a first target adapter corresponding to the target region, label information of the optical fiber connector assembly is shown in the target region. In this way, the electronic apparatus can successfully obtain the label information in the target region.

For example, in this embodiment, the label information is a two-dimensional barcode, and the two-dimensional barcode includes graphic information. As shown in this embodiment, the graphic information may be obtained in the target region.

It can be learned that the electronic apparatus shown in this embodiment can further implement a digitization management process of the subrack. In other words, the electronic apparatus successfully obtains the label information in the target region. It indicates that the optical fiber connector assembly identified by using the label information is plugged in the first target adapter. The electronic apparatus may determine, based on the target image, an optical fiber connector assembly plugged in each first target adapter, to implement digitalized recording and management of an adapter resource of the subrack. Therefore, a plugging relationship between an optical fiber connector assembly and an adapter does not need to be separately manually viewed and recorded on site, thereby effectively improving accuracy and efficiency of managing the adapter resource of the subrack.

If no optical fiber connector assembly is plugged in the first target adapter corresponding to the target region, the electronic apparatus cannot successfully obtain the label information in the target region.

Step 5007: The electronic apparatus generates idle indication information.

In this embodiment, if the electronic apparatus determines that the label information is not successfully obtained from the target region, the electronic apparatus determines that the first target adapter is an idle adapter in which the optical fiber connector assembly is not plugged.

The electronic apparatus may generate the idle indication information. The idle indication information is used to indicate a location of the first target adapter in the adapter array. For example, the idle indication information is used to indicate a specific row and a specific column of the first target adapter in the adapter array.

Specific content of the idle indication information is not limited in this embodiment, provided that maintenance personnel can determine a specific location of the idle adapter in the adapter array based on the idle indication information.

In the method shown in this embodiment, the idle adapter in which the optical fiber connector assembly is not plugged can be determined in the adapter array based on the target image, so that a corresponding optical fiber connector assembly is subsequently allocated to the idle adapter, thereby implementing configuration of a new transmission path of an optical signal and effectively improving configuration efficiency of the transmission path of the optical signal.

Step 5008: The electronic apparatus obtains, based on a second preset correspondence, target label information corresponding to the first target adapter.

The electronic apparatus shown in this embodiment prestores the second preset correspondence. The second preset correspondence includes a correspondence between different label information and different adapters.

Specifically, to implement optical signal transmission, an optical fiber connector body identified by using the label information needs to be plugged in a corresponding adapter to implement connection of the optical signal.

In this embodiment, only in a state in which the optical fiber connector body plugged in the first target adapter is an optical fiber connector body identified by using the target label information, the optical signal transmission can be successfully implemented only by using the first target adapter and the optical fiber connector body identified by using the target label information.

The second preset correspondence shown in this embodiment stores a correspondence between the first target adapter and the target label information. In other words, the optical signal transmission is successfully implemented only when the optical fiber connector body identified by using the target label information is successfully plugged in the first target adapter.

Step 5009: The electronic apparatus determines whether the label information is the same as the target label information; and if the label information is the same as the target label information, performs step 5010; or if the label information is different from the target label information, performs step 5011.

A purpose shown in this embodiment is to recognize whether the label information of the optical fiber connector assembly plugged in the first target adapter is the same as the target label information.

For example, if the label information is a two-dimensional barcode, the electronic apparatus determines whether graphic information included in the label information is the same as graphic information included in the target label information.

If the label information is the same as the label information in the target region, it indicates that the optical fiber connector body plugged in the first target adapter is the optical fiber connector body identified by using the target label information.

If the label information is different from the label information in the target region, it indicates that the optical fiber connector body plugged in the first target adapter is not the optical fiber connector body identified by using the target label information, and further indicates that the optical fiber connector body identified by using the label information obtained in the target region is plugged in a wrong adapter.

Step 5010: The electronic apparatus generates recognition success indication information.

In this embodiment, when the electronic apparatus determines that the label information is the same as the label information in the target region, the electronic apparatus may generate the success indication information. The success indication information is used to indicate an event in which the optical fiber connector body plugged in the first target adapter is the optical fiber connector body identified by using the target label information.

The maintenance personnel may determine, based on the recognition success indication information, that the correct optical fiber connector assembly is plugged in the first target adapter.

Step 5011: The electronic apparatus generates recognition failure indication information.

In this embodiment, when the electronic apparatus determines that the label information is different from the label information in the target region, the electronic apparatus may generate the failure indication information. The failure indication information is used to indicate an event in which the optical fiber connector body plugged in the first target adapter is not the optical fiber connector body identified by using the target label information.

The maintenance personnel may determine, based on the recognition failure indication information, that a wrong optical fiber connector assembly is plugged in the first target adapter.

Optionally, to facilitate maintenance performed by the maintenance personnel, the failure indication information may further include location information of the first target adapter. It can be learned that the maintenance personnel accurately position the first target adapter in the adapter array based on the location information that is of the first target adapter and that is included in the recognition failure information.

It can be learned that, in the recognition method shown in this embodiment, it can be recognized in batches based on the target image whether correct optical fiber connector bodies are plugged in all the adapters included in the subrack, thereby improving recognition accuracy and recognition efficiency. In addition, in a recognition process, it is unnecessary to use a dedicated recognition apparatus to recognize whether the optical fiber connector assembly is plugged in the adapter corresponding to the optical fiber connector assembly, thereby reducing operation difficulty of the recognition and improving recognition efficiency.

For better understanding of the method shown in this embodiment, the following provides example description with reference to a specific application scenario.

It should be noted that this application scenario is merely used to better understand the method shown in this embodiment, and specific description shown in this application scenario is merely an example.

First, a camera of a smartphone is pointed at the subrack, so that an entire panel of the subrack is within a photographing range of the smartphone. The smartphone photographs the subrack to obtain the target image.

Specifically, the entire panel of the subrack is photographed by using the camera located at an upper right corner of a surface of the subrack.

The target image may be shown in FIG. 46. The target image includes the entire panel of the subrack 4601, and also includes the mark structures 4611 that are disposed at an upper left corner, an upper right corner, and a lower left corner of the subrack 4601 in a sticking manner.

Next, the smartphone transmits the target image to a computer.

Then, the computer recognizes the mark structures and the preset arrangement information in the target image.

Specifically, a memory of the computer prestores a correspondence between a mark structure A and preset arrangement information A, a correspondence between a mark structure B and preset arrangement information B, and by analogy, a correspondence between a mark structure N and preset arrangement information N. Distinctions among the mark structure A, the mark structure B, . . . , and the mark structure N may be different shapes of the mark structures.

For example, an entire structure of the mark structure A is square, an entire structure of the mark structure B is circular, . . . , and an entire structure of the mark structure N is pentagonal.

As shown in FIG. 46, if the mark structure is square, the computer may obtain the preset arrangement information A corresponding to the square mark structure A.

In this example, the preset arrangement information A (as shown in FIG. 51A) is specifically information that the subrack 4601 includes 12 columns of adapters and 12 rows of adapters, and specific coordinates of each adapter in the 12 columns of adapters and 12 rows of adapters in the world coordinate system.

The preset arrangement information A further includes the mark structures 4611 that are disposed at the upper left corner, the upper right corner, and the lower left corner of the subrack 4601 in the sticking manner.

Further, the computer puts the target image in the world coordinate system.

Specifically, as shown in FIG. 46, the target image obtained by the computer has a three-dimensional structure in an image coordinate system.

The computer transfers the target image from the image coordinate system to the world coordinate system, so that a location, a posture, and an angle of the mark structure in the preset arrangement information A shown in FIG. 51A relative to the surface of the subrack are all the same as a location, a posture, and an angle of the mark structure in the world coordinate system relative to the surface of the subrack.

In this example, the mark structures are located at the upper left corner, the upper right corner, and the lower left corner of the surface of the subrack in both the preset arrangement information and the world coordinate system. A structure of the mark structure is square. A relative location relationship between each mark structure and each adapter in the preset arrangement information is the same in the preset arrangement information and the world coordinate system.

Further, the computer divides the world coordinate system including the surface of the subrack to determine the plurality of regions.

Specifically, in a state in which the electronic apparatus puts the target image in the world coordinate system shown in FIG. 51B, the electronic apparatus may divide, in the world coordinate system based on the arrangement status (12 rows and 12 columns) that is of the adapter array and that is included in the preset arrangement information, the surface of the subrack shown in the world coordinate system to form the plurality of regions (12 rows and 12 columns).

In addition, an adapter located in a first row and a first column in the preset arrangement information corresponds to a region located in a first row and a first column in the world coordinate system, and an adapter located in an $N^{th}$ row and an $M^{th}$ column in the preset arrangement information corresponds to a region located in an $N^{th}$ row and an $M^{th}$ column in the world coordinate system.

Specifically, that the adapter located in the first row and the first column in the preset arrangement information corresponds to the region located in the first row and the first column in the world coordinate system indicates that a relative location relationship between a central point of the adapter located in the first row and the first column and each mark structure in the preset arrangement information is the same as a relative location relationship between a central point of the target region located in the first row and the first column and each mark structure in the world coordinate system.

Further, the computer determines the target region in the world coordinate system.

For example, the computer determines that a region 5301 located in a second row and the first column in the world coordinate system is the target region. An adapter corresponding to the target region 5301 is also located in a second row and the first column in the adapter array.

Further, if the computer successfully reads a two-dimensional barcode in the target region 5301, it is determined that the optical fiber connector assembly is plugged in the adapter corresponding to the target region 5301. If the computer does not read a two-dimensional barcode in the target region 5301, it is determined that the adapter corresponding to the target region 5301 is an idle adapter in which the optical fiber connector assembly is not plugged.

This example is described by using an example in which the computer successfully reads a two-dimensional barcode A in the target region 5301.

The memory of the computer shown in this example further stores a correspondence between graphic information A included in the two-dimensional barcode A and an identifier A of the adapter.

The computer may store a trouble ticket system. The trouble ticket system stores information that an optical fiber connector assembly identified by using the two-dimensional barcode A needs to be plugged in the adapter with the identifier A to implement successful optical signal transmission.

If the optical fiber connector assembly identified by using the two-dimensional barcode A is not plugged in the adapter with the identifier A indicated by the trouble ticket system, it indicates that the optical fiber connector assembly identified by using the two-dimensional barcode A is plugged in a wrong adapter, and the optical fiber connector assembly identified by using the two-dimensional barcode A cannot implement the optical signal transmission.

It can be learned that to ensure successful optical signal transmission, it is required that the optical fiber connector assembly identified by using the two-dimensional barcode A is plugged in a corresponding adapter A. As shown in this example, it may be checked whether the adapter corresponding to the target region 5301 is the adapter A in the world coordinate system. If the adapter corresponding to the target region 5301 is the adapter A in the world coordinate system, it indicates that the optical fiber connector assembly identified by using the two-dimensional barcode A is plugged in the correct adapter. If the adapter corresponding to the target region 5301 is not the adapter A in the world coordinate system, it indicates that the optical fiber connector assembly identified by using the two-dimensional barcode A is not plugged in the correct adapter.

In this example, the computer may determine whether an identifier of the adapter corresponding to the target region is the same as the identifier A of the adapter corresponding to the two-dimensional barcode A in the trouble ticket system.

In other words, the computer determines whether the identifier of the adapter corresponding to the target region is the identifier A.

If the identifier of the adapter corresponding to the target region is the identifier A, it indicates that the optical fiber connector assembly identified by using the two-dimensional barcode A is plugged in the adapter with the identifier A shown in the trouble ticket system, thereby effectively ensuring connection of a transmission path of the optical signal.

The computer generates the recognition success indication information. The recognition success indication information is used to indicate an event in which the optical fiber connector assembly identified by using the two-dimensional barcode A is plugged in the adapter with the identifier A shown in the trouble ticket system.

If the identifier of the adapter corresponding to the target region is not the identifier A, it indicates that the optical fiber connector assembly identified by using the two-dimensional barcode A is plugged in the wrong adapter. In this case, the transmission path of the optical signal is not connected.

The computer generates the recognition failure indication information. The recognition failure indication information is used to indicate an event in which the optical fiber connector assembly identified by using the two-dimensional barcode A is plugged in the wrong adapter.

Embodiment 11

This embodiment provides a label system 5200. The following describes the label system 5200 with reference to FIG. 52 to FIG. 55.

The label system 5200 shown in this embodiment includes a subrack 5201. For specific description of the subrack 5201, refer to Embodiment 1 for details. Details are not described again in this embodiment.

The subrack 5201 includes a plurality of adapters. For description of the adapters and a manner of fixedly disposing the adapters in the subrack 5201, refer to Embodiment 9 for details. Details are not described again.

In this embodiment, the adapters are distinguished according to different components plugged in the adapters. Specifically, a first adapter 5206 of the subrack 5201 shown in this embodiment is an adapter for mounting an optical fiber connector assembly 5205. For a structure of the optical fiber connector assembly 5205, refer to any one of Embodiment 1 to Embodiment 8. A specific structure of the optical fiber connector assembly is not described again in this embodiment.

A second adapter 5207 of the subrack 5201 shown in this embodiment is an adapter for mounting an identification component 5208. The following describes the identification component 5208.

First, functions of the identification component 5208 are described.

For example, as shown in FIG. 46, in a process of using the label system, all the adapters in the subrack are not always fully loaded. Herein, fully loading indicates that optical fiber connector assemblies are plugged in all the adapters in the subrack.

To avoid dust entry in a connection interface of the second adapter 5207 in the subrack, in this embodiment, the identification component 5208 may be plugged in the second adapter 5207, thereby effectively avoiding dust entry in the connection interface of the second adapter 5207.

The following describes a specific structure of the identification component 5208 shown in this embodiment.

The identification component 5208 includes a dustproof plug 5209, an extension piece 5210, and an identification module 5211. The dustproof plug 5209 is plugged in the connection interface of the second adapter 5207, to prevent external dust from entering the connection interface of the second adapter 5207.

The extension piece 5210 is separately connected to the dustproof plug 5209 and the identification module 5211. For description of a specific structure of the extension piece 5210, refer to the connecting piece shown in Embodiment 1. Details are not described again in this embodiment.

The identification module 5211 has an identification surface 5212. For description of a location of the identification surface 5212, refer to the description of the location of the target surface shown in Embodiment 1. Details are not described again in this embodiment.

It can be learned that the identification surface 5212 shown in this embodiment is within a photographing range or a visual range. For specific description of the photographing range and the visual range, refer to Embodiment 1 for details. Details are not described again.

The identification surface 5212 shown in this embodiment is used to indicate a location of the second adapter 5207 in the subrack. For example, the identification surface 5212 may indicate the location of the second adapter 5207 in the subrack by using a set two-dimensional barcode, a unique identifier, a barcode, a color block, or the like. For another example, the identification surface 5212 may be in a blank state to indicate the location of the second adapter 5207 in the subrack. For another example, an entire structure of the identification surface 5212 is in a specific shape. For example, the entire structure of the identification surface 5212 is in any shape such as a circle, a square, or a rectangle. This embodiment does not limit the identification surface 5212, provided that the electronic apparatus can determine, based on the identification surface 5212, the location of the second adapter 5207 that is in the subrack and in which the identification module 5211 is plugged.

The extension piece 5210 shown in this embodiment has a cabling channel, thereby effectively avoiding a possibility that a hard contact occurs between an optical cable connected to the optical fiber connector assembly plugged in the subrack and the extension piece 5210. In this way, safety of the optical cable is improved. For description of disposing the cabling channel on the extension piece 5210, refer to description of disposing the cabling channel on the connecting piece shown in Embodiment 1. Details are not described again in this embodiment.

For description of beneficial effects of the label system shown in this embodiment, refer to any one of Embodiment 1 to Embodiment 8. Details are not described again.

In addition, by using the label system shown in this embodiment, when the subrack is not fully loaded, external dust can be prevented from entering the connection interface of the second adapter.

Embodiment 12

This embodiment provides a recognition method based on Embodiment 11. For a specific structure of a label system to which the recognition method shown in this embodiment is applied, refer to Embodiment 11 for details. Details are not described again.

Figure 56:
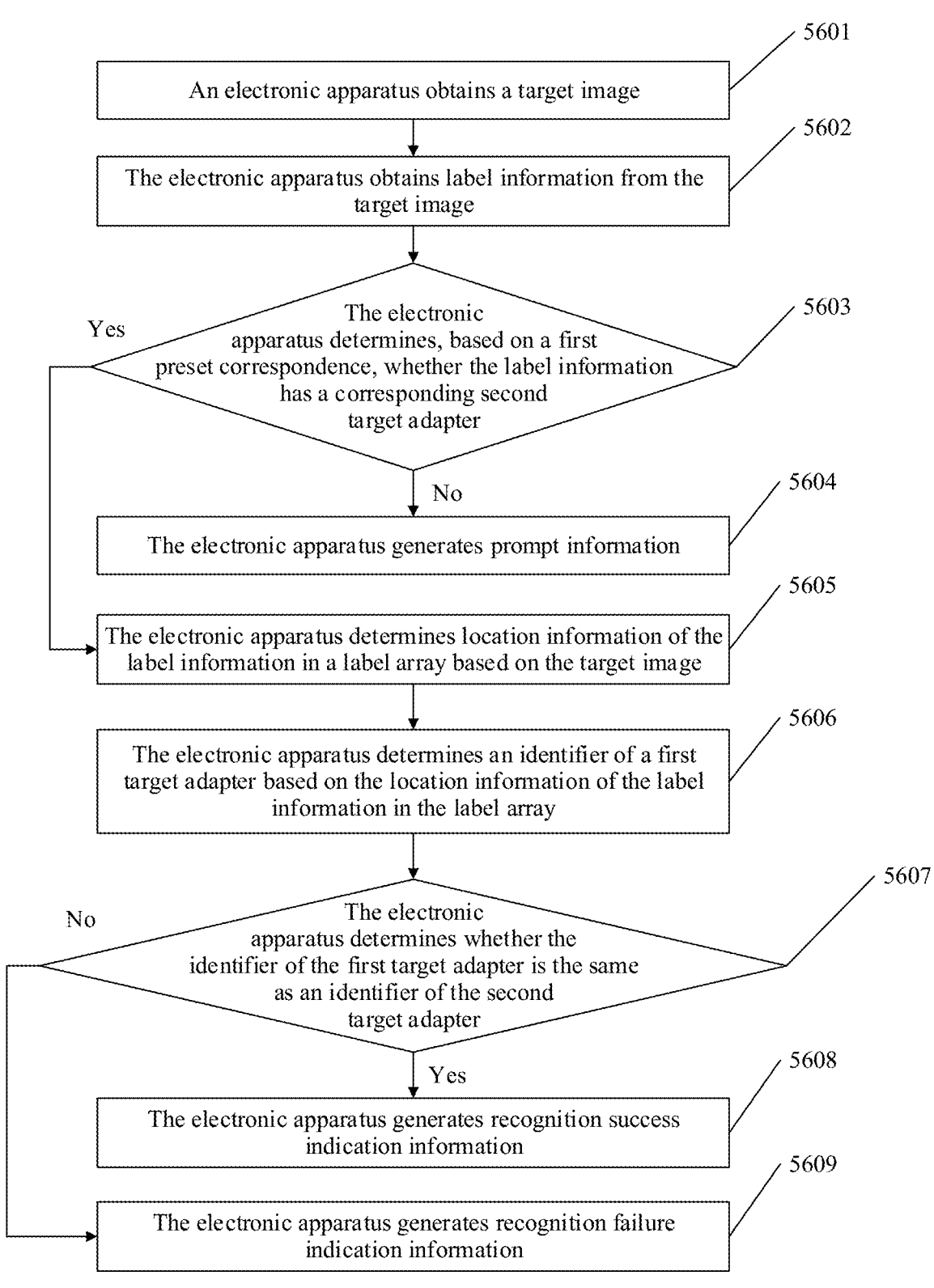
FIG. 56 is a flowchart of steps of an embodiment of an identification method in Embodiment 12 according to this application.

With reference to FIG. 56, the following describes an execution process of the recognition method shown in an embodiment.

Step 5601: An electronic apparatus obtains a target image.

For a specific execution process of step 5601 shown in this embodiment, refer to step 5001 shown in FIG. 50 for details. The specific execution process is not described again.

Step 5602: The electronic apparatus obtains label information from the target image.

In this embodiment, the electronic apparatus may determine to-be-recognized label information in the target image.

This embodiment does not limit how to determine the label information. For example, two target images may be consecutively obtained, and the two target images are separately compared. If new label information is added at the same location in the two target images, it is determined to recognize the label information. For another example, the electronic apparatus may recognize a plurality of pieces of label information included in the target image one by one or at random.

Step 5603: The electronic apparatus determines, based on a first preset correspondence, whether the label information has a corresponding second target adapter; and if the label information has the corresponding second target adapter, performs step 5605; or if the label information does not have the corresponding second target adapter, performs step 5604.

In this embodiment, the electronic apparatus obtains the first preset correspondence. The first preset correspondence includes a correspondence between different label information and different second target adapters. The second target adapter is an adapter in which an optical fiber connector body identified by using the label information needs to be plugged.

Specifically, to implement optical signal transmission, the optical fiber connector body identified by using the label information needs to be plugged in the second target adapter to implement connection of the optical signal.

For example, in this embodiment, the label information is a two-dimensional barcode, and the two-dimensional barcode includes graphic information. The first preset correspondence shown in this embodiment includes a correspondence between different graphic information and different second target adapters.

It can be learned that after the electronic apparatus obtains the label information from the target image, the electronic apparatus may determine the corresponding second target adapter in the first preset correspondence based on the graphic information included in the label information.

If the electronic apparatus determines that the label information has the corresponding second target adapter in the first preset correspondence, step 5605 is performed. If the electronic apparatus determines that the label information does not have the corresponding second target adapter in the first preset correspondence, step 5604 is performed.

Step 5604: The electronic apparatus generates prompt information.

In this embodiment, if the electronic apparatus determines that the first preset correspondence does not have a correspondence between the label information and an identifier of the second target adapter, it indicates that a corresponding adapter is not allocated to the optical fiber connector body identified by using the label information. In other words, optical signal transmission does not need to be implemented by using the optical fiber connector body identified by using the label information. The electronic apparatus may generate the prompt information. The prompt information is used to indicate an event in which the correspondence between the label information and the identifier of the second target adapter does not exist.

Optionally, the prompt information may further include the label information. Maintenance personnel may determine, based on the prompt information, that the optical fiber connector body identified by using the label information does not need to be used. In this case, the maintenance personnel may unplug the optical fiber connector body from a subrack.

Step 5605: The electronic apparatus determines location information of the label information in a label array based on the target image.

Specifically, to determine the location information of the label information in the label array, the electronic apparatus first needs to determine the label array in the target image based on the target image.

The label array shown in this embodiment is an array formed by at least some identification surfaces plugged in the subrack and the label information. Specifically, in this embodiment, in a state in which an optical fiber connector assembly is plugged in the subrack and an identification component is plugged in the subrack, the target image formed after a camera photographs the subrack may include label information of the optical fiber connector assembly and an identification surface of the label component.

The following describes several optional manners in which the electronic device obtains the label array shown in this embodiment.

Manner 1

The subrack shown in this embodiment may be in a fully loaded state. In other words, each adapter included in the subrack is occupied by an optical fiber connector assembly or an identification component. Through analyzing the target image, the electronic apparatus may determine a quantity of pieces of label information and a quantity of identification surfaces included in each row in the label array, and may further determine a quantity of pieces of label information and a quantity of label surfaces included in each column in the label array, to determine an arrangement status of an adapter array.

A third target adapter disposed on the subrack shown in this embodiment is configured to mount the identification component. For specific description of the third target adapter, refer to the description of the second adapter shown in Embodiment 11 for details. Details are not described again in this embodiment.

For example, through analyzing the target image, the electronic apparatus may determine that a first row of the label array includes eight pieces of label information and two identification surfaces. The electronic apparatus may determine that a first row of the adapter array includes 10 adapters. For description of the adapter array, refer to Embodiment 9 for details. Details are not described again in this embodiment.

Manner 2

The subrack shown in this embodiment may not be in a fully loaded state. However, in order that the electronic device determines the label array, one or more optical fiber connector assemblies or identification components can be plugged in each column in the adapter array, and one or more optical fiber connector assemblies or identification components can be plugged in each row of the adapter array.

It can be learned that each row of the label array includes at least one piece of label information or at least one identification surface, and each column in the label array includes at least one piece of label information or at least one identification surface.

The electronic apparatus determines, based on the label array in the target image, a quantity of pieces of label information and a quantity of identification surfaces included in each row in the label array, and can further determine a quantity of pieces of label information and a quantity of identification surfaces included in each column in the label array, to determine an arrangement status of the adapter array.

It should be noted that this embodiment does not limit each piece of label information included in the label array and a specific arrangement status of the label surface, provided that the electronic apparatus can determine the specific arrangement status of the label array based on the label array in the target image.

In this manner, generally, a posture sensor inside the electronic apparatus needs to be used to obtain angle and location information of photographing the subrack. The obtained target image is put in a world coordinate system by using a conversion matrix, so that horizontal and vertical directions of the label array are accurate in the target image, thereby improving accuracy of the label array obtained based on the target image.

For description of a specific process of the world coordinate system, refer to Embodiment 10. Details are not described again.

Specifically, the electronic apparatus shown in this embodiment puts the target image in the world coordinate system based on a state in which the horizontal and vertical directions of the label array in the target image are accurate; and divides the target image in the world coordinate system to form a region array including a plurality of regions, so that the label array can be accurately determined based on the region array.

An arrangement manner of the plurality of regions included in the region array obtained through division shown in this embodiment is the same as an arrangement manner of the plurality of pieces of label information or the label surfaces that are included in the label array. In addition, the plurality of regions are in one-to-one correspondence with the plurality of pieces of label information or the identification surfaces.

For example, the plurality of pieces of label information or the identification surfaces that are included in the label array are arranged in a manner of N rows and M columns. In this case, the plurality of regions are also arranged in a manner of N rows and M columns to form the region array. A location of each region in the region array is the same as a location of label information or an identification surface corresponding to the region in the label array.

Manner 3

Row number indication information and column number indication information may be set for the subrack shown in this embodiment. The row number indication information is used to indicate a specific number of a row in which corresponding label information or a corresponding identification surface is located in the label array. The column number indication information is used to indicate a specific number of a column in which corresponding label information or a corresponding identification surface is located in the label array.

It can be learned that a specific location of the label information in the label array can be determined based on the row number indication information and the column number indication information corresponding to the label information, and a specific location of the identification surface in the label array can be determined based on the row number indication information and the column number indication information corresponding to the identification surface.

Figure 52:
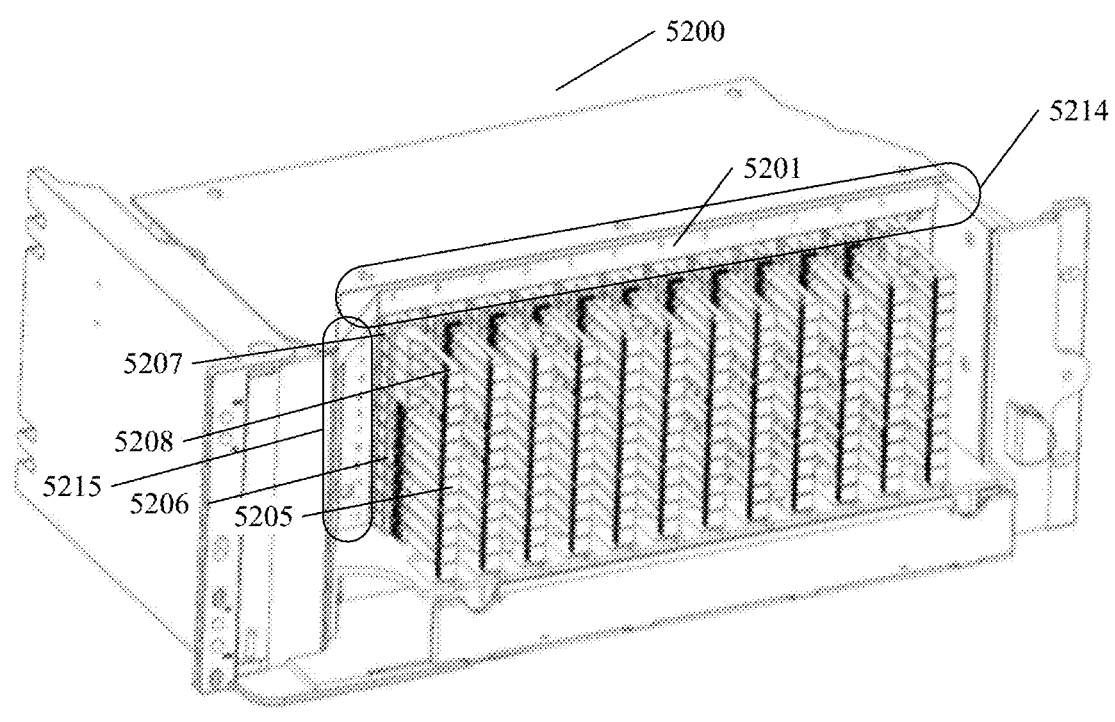
FIG. 52 is a schematic diagram of a structure of an embodiment of a label system in Embodiment 11 according to this application.
Figure 53:
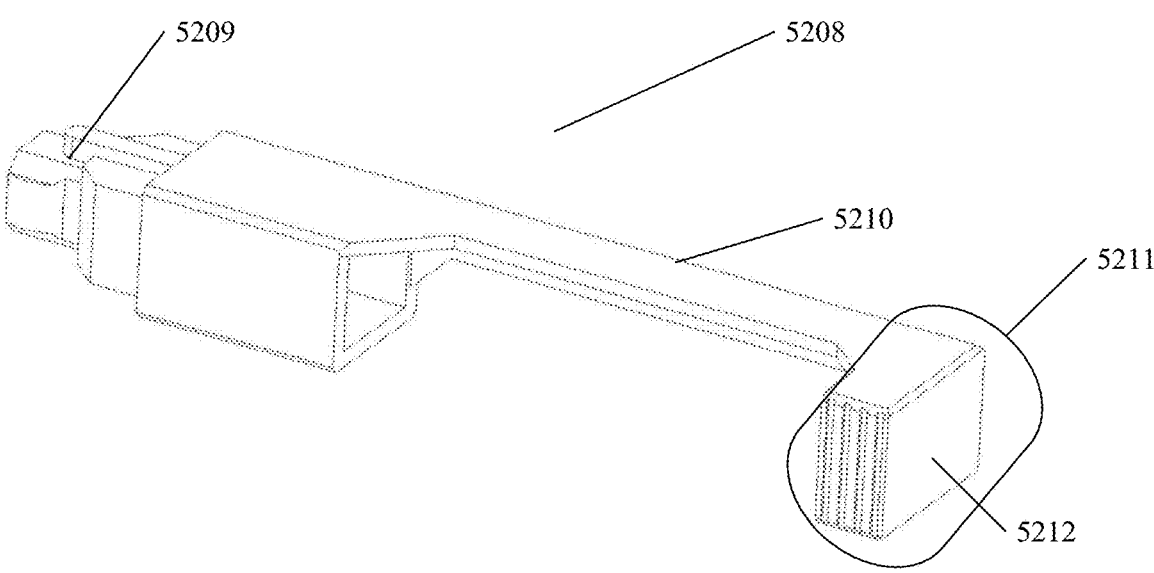
FIG. 53 is a schematic diagram of a structure of an embodiment of an identification component in Embodiment 11 according to this application.
Figure 54:
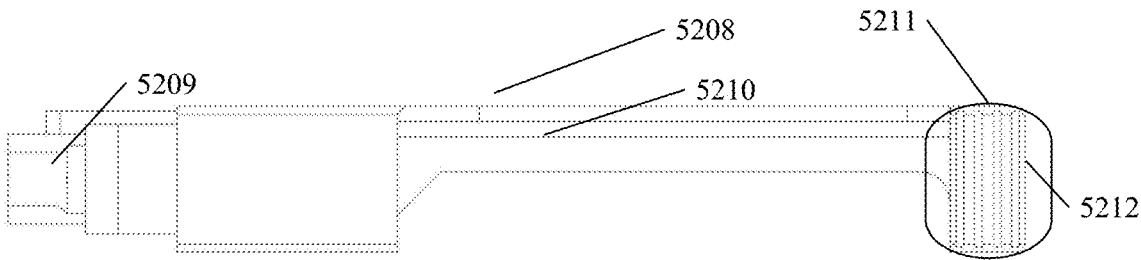
FIG. 54 is a schematic diagram of a structure of another embodiment of an identification component in Embodiment 11 according to this application.
Figure 55:
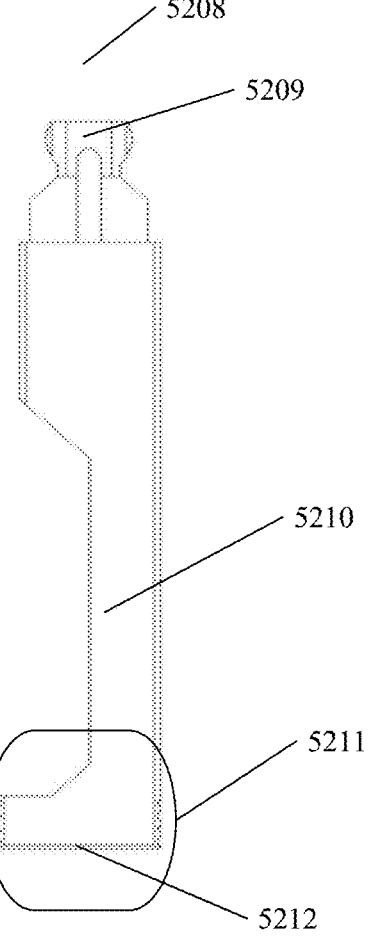
FIG. 55 is a schematic diagram of a structure of another embodiment of an identification component in Embodiment 11 according to this application.

For example, as shown in FIG. 52, the subrack has 12 columns and 12 rows of adapters. In this case, the column number indication information is set at a start location 5214 of each column of adapters in the subrack. For example, the column number indication information may be specifically a character "12". The character "12" indicates that adapters located in the same column as the character are all located in a 12th column in the adapter array. Further, the row number indication information is set at a start location 5215 of each row of the subrack. For example, the row number indication information may be specifically a character "6". The character "6" indicates that adapters located in the same row as the character are all located in a $6^{th}$ row of the adapter array.

In this embodiment, the electronic apparatus determines a specific arrangement status of the label array in the target image, that is, may determine the location information of the label information in the label array. The location information of the label information in the label array is coordinates of the label information in the label array, for example, a specific row and a specific column in which the label information is specifically located.

Step 5606: The electronic apparatus determines an identifier of a first target adapter based on the location information of the label information in the label array.

In this embodiment, the electronic device may determine the identifier of the first target adapter in any one of the following manners. For description of the first target adapter, refer to the first adapter shown in Embodiment 11 for details. Details are not described again.

Manner 1

First, the electronic apparatus determines location information of the first target adapter in the adapter array based on the location information of the label information in the label array.

In this embodiment, the location information of the label information in the label array is the same as the location information of the first target adapter in which the optical fiber connector body identified by using the label information and that is in the adapter array.

For example, if the location information of the label information in the label array is a first row and a third column, the location information of the first target adapter in which the optical fiber connector body identified by using the label information and that is in the adapter array is also a first row and a third column.

Next, the electronic apparatus obtains the identifier of the first target adapter based on the location information of the first target adapter in the adapter array and a first correspondence.

The electronic apparatus may create the first correspondence in advance. The first correspondence includes a correspondence between the location information of the first target adapter in the adapter array and the identifier of the first target adapter.

It can be learned that, when the electronic apparatus obtains the location information of the first target adapter in the adapter array, the electronic apparatus may determine, based on the first correspondence, the identifier of the first target adapter corresponding to the location information of the first target adapter in the adapter array.

Manner 2

First, the electronic apparatus may create a second correspondence in advance. The second correspondence includes a correspondence between the location information of the label information in the label array and the identifier of the first target adapter.

It can be learned that, when the electronic apparatus obtains the location information of the label information in the label array, the electronic apparatus may determine, based on the second correspondence, the identifier of the first target adapter corresponding to the location information of the label information in the label array.

It can be learned that the electronic apparatus shown in this embodiment can further implement a digitization management process of the subrack. In other words, in a state in which the electronic apparatus obtains the label information and the first target adapter corresponding to the label information, it indicates that an adapter in which the optical fiber connector assembly identified by using the label information is plugged is the first target adapter, to implement digitalized recording and management of an adapter resource of the subrack. Therefore, a plugging relationship between an optical fiber connector assembly and an adapter does not need to be separately manually viewed and recorded on site, thereby effectively improving accuracy and efficiency of managing the adapter resource of the subrack.

Step 5607: The electronic apparatus determines whether the identifier of the first target adapter is the same as the identifier of the second target adapter; and if the identifier of the first target adapter is the same as the identifier of the second target adapter, performs step 5608; or if the identifier of the first target adapter is different from the identifier of the second target adapter, performs step 5609.

Step 5608: The electronic apparatus generates recognition success indication information.

In this embodiment, when the electronic apparatus determines that the identifier of the first target adapter is the same as the identifier of the second target adapter, the electronic apparatus may generate the success indication information. The success indication information is used to indicate an event in which the optical fiber connector body identified by using the label information is plugged in the corresponding second target adapter.

The maintenance personnel may determine, based on the recognition success indication information, that the optical fiber connector body identified by using the label information is plugged in the corresponding second target adapter.

Step 5609: The electronic apparatus generates recognition failure indication information.

In this embodiment, when the electronic apparatus determines that the identifier of the first target adapter is different from the identifier of the second target adapter, the electronic apparatus may generate the failure indication information. The failure indication information is used to indicate an event in which the identifier of the first target adapter is different from the identifier of the second target adapter.

The maintenance personnel may determine, based on the recognition failure indication information, that the optical fiber connector body identified by using the label information is plugged in a wrong adapter.

Optionally, to facilitate maintenance performed by the maintenance personnel, the failure indication information may further include the location information of the label information. It can be learned that the maintenance personnel accurately position the label information in the label array based on the location information that is of the label information and that is included in the recognition failure indication information.

In the method shown in this embodiment, it can be recognized in batches based on the target image whether optical fiber connector bodies identified by using all the label information included in the target image are plugged in corresponding adapters, thereby improving recognition accuracy and recognition efficiency. In addition, in a recognition process, it is unnecessary to use a dedicated recognition apparatus to recognize whether the optical fiber connector assembly is plugged in the adapter corresponding to the optical fiber connector assembly, thereby reducing operation difficulty of the recognition and improving recognition efficiency.

For better understanding of the method shown in this embodiment, the following provides example description with reference to a specific application scenario.

It should be noted that this application scenario is merely used to better understand the method shown in this embodiment, and specific description shown in this application scenario is merely an example.

First, a camera of a smartphone is pointed at the subrack, so that an entire panel of the subrack is within a photographing range of the smartphone. The smartphone photographs the subrack to obtain the target image.

Specifically, the entire panel of the subrack is photographed by using the camera located at an upper right corner of a surface of the subrack.

First, the smartphone photographs the subrack to obtain the target image. The target image may be shown in FIG. 52. For example, in a first column of the subrack 5201, identification modules are plugged in a first adapter to a fourth adapter in the first column, and optical fiber connector assemblies are plugged in a fifth adapter to a twelfth adapter in the first column.

Next, the smartphone transmits the target image to a computer.

Then, the computer determines to-be-recognized label information (a two-dimensional barcode A) in the target image.

The computer obtains two consecutively received target images A and B. A time at which the computer receives the target image A is earlier than a time at which the computer receives the target image B.

If a region in a third row and a fifth column in the target image A is a red identification surface, it is determined that an identification module is plugged in an adapter in a third row and a fifth column in the adapter array.

The computer detects the region in the third row and the fifth column in the image B. If the computer detects the read identification surface in the region in the third row and the fifth column, it indicates that the identification module is still plugged in the adapter in the third row and the fifth column.

If a two-dimensional barcode A is detected in the region in the third row and the fifth column, it indicates that an optical fiber connector assembly is plugged in the adapter in the third row and the fifth column in the adapter array.

The computer may determine that in the label array, the two-dimensional barcode A in the third row and the fifth column is to-be-recognized label information.

The computer may store a trouble ticket system. The trouble ticket system stores information that an optical fiber connector assembly identified by using the two-dimensional barcode A needs to be plugged in an adapter with an identifier A to implement successful optical signal transmission.

If the optical fiber connector assembly identified by using the two-dimensional barcode A is not plugged in the adapter with the identifier A indicated by the trouble ticket system, it indicates that the optical fiber connector assembly identified by using the two-dimensional barcode A is plugged in a wrong adapter, and the optical fiber connector assembly identified by using the two-dimensional barcode A cannot implement the optical signal transmission.

It can be learned that to ensure successful optical signal transmission, it is required that the optical fiber connector assembly identified by using the two-dimensional barcode A is plugged in a corresponding adapter A. As shown in this example, it can be recognized that the to-be-recognized two-dimensional barcode A is located in the third row and the fifth column in the label array. In this case, the computer can obtain the identifier of the adapter located in the third row and the fifth column in the adapter array.

In other words, the computer prestores location information corresponding to each adapter in an $N^{th}$ row and an $M^{th}$ column in the adapter array, and an identifier of each adapter.

The computer determines whether the identifier of the adapter located in the third row and the fifth column in the adapter array is the identifier A.

If the identifier of the adapter located in the third row and the fifth column in the adapter array is the identifier A, it indicates that the optical fiber connector assembly identified by using the two-dimensional barcode A is plugged in the adapter with the identifier A shown in the trouble ticket system, thereby effectively ensuring connection of a transmission path of the optical signal.

The computer generates the recognition success indication information. The recognition success indication information is used to indicate an event in which the optical fiber connector assembly identified by using the two-dimensional barcode A is plugged in the adapter with the identifier A shown in the trouble ticket system.

If the identifier of the adapter located in the third row and the fifth column in the adapter array is not the identifier A, it indicates that the optical fiber connector assembly identified by using the two-dimensional barcode A is plugged in the wrong adapter. In this case, the transmission path of the optical signal is not connected.

The computer generates the recognition failure indication information. The recognition failure indication information is used to indicate an event in which the optical fiber connector assembly identified by using the two-dimensional barcode A is plugged in the wrong adapter.

Embodiment 13

This embodiment further provides a label component. For specific description of the label component, refer to any one of Embodiment 2 to Embodiment 8. Details are not described again in this embodiment.

Based on Embodiment 10 and Embodiment 12, an embodiment of this application further provides a computer readable storage medium. The storage medium stores a software program. When the software program is read and executed by one or more processors, the method provided in either one or both of Embodiment 10 and Embodiment 12 may be implemented.

The computer readable storage medium may include any medium that can store program code, for example, a USB flash drive, a removable hard disk, a read-only memory, a random access memory, a magnetic disk, or an optical disc.

Based on Embodiment 10 and Embodiment 12, an embodiment of this application further provides a chip. The chip includes a processor, configured to implement functions related to either one of Embodiment 10 and Embodiment 12. Optionally, the chip further includes a memory. The memory is configured to store a necessary program instruction and data that are executed by the processor. The chip system may include a chip, or include a chip and another discrete device.

What is claimed is:

1. An optical fiber connector assembly, comprising:
an optical fiber connector body;
a connecting piece; and
a label module;
wherein the connecting piece is separately connected to the optical fiber connector body and the label module, the label module has a target surface, the target surface is opposite to a location of the optical fiber connector body and is configured to set label information, and the label information is configured to identify the optical fiber connector body; and
wherein: the optical fiber connector body comprises a plug, a middle part, and a rear retainer that are sequentially connected; and
the connecting piece comprises a mounting groove and an extension rod, wherein one end of the extension rod is connected to the mounting groove and the other end of the extension rod is connected to the label module, and wherein the mounting groove is configured to mount and fix the middle part.

2. The optical fiber connector assembly according to claim 1, wherein the optical fiber connector body and the connecting piece are an integrally molded structure.

3. The optical fiber connector assembly according to claim 1, wherein the mounting groove has a concave plugging space and the concave plugging space is configured to mount and fix the middle part.

4. The optical fiber connector assembly according to claim 3, wherein an accommodation channel is formed between the mounting groove, the extension rod, and the label module, and wherein the accommodation channel accommodates the rear retainer and one or more optical cables.

5. The optical fiber connector assembly according to claim 1, wherein:
a clamping protrusion is disposed on a groove wall of the mounting groove; and
a clamping groove is disposed on the middle part, wherein the middle part is configured to be plugged into the mounting groove via an opening of the mounting groove until the clamping protrusion is clamped and fixed in the clamping groove, and wherein the opening extends in the axial direction of the optical fiber connector body.

6. The optical fiber connector assembly according to claim 5, wherein:
the connecting piece further comprises a cover;
a guide rail is formed on an outer side of the opening and a slide rail is formed at a corresponding location between the cover and the guide rail; and
in a state in which the slide rail is plugged in the guide rail, the cover covers the opening.

7. The optical fiber connector assembly according to claim 1, wherein the connecting piece comprises:
a first component, wherein a first end of the first component forms an opening of the mounting groove, the opening extends in the axial direction of the optical fiber connector body, a second end of the first component is connected to the label module, and the extension rod is between the first end of the first component and the second end of the first component; and
a second component and a third component that are located on two sides at opposite locations at the first end of the first component, wherein the third component covers the opening of the mounting groove, and wherein the first component, the second component, and the third component are buckled with each other to form the mounting groove.

8. The optical fiber connector assembly according to claim 1, wherein the target surface of the label module is penetrated by an extension line in the axial direction of the optical fiber connector body.

9. The optical fiber connector assembly according to claim 1, wherein the target surface of the label module is perpendicular to the axial direction of the optical fiber connector body.

10. The optical fiber connector assembly according claim 1, wherein an outer wall of the connecting piece curves inward to form a cabling channel.

11. The optical fiber connector assembly according to claim 1, wherein the mounting groove has a first channel opening and a second channel opening at opposite locations in the axial direction of the optical fiber connector body.

12. The optical fiber connector assembly according to claim 1, wherein the label information is a two-dimensional barcode, the two-dimensional barcode includes graphic information.

13. The optical fiber connector assembly according to claim 1, wherein the label module has an inner surface, the inner surface is disposed toward the optical fiber connector body.

14. A label component, applied to an optical fiber connector body, comprising:
a connecting piece; and
a label module;
wherein the connecting piece is connected to the label module, the label module has a target surface, the target surface is opposite to a location of the connecting piece and is configured to set label information, and the label information is configured to identify the optical fiber connector body; and
wherein the connecting piece comprises a mounting groove and an extension rod, wherein one end of the extension rod is connected to the mounting groove and the other end of the extension rod is connected to the label module, and wherein the mounting groove is configured to mount and fix a middle part of the optical fiber connector body.

15. The label component according to claim 14, wherein the mounting groove has a concave plugging space, and the plugging space is configured to mount and fix the middle part.

16. The label component according to claim 14, wherein an accommodation channel is formed between the mounting groove, the extension rod, and the label module, and wherein the accommodation channel accommodates a rear retainer of the optical fiber connector body and one or more optical cables.

17. The label component according to claim 14, wherein:
a clamping protrusion is disposed on a groove wall of the mounting groove;
a clamping groove is disposed on the middle part, wherein the middle part is configured to be plugged into the mounting groove via an opening of the mounting groove until the clamping protrusion is clamped and fixed in the clamping groove, and wherein the opening extends in the axial direction of the optical fiber connector body.

18. The label component according to claim 17, wherein:
the connecting piece further comprises a cover;
a guide rail is formed on an outer side of the opening and a slide rail is formed at a corresponding location between the cover and the guide rail; and in a state in which the slide rail is plugged in the guide rail, the cover covers the opening.

19. The label component according to claim 14, wherein the connecting piece has a first channel, the label module has a second channel, the first channel is connected to the second channel, and an optical cable extends through the first channel and the second channel.

20. The label component according to claim 14, wherein the target surface of the label module is penetrated by an extension line in the axial direction of the optical fiber connector body.

21. The label component according to claim 14, wherein the target surface of the label module is perpendicular to the axial direction of the optical fiber connector body.

22. The label component according claim 14, wherein an outer wall of the connecting piece curves inward to form a cabling channel.

23. The label component according to claim 14, wherein the mounting groove has a first channel opening and a second channel opening at opposite locations in the axial direction of the optical fiber connector body.

24. The label component according to claim 14, wherein the label information is a two-dimensional barcode, and the two-dimensional barcode includes graphic information.

25. The label component according to claim 14, wherein the label module has an inner surface, and the inner surface is disposed toward the optical fiber connector body.

26. A recognition method, comprising:
obtaining a target image, wherein the target image is an image obtained through photographing a subrack by a camera; and
obtaining a correspondence between label information and a first target adapter based on the target image, wherein the subrack is configured to fix the first target adapter, the first target adapter is configured to mount and fix an optical fiber connector assembly, and the optical fiber connector assembly comprises:
an optical fiber connector body;
a connecting piece; and
a label module;
wherein the connecting piece is separately connected to the optical fiber connector body and the label module, the label module has a target surface, the target surface is opposite to a location of the optical fiber connector body and is configured to set the label information, and the label information is configured to identify the optical fiber connector assembly; and
wherein:
the optical fiber connector body comprises a plug, a middle part, and a rear retainer that are sequentially connected; and
the connecting piece comprises a mounting groove and an extension rod, wherein one end of the extension rod is connected to the mounting groove and the other end of the extension rod is connected to the label module, and wherein the mounting groove is configured to mount and fix the middle part.

27. The method according to claim 26, further comprising:
determining, based on a first preset correspondence, that the label information corresponds to a second target adapter, wherein the first preset correspondence comprises a correspondence between the label information and an identifier of the second target adapter; and
after obtaining the correspondence between the label information and the first target adapter based on the target image, the method further comprises:
determining whether an identifier of the first target adapter is the same as the identifier of the second target adapter; and
in response to the identifier of the first target adapter being the same as the identifier of the second target adapter, determining that the first target adapter is the second target adapter.

28. The method according to claim 26, wherein obtaining the correspondence between the label information and the first target adapter based on the target image comprises:
determining location information of the label information in a label array based on the target image, wherein the label array is an array comprising at least some identification surfaces plugged in the subrack and the label information, any row comprised in the label array has at least one piece of the label information or at least one identification surface, any column comprised in the label array comprises at least one piece of the label information or the identification surface, the subrack further comprises a third target adapter, the third target adapter is configured to mount an identification component, and the identification surface of the identification component is configured to indicate a location of the third target adapter in the subrack; and
determining the corresponding first target adapter based on the location information of the label information in the label array.

29. The method according to claim 28, wherein determining the corresponding first target adapter based on the location information of the label information in the label array comprises:
determining location information of the first target adapter in an adapter array based on the location information of the label information in the label array, wherein the adapter array is an array comprising at least some adapters plugged in the subrack; and
obtaining the identifier of the first target adapter based on the location information of the first target adapter in the adapter array and a first correspondence, wherein the first correspondence comprises a correspondence between the location information of the first target adapter in the adapter array and the identifier of the first target adapter.

30. The method according to claim 28, wherein determining the corresponding first target adapter based on the location information of the label information in the label array comprises:
obtaining the identifier of the first target adapter based on the location information of the label information in the label array and a second correspondence, wherein the second correspondence comprises a correspondence between the location information of the label information in the label array and the identifier of the first target adapter.

* * * * *